US012795173B2

(12) United States Patent
Rusanovskyy et al.

(10) Patent No.: US 12,795,173 B2
(45) Date of Patent: Nov. 10, 2026

(54) NEURAL NETWORK-BASED IN-LOOP FILTER ARCHITECTURES FOR VIDEO CODING

(71) Applicant: QUALCOMM Incorporated, San Diego, CA (US)

(72) Inventors: Dmytro Rusanovskyy, San Diego, CA (US); Yun Li, Ottobrunn (DE); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/984,088

(22) Filed: Dec. 17, 2024

(65) Prior Publication Data

US 2025/0203119 A1 Jun. 19, 2025

Related U.S. Application Data

(60) Provisional application No. 63/612,279, filed on Dec. 19, 2023.

(51) Int. Cl.
*H04N 19/80* (2014.01)
*H04N 19/176* (2014.01)

(52) U.S. Cl.
CPC ........... *H04N 19/80* (2014.11); *H04N 19/176* (2014.11)

(58) Field of Classification Search
CPC ..... H04N 19/80; H04N 19/176; H04N 19/117
USPC .................................................... 375/240.26
See application file for complete search history.

(56) References Cited

U.S. PATENT DOCUMENTS

2012/0093217 A1* 4/2012 Jeon ..................... H04N 19/176
375/E7.125
2014/0003495 A1* 1/2014 Chuang ................ H04N 19/119
375/240.02
2014/0072033 A1* 3/2014 Chuang .................. H04N 19/82
375/240.02
2016/0309178 A1* 10/2016 Ha ......................... H04N 19/82
(Continued)

FOREIGN PATENT DOCUMENTS

WO 2024010710 A1 1/2024
WO 2024151553 A1 7/2024

OTHER PUBLICATIONS

Shao T., et al., "EE1-related: Further complexity reduction on the joint EE1-0 (LOP.2) unified filter", JVET-AF0071-V1, Joint Video Experts Team (JVET) of ITU-T SG 16 WP 3 and ISO/IEC JTC 1/SC 29 32nd Meeting, Hannover, DE, Oct. 13-20, 2023, pp. 1-6 (Year: 2023).*

(Continued)

*Primary Examiner* — Justin W Rider
(74) *Attorney, Agent, or Firm* — Shumaker & Sieffert, P. A.

(57) ABSTRACT

A video encoder and video decoder are configured to perform neural network (NN)-based filtering. The video encoder and video decoder may receive a picture of video data, reconstruct the picture of video data, and perform an NN-based filter process on one or more blocks of the reconstructed picture of video data using an NN-based filter, wherein the NN-based filter includes a pair of backbone blocks, each of the pair of backbone blocks comprising a three-component one-dimensional (1D) decomposition of a multi-dimensional convolution, wherein the 1D decomposition includes at least one layer with feature channel reduction.

64 Claims, 40 Drawing Sheets

(56) References Cited

U.S. PATENT DOCUMENTS

| | | | | |
|---|---|---|---|---|
| 2021/0400311 A1* | 12/2021 | Hsiao | ..................... | H04N 19/80 |
| 2022/0141456 A1* | 5/2022 | Galpin | .................. | H04N 19/82 375/240.02 |
| 2024/0283925 A1 | 8/2024 | Rusanovskyy | | |

OTHER PUBLICATIONS

Chang R., et al., "EE1-1.1: More Refinements on NN Based in-Loop Filter with a Single Model", JVET-AC0194-v1, Joint Video Experts Team (JVET) of ITU-T SG 16 WP 3 and ISO/IEC JTC 1/SC 29, 29th Meeting, by teleconference, Jan. 11-20, 2023, pp. 1-7.
Dumas T., et al., "EE1-3.2: Neural Network-based Intra Prediction with Learned Mapping to VVC Intra Prediction Modes", JVET-AC0116-v1, Joint Video Experts Team (JVET) of ITU-T SG 16 WP 3 and ISO/IEC JTC 1/SC 29, 29th Meeting, by Teleconference, Jan. 11-20, 2023, pp. 1-5.
Eadie S., et al., "EE1-1.9: Reduced Complexity CNN-Based In-loop Filtering", JVET-AC0155-v1, Joint Video Experts Team (JVET) of ITU-T SG 16 WP 3 and ISO/IEC JTC 1/SC 29, 29th Meeting, by teleconference, Jan. 11-21, 2023, pp. 1-4.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Jia J., et al., "AHG11: Deep Reference Frame Generation for Inter Prediction Enhancement", JVET-AB0114-v2, Joint Video Experts Team (JVET) of ITU-T SG 16 WP 3 and ISO/IEC JTC 1/SC 29/WG 11 28th Meeting, Mainz, DE, Oct. 20-28, 2022, pp. 1-6.
Lebedev V., et al., "Speeding-up Convolutional Neural Networks Using Fine-tuned CP-Decomposition", arXiv:1412.6553v3 [cs.CV] Apr. 24, 2015, pp. 1-11.
Li (Bytedance) Y., et al., "EEI-Related: In-Loop Filter with Wide Activation and Large Receptive Field", JVET-AC0178-v1, Joint Video Experts Team (JVET) of ITU-T SG 16 WP 3 and ISO/IEC JTC 1/SC 29, 29th Meeting, by Teleconference, Jan. 11-20, 2023, m61760 Jan. 5, 2023, XP030306837, 6 Pages.
Li J., et al., "AHG11: Complexity Reduction of NN-Based Loop-Filters", JVET-AF0206-v1, Joint Video Experts Team (JVET) of ITU-T SG 16 WP 3 and ISO/IEC JTC 1/SC 29, 32nd Meeting, Hannover, DE, Oct. 13-20, 2023, pp. 1-2.
Li (Qualcomm) Y., et al., "EE1-Related: Combination Test of EE1-1.3.5 and Multi-Scale Component of EE1-1.6", 30. JVET Meeting, Apr. 21, 2023-Apr. 28, 2023, Antalya, (The Joint Video Exploration Team of ISO/IEC JTC1/SC29/WG11 and ITU-T SG.16), No. JVET-AD0211-v4, m62893, Apr. 22, 2023, Document: JVET-AD0211, pp. 1-7.
Li Y., et al., "EE1-1.7: Combined Test of EE1-1.6 and EE1-1.3", JVET-Z0113-v1, 26. JVET Meeting, Apr. 20-29, 2022, (The Joint Video Experts Team of ISO/IEC JTC1/SC29/WP 3 And ITU-T SG.16), pp. 1-7.
Li Z., et al., "A Video Coding Method Based on Neural Network for CLIC2024", IEEE, 2024, 8 Pages.
Rusanovskyy D., et al., "AHG11: Status of the Joint EE1-0 (LOP.2) Unified Filter Training", JVET-AF0043-v5, Joint Video Experts Team (JVET) of ITU-T SG 16 WP 3 and ISO/IEC JTC 1/SC 29 32nd Meeting, Hannover, DE, Oct. 13-20, 2023, pp. 1-28.
Rusanovskyy D., et al., "EE1-5: Study of the NN Architecture at Very Low Operational Point", JVET-AH0051-v2, Joint Video Experts Team (JVET) of ITU-T SG 16 WP 3 and ISO/IEC JTC 1/SC 29, 34th Meeting, Rennes, FR, Apr. 17-24, 2024, pp. 1-5.
Rusanovskyy D., et al., "EE1-Related: On LOP2 Training Process", JVET-AG0156-v2, Joint Video Experts Team (JVET) of ITU-T SG 16 WP 3 and ISO/IEC JTC 1/SC 29, 33rd Meeting, by Teleconference, Jan. 17-26, 2024, pp. 1-5.
Rusanovskyy D., et al., "EE1-Related: On Low Complexity Operational Point for In-Loop Filter", JVET-AG0155-v2, Joint Video Experts Team (JVET) of ITU-T SG 16 WP 3 and ISO/IEC JTC 1/SC 29, 33rd Meeting, by teleconference, Jan. 17-26, 2024, pp. 1-6.
Santamaria M., et al., "EE1-1.11: Content-adaptive Post-filter", JVET-AC0055-v2, Joint Video Experts Team (JVET) of ITU-T SG 16 WP 3 and ISO/IEC JTC 1/SC 29 29th Meeting, by teleconference, Jan. 11-20, 2023, pp. 1-7.
Shao T., et al., "Low Complexity Neural Network-Based In-loop Filtering with Decomposed Split Luma-Chroma Model for Video Compression", Published at ICML 2023 Workshop Neural Compression, Jul. 11, 2023, pp. 1-6.
Wang L., et al., "EE1-1.2: Neural Network Based In-Loop Filter with a Single Model", JVET-Z0091-v4, Joint Video Experts Team (JVET) of ITU-T SG 16 WP 3 and ISO/IEC JTC 1/SC 29, 26th Meeting, by teleconference, Apr. 20-29, 2022, 7 Pages.
Xie Z., et al., "[AHG11] Study on Lower-Complexity NNLF", JVET-AG0057-v2, Joint Video Experts Team (JVET)of ITU-T SG 16 WP 3 and ISO/IEC JTC 1/SC 2933rd Meeting, by teleconference, Jan. 17-26, 2024, pp. 1-4.
Alshina E (Huawei)., et al., "Exploration Experiments on Neural Network-based Video Coding (EE1)", 30. JVET Meeting, The Joint Video Exploration Team (JVET) of ITU-T SG.16 WP 3 and ISO/IEC JTC1/SC29/WG11, No. JVET-AD2023-v1, m63585, Antalya, TR, Apr. 21, 2023-Apr. 28, 2023, 12 Pages, Apr. 28, 2023, XP030309288, p. 4.
Galpin F (Interdigital)., et al., "Algorithm Description for Neural Network-based Video Coding (NNVC-7.0)", Description of Algorithms and Software in Neural Network-based Video Coding (NNVC) Version 5, Joint Video Experts Team (JVET) of ITU-T SG 16 WP 3 and ISO/IEC JTC 1/SC 29, JVET-AF2019-V1, 32nd Meeting, Hannover, DE, Oct. 13-20, 2023, 144. MPEG Meeting, (Motion Picture Expert Group or ISO/IEC JTC1/SC29/WG11), No. m65797, Oct. 16, 2023-Oct. 20, 2023, pp. 1-37, Dec. 15, 2023, XP030313701, sections 3.1 and 3.2.
International Search Report and Written Opinion—PCT/US2024/060786—ISA/EPO—Apr. 10, 2025.
Rusanovskyy D (Qualcomm)., et al., "EE1-1.2 Complexity-Performance Tradeoff of Decomposition", 31. JVET Meeting, Geneva, CH, (The Joint Video Exploration Team of ISO/IEC JTC1/SC29/WG11 and ITU-T SG.16 WP 3), No. JVET-AE0164-v2, Jul. 13, 2023, 6 Pages, Jul. 11, 2023-Jul. 19, 2023, XP030311488, p. 1-p. 3, figures 2,3,9.
Rusanovskyy D (Qualcomm)., et al., "Unified LOP Filter Design, Training Procedure and Filter Usage", 31. JVET Meeting, Geneva, CH, No. JVET-AE0281-v1, (The Joint Video Exploration Team (JVET) of ITU-T SG.16 WP 3 and ISO/IEC JTC1/SC29/WG11), Jul. 11, 2023-Jul. 19, 2023, 5 Pages, Jul. 14, 2023, XP030311687, section 2, figure 3.

* cited by examiner

NEURAL NETWORK-BASED IN-LOOP FILTER ARCHITECTURES FOR VIDEO CODING

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for video encoding and decoding. In particular, this disclosure describes methods, techniques, and structures that may reduce the computational complexity and memory bandwidth requirements of neural network (NN)-based video coding tools. In some examples, the NN-based coding tool may be a convolutional NN (CNN)-based video coding tools, such as CNN-based filters.

In some examples, this disclosure describes CNN-based in-loop filtering architecture for video coding. The techniques of this disclosure may improve coding performance under complexity and memory requirements constraints. Coding performance improvement for low and very low complexity architecture may be achieved by introducing multi-scale elements in CNN architectures. Complexity reduction for the architecture may be achieved by utilizing separable convolution, one-dimensional convolutions in the place of multi-dimensional convolutions.

In one example, this disclosure describes an NN-based filter architecture where the backbone blocks are configured as pairs of backbone blocks, where each of the pair of backbone blocks includes a three-component one-dimensional (1D) decomposition of a multi-dimensional convolution, wherein the 1D decomposition includes at least one layer with feature channel reduction. Complexity of the NN-based filter may be reduced through using feature channel reduction, with minimal drop off in performance. In another example, the NN-based filter architecture of the disclosure includes a fusion block having two separable convolutions that each apply spatial downsampling. The spatial downsampling reduces the complexity of the NN-based filter with minimal drop off in performance.

In one example, this disclosure describes a method of coding video data, the method comprising receiving a picture of video data, reconstructing the picture of video data, and performing an NN-based filter process on one or more blocks of the reconstructed picture of video data using an NN-based filter, wherein the NN-based filter includes a pair of backbone blocks, each of the pair of backbone blocks comprising a three-component 1D decomposition of a multi-dimensional convolution, wherein the 1D decomposition includes at least one layer with feature channel reduction.

In another example, this disclosure describes an apparatus configured to code video data, the apparatus comprising a memory, and one or more processors in communication with the memory, the one or more processors configured to receive a picture of video data, reconstruct the picture of video data, and perform an NN-based filter process on one or more blocks of the reconstructed picture of video data using an NN-based filter, wherein the NN-based filter includes a pair of backbone blocks, each of the pair of backbone blocks comprising a three-component 1D decomposition of a multi-dimensional convolution, wherein the 1D decomposition includes at least one layer with feature channel reduction.

In another example, this disclosure describes an apparatus configured to code video data, the apparatus comprising means for receiving a picture of video data, means for reconstructing the picture of video data, and means for performing an NN-based filter process on one or more blocks of the reconstructed picture of video data using an NN-based filter, wherein the NN-based filter includes a pair of backbone blocks, each of the pair of backbone blocks comprising a three-component 1D decomposition of a multi-dimensional convolution, wherein the 1D decomposition includes at least one layer with feature channel reduction.

In another example, this disclosure describes a non-transitory computer-readable storage medium storing instructions that, when executed, cause one or more processors of a device configured to code video data to receive a picture of video data, reconstruct the picture of video data, and perform an NN-based filter process on one or more blocks of the reconstructed picture of video data using an NN-based filter, wherein the NN-based filter includes a pair of backbone blocks, each of the pair of backbone blocks comprising a three-component 1D decomposition of a multi-dimensional convolution, wherein the 1D decomposition includes at least one layer with feature channel reduction.

The details of one or more examples are set forth in the accompanying drawings and the description below. Other features, objects, and advantages will be apparent from the description, drawings, and claims.

DETAILED DESCRIPTION

Video encoding is typically a lossy procedure. For example, during the video encoding process, blocks of video data may be encoded using quantization and transformation. In general, quantization of values involves reducing a number of least significant bits for the values, which generally is not recoverable. In general, such reduction of bits is performed in a manner so as to avoid detectability of the loss. However, at times, such losses may lead to detectable artifacts in the video data, such as blockiness artifacts.

Filtering may be applied to decoded and/or reconstructed video data to enhance the video data, which may improve the output video data. For example, filtering may compensate for the blockiness artifacts or other losses in the video data. Studies have shown that neural network (NN)-based filtering techniques are highly capable of improving decoded and/or reproduced video data. NN-based filtering techniques can be highly complex and require significant processing power to perform effectively.

This disclosure describes coding performance improvement techniques that may be applied to NN-based filtering. Application of these techniques may reduce the processing performed by one or more processors to perform NN-based filtering. In this manner, the techniques of this disclosure may improve the performance of a video coding device. Likewise, these techniques may enable many more devices to perform NN-based filtering, thereby improving the field of video coding generally.

In one example, this disclosure describes an NN-based filter architecture where the backbone blocks are configured as pairs of backbone blocks, where each of the pair of backbone blocks includes a three-component 1D decomposition of a multi-dimensional convolution, wherein the 1D decomposition includes at least one layer with feature channel reduction. Complexity of the NN-based filter may be reduced through using feature channel reduction, with minimal drop off in performance. In another example, the NN-based filter architecture of the disclosure includes a fusion block having two separable convolutions that each apply spatial downsampling. The spatial downsampling reduces the complexity of the NN-based filter with minimal drop off in performance.

In one example, a video encoder and a video decoder may be configured to receive a picture of video data, reconstruct the picture of video data, and perform an NN-based filter process on one or more blocks of the reconstructed picture of video data using an NN-based filter, wherein the NN-based filter includes a pair of backbone blocks, each of the pair of backbone blocks comprising a three-component 1D decomposition of a multi-dimensional convolution, wherein the 1D decomposition includes at least one layer with feature channel reduction.

Figure 1:
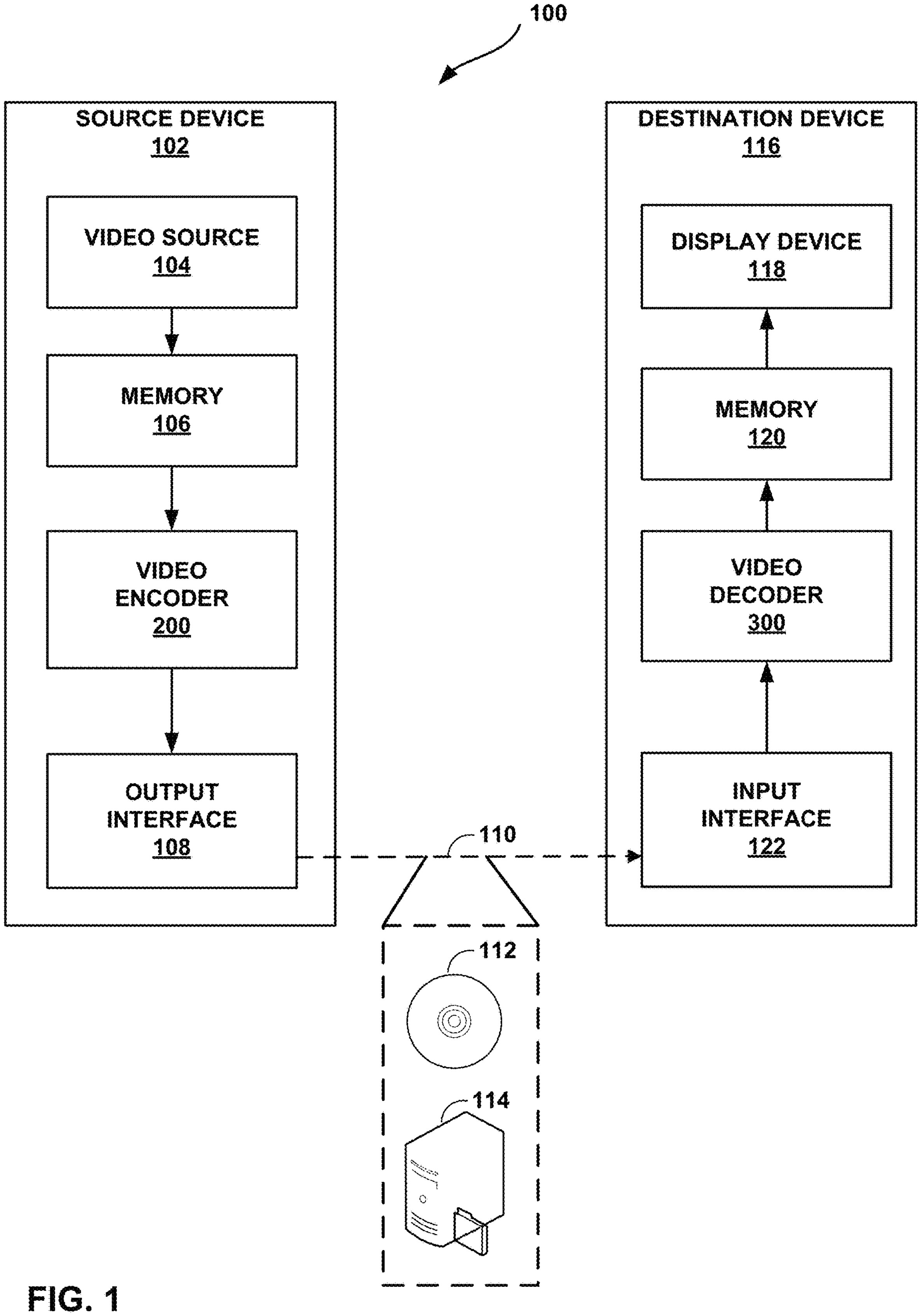
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for filtering video data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for filtering video data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use neural networks for filtering video data.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

This disclosure describes methods, techniques, and structures that may reduce the computation complexity and memory bandwidth requirements of neural network (NN)-based video coding tools. Example techniques described below are related to NN-assisted loop filtering. However, the techniques of this disclosure are applicable to any NN-based video coding tool that uses input data with certain statistical properties. The techniques of this disclosure may be used in the context of advanced video codecs, such as extensions of VVC, the next generation of video coding standards, and/or any other video codecs.

In accordance with the techniques of this disclosure, video encoder 200 and video decoder 300 may be configured to perform NN-based video coding, including NN-based filtering using any combination of techniques described below. In particular, video encoder 200 and video decoder 300 may implement an NN-based filter architecture where the backbone blocks are configured as pairs of backbone blocks, where each of the pair of backbone blocks includes a three-component 1D decomposition of a multi-dimensional convolution, wherein the 1D decomposition includes at least one layer with feature channel reduction. The complexity of the NN-based filter may be reduced through using feature channel reduction, with minimal drop off in performance. In another example, video encoder 200 and video decoder 300 may implement an NN-based filter architecture that includes a fusion block having two separable convolutions that each apply spatial downsampling. The spatial downsampling reduces the complexity of the NN-based filter with minimal drop off in performance.

In one example, video encoder 200 and video decoder 300 may be configured to receive a picture of video data, reconstruct the picture of video data, and perform an NN-based filter process on one or more blocks of the reconstructed picture of video data using an NN-based filter, wherein the NN-based filter includes a pair of backbone blocks, each of the pair of backbone blocks comprising a three-component 1D decomposition of a multi-dimensional convolution, wherein the 1D decomposition includes at least one layer with feature channel reduction.

In Loop Filter Technology for Video Coding

Figure 2:
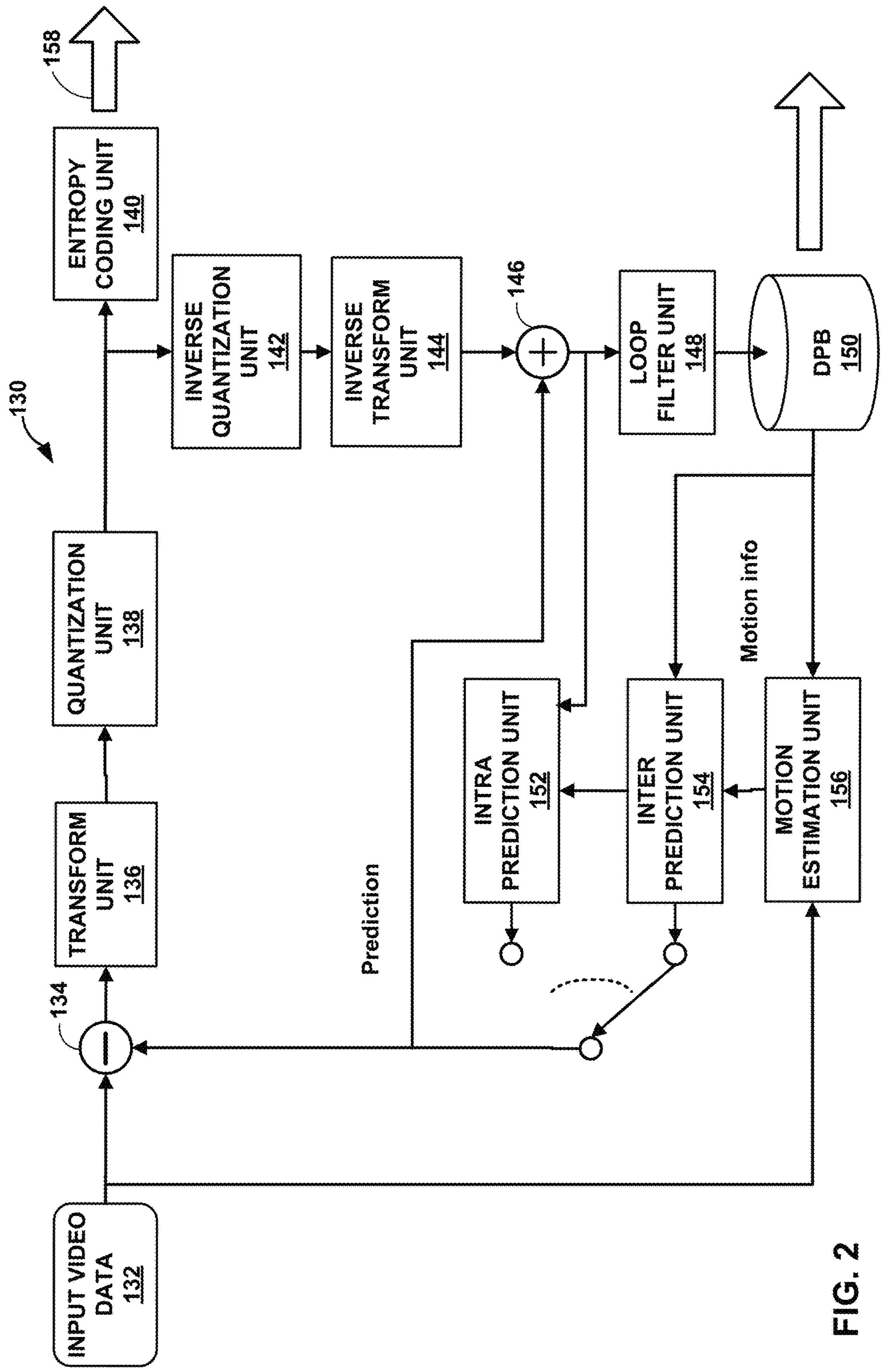
FIG. 2 is a block diagram illustrating an example hybrid video coding framework.

FIG. 2 is a conceptual diagram illustrating a hybrid video coding framework. Video coding standards since H.261 have been based on the so-called hybrid video coding principle, which is illustrated in FIG. 2. The term hybrid refers to the combination of two means to reduce redundancy in the video signal, i.e., prediction and transform coding with quantization of the prediction residual. Whereas prediction and transforms reduce redundancy in the video signal by decorrelation, quantization decreases the data of the transform coefficient representation by reducing their precision, ideally by removing only irrelevant details. This hybrid video coding design principle is also used in the two recent standards, ITU-T H.265/HEVC and ITU-T H.266/VVC.

As shown in FIG. 2, a modern hybrid video coder 130 generally performs block partitioning, motion-compensated or inter-picture prediction, intra-picture prediction, transformation, quantization, entropy coding, and post/in-loop filtering. In the example of FIG. 2, video coder 130 includes summation unit 134, transform unit 136, quantization unit 138, entropy coding unit 140, inverse quantization unit 142, inverse transform unit 144, summation unit 146, loop filter unit 148, decoded picture buffer (DPB) 150, intra prediction unit 152, inter-prediction unit 154, and motion estimation unit 156.

In general, video coder 130 may, when encoding video data, receive input video data 132. Block partitioning is used to divide a received picture (image) of the video data into smaller blocks for operation of the prediction and transform processes. Early video coding standards used a fixed block size, typically 16×16 samples. Recent standards, such as HEVC and VVC, employ tree-based partitioning structures to provide flexible partitioning.

Motion estimation unit 156 and inter-prediction unit 154 may predict input video data 132, e.g., from previously decoded data of DPB 150. Motion-compensated or inter-picture prediction takes advantage of the redundancy that exists between (hence "inter") pictures of a video sequence. According to block-based motion compensation, which is used in the modem video codecs, the prediction is obtained from one or more previously decoded pictures, i.e., the reference picture(s). The corresponding areas to generate the inter-prediction are indicated by motion information, including motion vectors and reference picture indices.

Summation unit 134 may calculate residual data as differences between input video data 132 and predicted data from intra prediction unit 152 or inter-prediction unit 154. Summation unit 134 provides residual blocks to transform unit 136, which applies one or more transforms to the residual block to generate transform blocks. Quantization unit 138 quantizes the transform blocks to form quantized transform coefficients. Entropy coding unit 140 entropy encodes the quantized transform coefficients, as well as other syntax elements, such as motion information or intra-prediction information, to generate output bitstream 158.

Meanwhile, inverse quantization unit 142 inverse quantizes the quantized transform coefficients, and inverse transform unit 144 inverse transforms the transform coefficients, to reproduce residual blocks. Summation unit 146 combines the residual blocks with prediction blocks (on a sample-by-sample basis) to produce decoded blocks of video data. Loop filter unit 148 applies one or more filters (e.g., at least one of a neural network-based filter, a neural network-based loop filter, a neural network-based post loop filter, an adaptive in-loop filter, or a pre-defined adaptive in-loop filter) to the decoded block to produce filtered decoded blocks.

In accordance with the techniques of this disclosure, a neural network filtering unit of loop filter unit 148 may receive data for a reconstructed picture of video data from summation unit 146 and from one or more other units of hybrid video coder 130, e.g., transform unit 136, quantization unit 138, intra prediction unit 152, inter-prediction unit 154, motion estimation unit 156, and/or one or more other filtering units within loop filter unit 148. For example, the neural network filtering unit may receive data from a deblocking filtering unit (also referred to as a "deblocking unit) of loop filter unit 148. The neural network filtering unit may receive, for example, boundary strength values representing whether a particular boundary is to be filtered for deblocking, and if so, a degree to which the boundary will be filtered. For example, the boundary strength values may correspond to a number of samples on either side of the boundary to be modified and/or a degree to which the samples are to be modified.

In other examples, in addition to or in the alternative to the boundary strength values, the neural network filtering unit may receive any or all of coding unit (CU) partitioning data, prediction unit (PU) partitioning data, transform unit (TU) partitioning data, deblocking filtering data, quantization parameter (QP) data, intra-prediction data (e.g., reconstruction samples and/or prediction samples), inter-prediction data (e.g., reconstruction samples and/or prediction samples), data representing distance between the decoded picture and one or more reference pictures, or motion information for one or more decoded blocks of the decoded picture. The deblocking filtering data may further include one or more of whether long or short filters were used for deblocking or whether strong or weak filters were used for deblocking. The data representing the distance between the decoded picture and the reference pictures may be represented as picture order count (POC) differences between POC values of the pictures.

A block of video data, such as a CTU or CU, may in fact include multiple color components, e.g., a luminance or "luma" component, a blue hue chrominance or "chroma" component, and a red hue chrominance (chroma) component. The luma component may have a larger spatial resolution than the chroma components, and one of the chroma components may have a larger spatial resolution than the other chroma component. Alternatively, the luma component may have a larger spatial resolution than the chroma components, and the two chroma components may have equal spatial resolutions with each other. For example, in 4:2:2 format, the luma component may be twice as large as the chroma components horizontally and equal to the chroma components vertically. As another example, in 4:2:0 format, the luma component may be twice as large as the chroma components horizontally and vertically. The various operations discussed above may generally be applied to each of the luma and chroma components individually (although certain coding information, such as motion information or intra-prediction direction, may be determined for the luma component and inherited by the corresponding chroma components).

Figure 3:
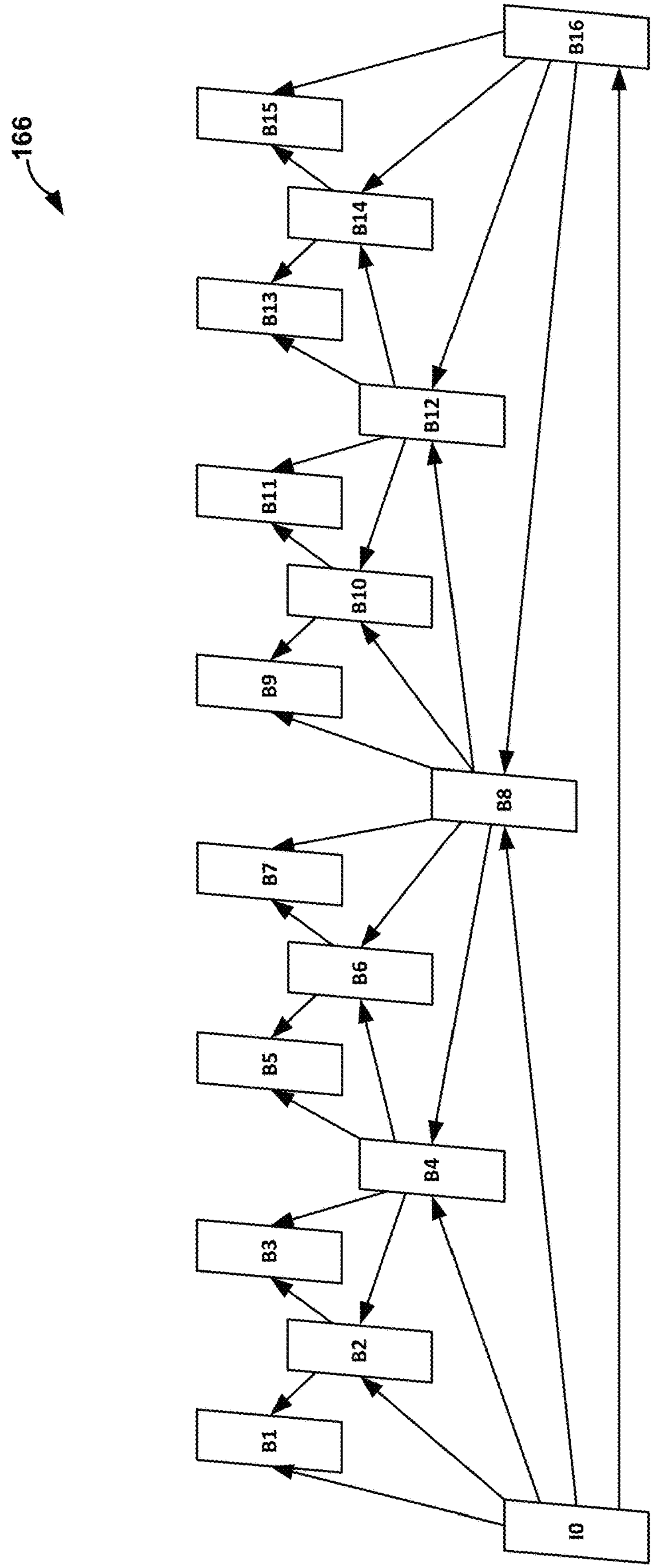
FIG. 3 is a conceptual diagram illustrating a hierarchical prediction structure using a group of pictures (GOP) size of 16.

In recent video codec, hierarchical prediction structures inside a group of pictures (GOP) is applied to improve coding efficiency. FIG. 3 illustrates an example hierarchical prediction structure 166 with a group of pictures (GOP) size equal to 16.

Referring again to FIG. 2, intra-picture prediction exploits the spatial redundancy that exists within a picture (hence "intra") by deriving the prediction for a block from already coded/decoded, spatially neighboring (reference) samples.

The directional angular prediction, DC prediction and plane or planar prediction are used in the most recent video codec, including AVC, HEVC and VVC.

Hybrid video coding standards may apply a block transform to the prediction residual (regardless of whether it comes from inter- or intra-picture prediction). In early standards, including H.261/262/263, a discrete cosine transform (DCT) is employed. In HEVC and VVC, more transform kernel besides DCT are applied in order to account for different statistics in the specific video signal.

Quantization aims to reduce the precision of an input value or a set of input values in order to decrease the amount of data needed to represent the values. In hybrid video coding, the quantization is typically applied to individual transformed residual samples, e.g., to transform coefficients, resulting in integer coefficient levels. In recent video coding standards, the step size is derived from a so-called quantization parameter (QP) that controls the fidelity and bit rate. A larger step size lowers the bit rate but also deteriorates the quality, which e.g. results in video pictures exhibiting blocking artifacts and blurred details.

Entropy coding unit 140 may perform context-adaptive binary arithmetic coding (CABAC) on encoded video. CABAC is used in recent video codecs, e.g. AVC, HEVC and VVC, due to its high efficiency.

Loop filter unit 148 may perform post-loop or in-loop filtering. Post/In-Loop filtering is a filtering process (or combination of such processes) that is applied to the reconstructed picture to reduce the coding artifacts. The input of the filtering process is generally the reconstructed picture, which is the combination of the reconstructed residual signal (which includes quantization error) and the prediction. As shown in FIG. 2, the reconstructed pictures after in-loop filtering are stored in decoded picture buffer (DPB) 150 and are used as a reference for inter-picture prediction of subsequent pictures. The coding artifacts are mostly determined by the QP. Therefore, QP information is generally used in design of the filtering process. In HEVC, the in-loop filters include deblocking filtering and sample adaptive offset (SAO) filtering. In the VVC standard, an adaptive loop filter (ALF) was introduced as a third filter. The filtering process of ALF is as shown below:

$$R'(i,j) = R(i,j) + \left(\left(\sum_{k\neq 0}\sum_{l\neq 0} f(k,l)\times K(R(i+k,j+l)-R(i,j),c(k,l))+64\right)\gg 7\right), \quad (1)$$

where can R(i, j) is the samples before filtering process, R'(i, j) is the sample value after filtering process. f(k, l) denotes the filter coefficients, K(x, y) is the clipping function and c(k, l) denotes the clipping parameters. The variables k and l vary between $$-\frac{L}{2} \text{ and } \frac{L}{2}$$

where L denotes the filter length. The clipping function K(x, y)=min(y, max(−y, x)) which corresponds to the function Clip3 (−y, y, x). The clipping operation introduces non-linearity to make ALF more efficient by reducing the impact of neighbor sample values that are too different with the current sample value. In VVC, the filtering parameters can be signalled in the bit stream, and can be selected from pre-defined filter sets. The ALF filtering process can also be summarised with the following equation:

$$R'(i,j) = R(i,j) + \text{ALF\_residual\_ouput}(R) \quad (2)$$

Neural Network (NN) Based Filtering or Video Coding

Figure 4:
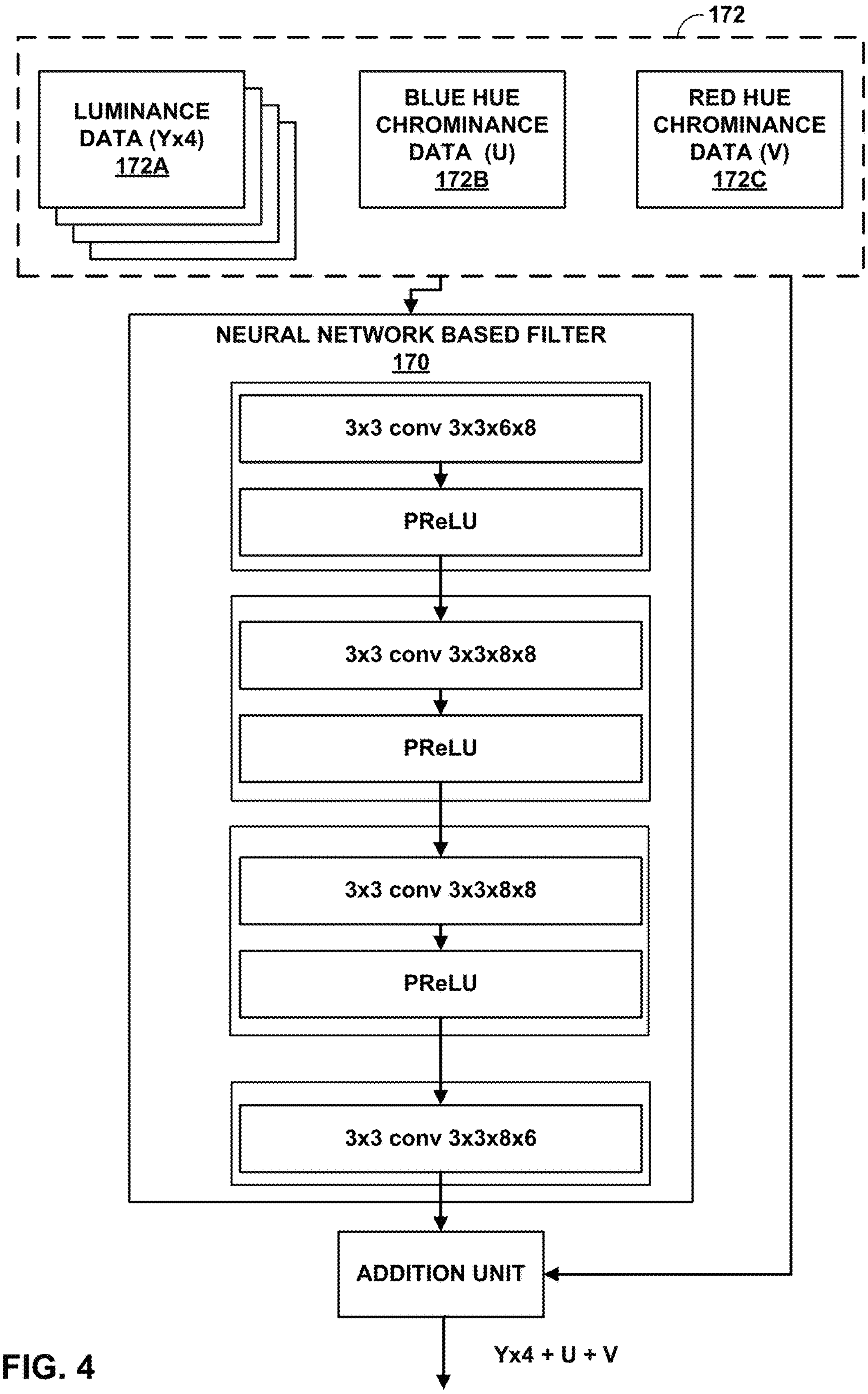
FIG. 4 is a block diagram illustrating an example convolutional neural network (CNN)-based filter with four layers.

FIG. 4 is a conceptual diagram illustrating a neural network based filter 170 with four layers. Various studies have shown that embedding neural networks (NN) into, e.g., the hybrid video coding framework of FIG. 2, can improve compression efficiency. Neural networks have been used for intra prediction and inter prediction to improve the prediction efficiency. NN-based in-loop filtering is also a prominent research topic in recent years. In some examples, the filtering process is applied as a post-filter. In such examples, the filtering process is applied to the output picture, and the unfiltered picture may be used as reference picture.

NN-based filter 170 can be applied in addition to the existing filters, such as deblocking filters, sample adaptive offset (SAO), and/or adaptive loop filtering (ALF). NN-based filters can also be applied exclusively, where NN-based filters are designed to replace all of the existing filters. Additionally or alternatively, NN-based filters, such as NN-based filter 170, may be designed to supplement, enhance, or replace any or all of the other filters.

FIG. 4 shows an example of a convolutional neural network (CNN)-based filter with four layers. The NN-based filtering process of FIG. 4 may take the reconstructed luma and chroma samples as inputs, packed in a 3D volume with 6 planes. The intermediate outputs are residual samples, which are added back to the input to refine the input samples. The NN filter may use all color components (e.g., Y, U, and V, or Y, Cb, and Cr, i.e., luminance data 172A, blue-hue chrominance 172B, and red-hue chrominance 172C) as inputs 172 to exploit cross-component correlations. Different color components may share the same filters (including network structure and model parameters) or each component may have its own specific filters.

The filtering process can also be generalized as follows:

$$R'(i,j) = R(i,j) + \text{NN\_filter\_residual\_ouput}(R) \quad (3)$$

The model structure an model parameters of NN-based filter(s) can be pre-defined and be stored at the encoder and decoder. The filters can also be signalled in the bitstream.

In the example of FIG. 4, the NN-based filter may include a series of feature extraction layers, followed by an output convolution. In FIG. 4, the feature extraction layers may include a 3×3 convolution (conv) layer followed by a parametric rectified linear unit (PReLU) layer. The convolutional layer applies a convolution operation to the input data, which involves a filter or kernel sliding over the input data (e.g., the reconstruction samples of input 172) and computing dot products at each position. The convolution operation essentially captures local patterns within the input data. For example, in the context of image processing, these patterns could be edges, textures, or other visual features. The filter or kernel is a small matrix of weights that gets updated during the training process. By sliding this filter across the input data (or feature map from a previous layer) and computing the dot product at each position, the convolutional layer creates a feature map that encodes spatial hierarchies and patterns detected in the input.

The output of a convolutional layer is a set of feature maps, each corresponding to one filter, capturing different aspects of the input data. This layer helps the neural network to learn increasingly complex and abstract features as the data passes through deeper layers of the network. The first 3×3 in the nomenclature 3×3 conv 3×3×6×8 in FIG. 4 indicates that the convolution layer has a 3×3 filter size (e.g., a 3×3 matrix). 3×3×6×8 refers to both the input and output dimensions of the convolution layer, where 6 is the number of input channels, and 8 is the number of output channels.

The PReLU layer is an activation function used in neural networks, and was introduced as a variant of the ReLU (Rectified Linear Unit) activation function. As described above, the convolution layer outputs feature maps, each corresponding to one filter, representing detected features in the input. Following the convolution layer, the PReLU layer applies the PReLU activation function to each element of the feature maps produced by the convolution layer. For positive values, the PReLU layer acts like a standard ReLU, passing the value through. For negative values, instead of setting them to zero (e.g., as ReLU does), the PReLU layer allows a small, linear, negative output. This keeps the neurons active and maintains the gradient flow, which can be beneficial for learning in deep networks.

In summary, when a convolution layer is followed by a PReLU layer, the convolution layer first extracts features from the input data through a set of learned filters. The resulting feature maps are then passed through the PReLU activation function, which introduces non-linearity and helps to avoid the problem of dying neurons by allowing a small gradient when the inputs are negative. This combination is effective in learning complex patterns in the data while maintaining robust gradient flow, especially beneficial in deeper network architectures.

Processing Unit

When NN-based filtering is applied in video coding, the whole video signal (pixel data) might be split into multiple processing units (e.g., 2D blocks), and each processing unit can be processed separately or be combined with other information associated with this block of pixels. The possible choices of a processing unit include a frame, a slice/tile, a CTU, or any pre-defined or signaled shapes and sizes. Typically, NN-based filtering is performed on reconstructed blocks of video data. Here, reconstructed blocks and samples may refer to both decoded blocks produced by video decoder 300, as well blocks reconstructed in a reconstruction loop of video encoder 200.

Types of Input Data

To further improve the performance of NN-based filtering, different types of input data can be processed jointly to produce the filtered output. Input data may include, but is not limited to, reconstruction pixels/samples, prediction pixels/samples, pixels/samples after the loop filter(s), partitioning structure information, deblocking parameters (e.g., boundary strength (BS)), QP values, slice or picture types, or a filters applicability or coding modes map. Input data can be provided at different granularities. Luma reconstruction and prediction samples could be provided at the original resolution, whereas chroma samples could be provided at lower resolution, e.g. for 4:2:0 representation, or can be upsampled to the Luma resolution to achieve per-pixel representation. Similarly, QP, BS, partitioning, or coding mode information can be provided at lower resolution, including cases with a single value per frame, slice or processing block (e.g. QP). In other examples, QP, BS, partitioning, or coding mode information can be expanded (e.g., replicated) to achieve per-pixel/sample representation.

Figure 5:
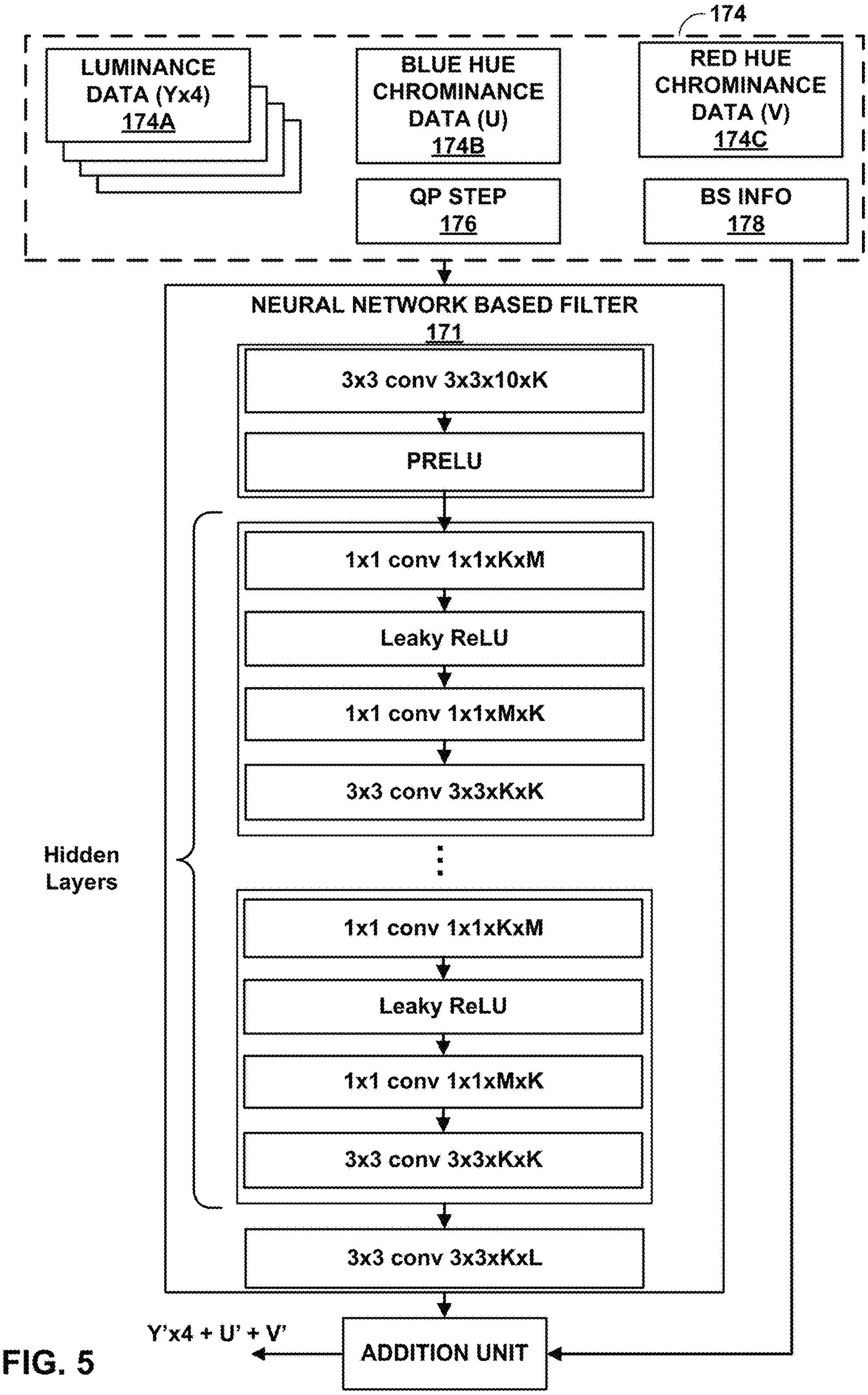
FIG. 5 is a block diagram illustrating an example CNN-based filter with padded input samples and supplementary data.

An example of an architecture utilizing supplementary data is shown in FIG. 5. FIG. 5 is a block diagram illustrating an example CNN-based filter with padded input samples and supplementary data. NN-based filter 171 uses pixels/samples of the processing block combined with supplementary data as input 174. The input 174 may include 4 subblocks of interlaced luma samples (Y×4) 174A and associated blue hue chrominance (U) data 174B and red hue chrominance (V) data 174C. The supplementary data includes a quantization parameter (QP) step 176 and a boundary strength (BS) 178. The area of the input pixels/samples may be extended with 4 padded pixels/samples from each side. The resulting dimensions of the processing volume is (4+64+4)×(4+64+4)×(4Y+2UV+1QP+3BS).

Relative to the NN-based filter in FIG. 4, NN-based filter 171 may include two or more hidden layers that utilize both 1×1 convolutions and a Leaky ReLU layer. A leaky ReLU layer. Similar to a PReLU layer, a Leaky ReLU layer allows a small, non-zero gradient to be output when the layer is not active. Instead of outputting zero for negative inputs, the Leaky ReLU multiplies these inputs by a small constant. This small slope ensures that even neurons that would otherwise be inactive still contribute a small amount to the network's learning, reducing the likelihood of the dying ReLU problem.

NN Based Filtering with Multi-Mode Design

To further improve the performance of NN-based filtering, multi-mode solutions can be designed. For example, for each processing unit, video encoder 200 may select among a set of modes based on rate-distortion optimization and the choice can be signaled in the bit-stream. The different modes may include different NN models, different values that used as the input information of the NN models, and/or other factors. In one example, video encoder 200 and video decoder 300 may use an NN-based filtering solution with multiple modes based on a single NN model by using different QP values as input of the NN model for different modes.

Examples of NN Architectures

Figure 6:
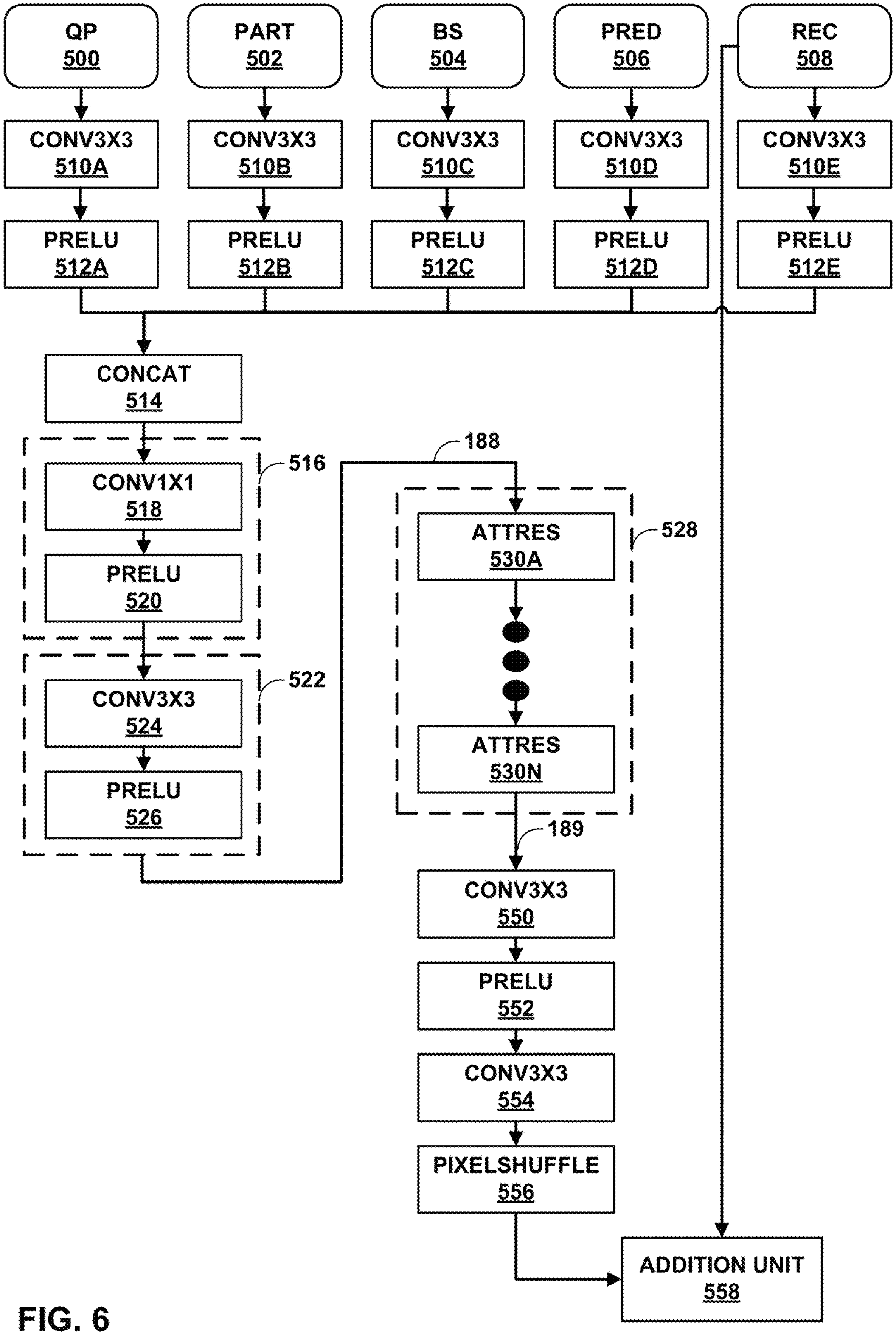
FIG. 6 is a block diagram illustrating another example CNN-based filter with padded input samples and supplementary data.

In one example, an NN-based filtering solution with multiple modes may be used, as described above. The structure of the network is shown in FIG. 6. The NN-based filter of FIG. 6 includes a first portion (e.g., the feature extraction section) including input 3×3 convolution filters 510A-510E and respective parametric rectified linear unit (PReLU) filters 512A-512E for each of the inputs to generate feature maps (e.g., the feature extraction section of the NN-filter). Concatenation unit 514 concatenates the feature maps and provides them to fusion block 516 and transition block 522. The NN-based filter in FIG. 6 further includes a set 528 of attention residual (AttRes) blocks 530A-530N; and a last portion (e.g., the tail section) including 3×3 convolution filter 550, PReLU filter 552, 3×3 convolution filter 554, and pixel shuffle unit 556. The AttRes blocks may also be referred to as backbone blocks.

In the first portion (e.g., the feature extraction section), different inputs, including quantization parameter (QP) 500, partition information (part) 502, boundary strength (BS) 504, prediction samples (pred) 506, and reconstruction samples (rec) 508 are received. Respective 3×3 convolution filters 510A-510E and PReLU filters 512A-512E convolve and activate the respective inputs to produce feature maps. Concatenation unit 514 then concatenates the feature maps. Fusion block 516, including 1×1 convolution filter 518 and PReLU filter 520, fuses the concatenated feature maps. Transition block, including 3×3 convolutional filter 524 and PReLU filter 526, subsamples the fused inputs to create output 188. Output 188 is then fed through set 528 of attention residual blocks 530A-530N, which may include a various number of attention residual blocks, e.g., 8.

The AttRes blocks may also receive quantization parameter (QP) 500, partition information (part) 502, boundary strength (BS) 504, prediction samples (pred) 506, and reconstruction samples (rec) 508 as input. The attention block is explained further with respect to FIG. 7. Output 189 from the last of the set of attention residual blocks 184 is fed to the last portion of the NN-based filter. In the last portion, 3×3 convolution filter 550, PReLU filter 552, 3×3 convolution filter 554, and pixel shuffle unit 556 processes output 189, and addition unit 558 combines this result with the original reconstructions samples input 508. This ultimately forms the filtered output for presentation and storage as reference for subsequent inter-prediction, e.g., in a decoded picture buffer (DPB). In some examples, the NN-based filter of FIG. 6 uses 96 feature maps.

Figure 7:
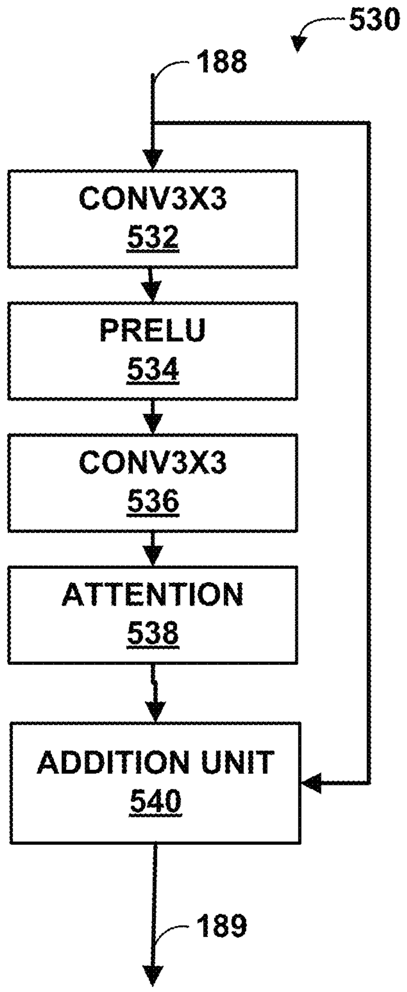
FIG. 7 is a block diagram illustrating an example attention residual block of the neural network filter of FIG. 6.

FIG. 7 is a conceptual diagram illustrating an attention residual block of FIG. 6. That is, FIG. 7 depicts attention residual block 530, which may include components similar to those of attention residual blocks 530A-530N of FIG. 6. In this example, attention residual block 530 includes first 3×3 convolutional filter 532, parametric rectified linear unit (PReLU) filter 534, second 3×3 convolutional filter 536, an attention block 538, and addition unit 540. Addition unit 540 combines the output of attention block 538 and output 188, initially received by convolution filter 532, to generate output 189.

Figure 8:
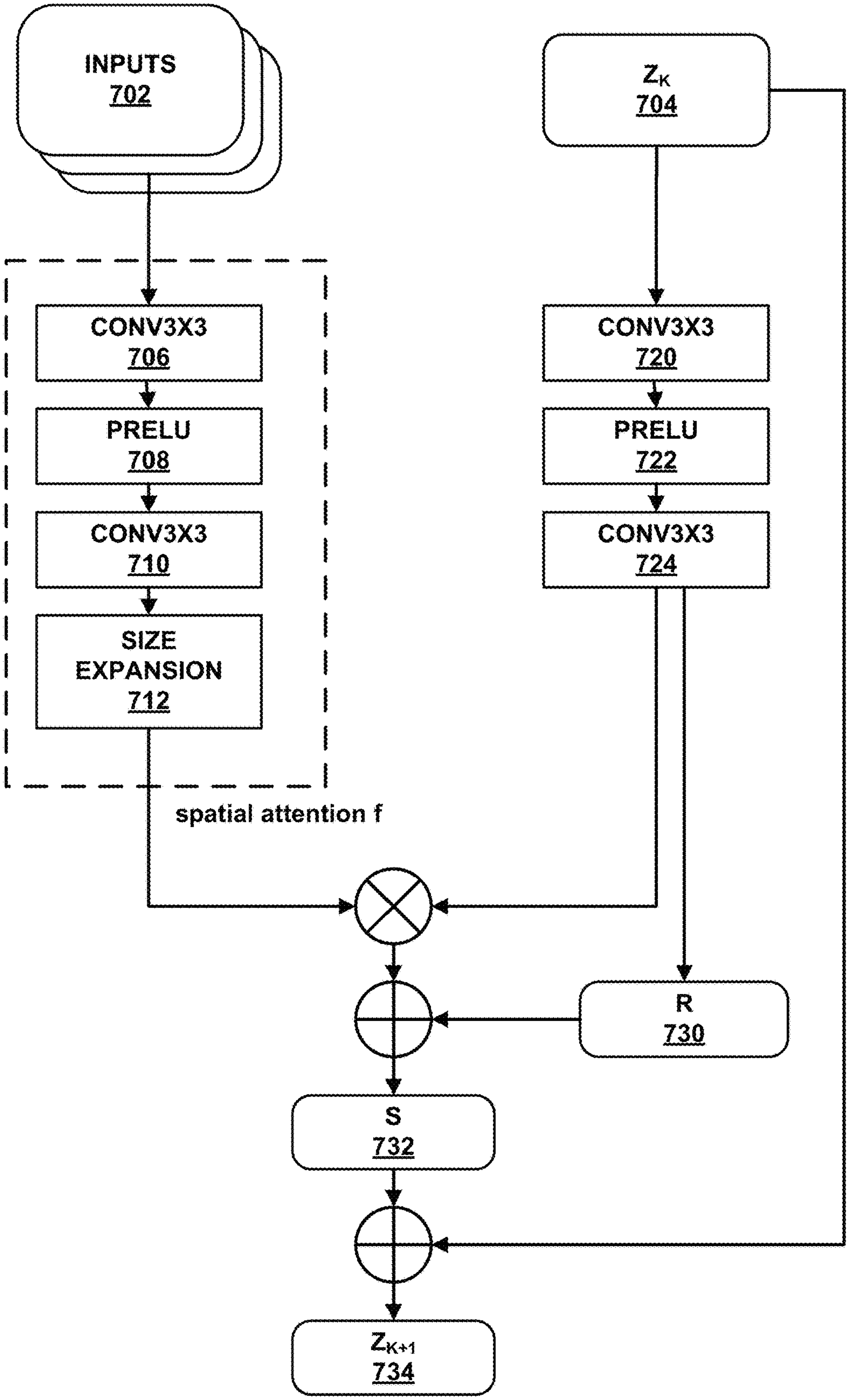
FIG. 8 is a block diagram illustrating an example of a spatial attention layer of FIG. 6.

FIG. 8 is a conceptual diagram illustrating an example spatial attention layer of FIG. 7. As shown in FIG. 8, a spatial attention layer of attention residual block 530 includes 3×3 convolutional filter 706, PReLU filter 708, 3×3 convolution filter 710, size expansion unit 712, 3×3 convolution filter 720, PReLU filter 722, and 3×3 convolution filter 724. 3×3 convolution filter 706 receives inputs 702, corresponding to quantization parameter (QP) 500, partition information (part) 502, boundary strength (BS) 504, prediction information (pred) 506, and reconstructed block (rec) 508 of FIG. 6. 3×3 convolution filter 720 receives $Z_K$ value 704. The outputs of size expansion unit 712 and 3×3 convolution filter 724 are combined, and then combined with R value 730 to generate S value 732. S value 732 is then combined with $Z_K$ value 704 to generate output $Z_{K+1}$ value 734.

Figure 9:
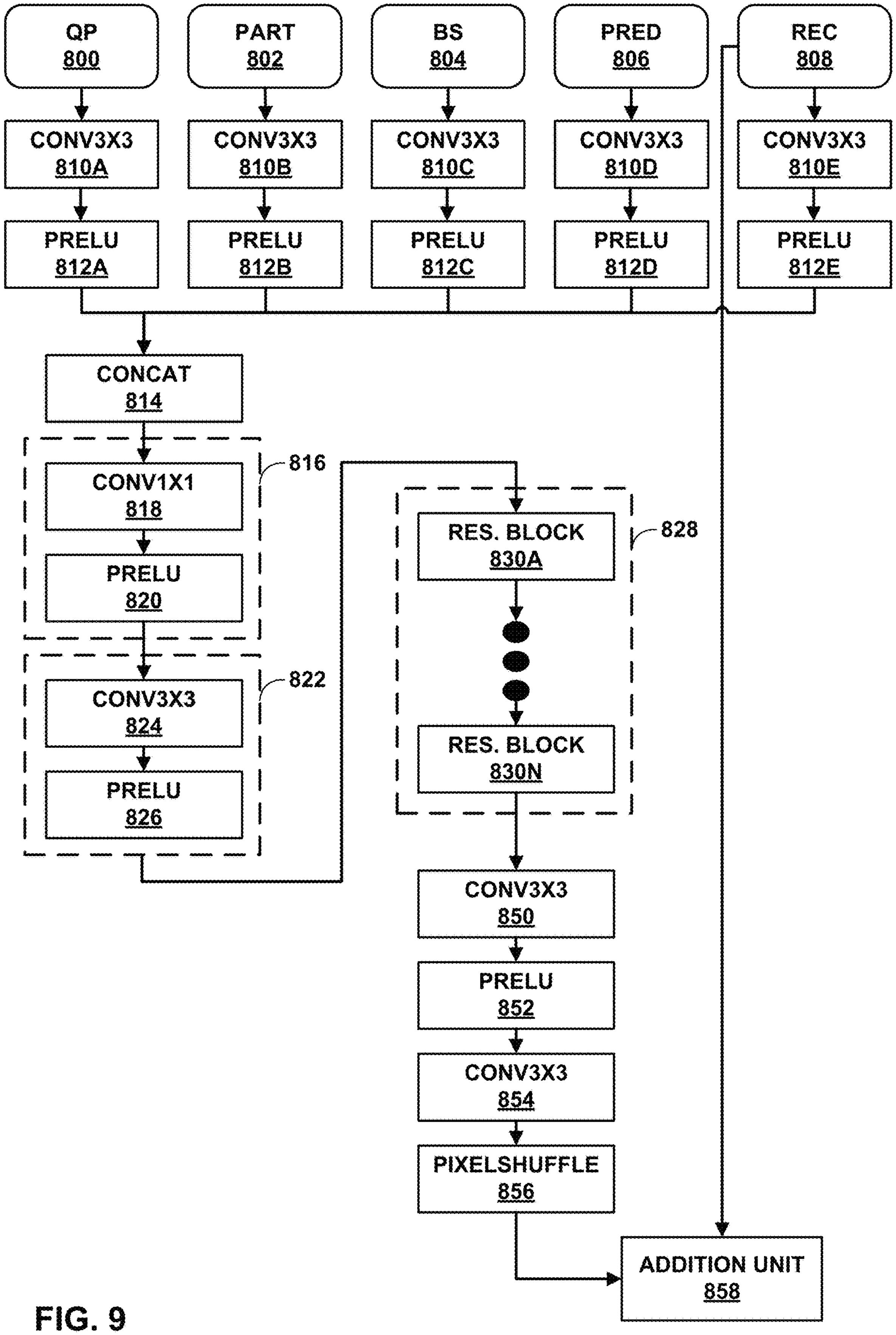
FIG. 9 is a block diagram illustrating an example of a simplified CNN-based filter architecture with padded input samples and supplementary data that uses a residual block structure.

In other examples, an alternative design of the NN architecture may be used. For example, a larger number of low-complexity residual blocks in the backbone of the filter of FIG. 6 may be used, along with a reduced number of channels (feature maps) and the removal of the attention modules. This alternative convolutional neural network filtering structure (e.g., for Luma filtering) is shown in FIG. 9. FIG. 9 is a block diagram illustrating an example of a simplified CNN-based filter architecture with padded input samples and supplementary data.

In the example of FIG. 9, the number of residual blocks used is M=24. The number of features maps (convolutions) is reduced to 64. In the ResBlocks, the number of channels firstly goes up to 160 before the activation layer, and then goes down to 64 after the activation layer. The number of residual blocks and channels can be configured differently (M set to another value and the number of channels in the residual block can be set to a number different than 160) for different performance-complexity trade-offs. Chroma filtering may follow the concept of FIG. 6, with the above modifications to its backbone for processing of chroma channels.

The NN based filter of FIG. 9 includes 3×3 convolution filters 810A-810E and PReLU filters 812A-812E, which convolve respective inputs, i.e., QP 800, Part 802, BS 804, Pred 806, and Rec 808 to generate feature maps (e.g. the feature extraction section). Concatenation unit 814 concatenates the convolved inputs (e.g., the feature maps). Fusion block 816 then fuses the concatenated feature maps using 1×1 convolution filter 818 and PReLU filter 820. Transition block 822 then processes the fused data using 3×3 convolution filter 824 and PReLU filter 826.

In this example, the NN based filter includes a set 828 of residual blocks 830A-830N (also called backbone blocks), each of which may be structured according to residual block structure 830 of FIG. 10, as discussed below. Residual blocks 830A-830N may replace AttRes blocks 530A-530N of FIG. 6. The example of FIG. 9 may be used for luminance (luma) filtering, although as discussed below, similar modifications may be made for chrominance (chroma) filtering.

The number of residual blocks and channels included in set 828 of FIG. 9 can be configured differently. That is, N may be set to a different value, and the number of channels in residual block structure 830 may be set to a number different than 160, to achieve different performance-complexity tradeoffs. Chroma filtering may be performed with these modifications for processing of chroma channels.

Set 828 of residual blocks 830A-830N has N instances of residual block structure 830. In one example, N may be equal to 32, such that there are 32 residual block structures. Residual blocks 830A-830N may use 64 feature maps, which is reduced relative to the 96 feature maps used in the example of FIG. 6.

Figure 10:
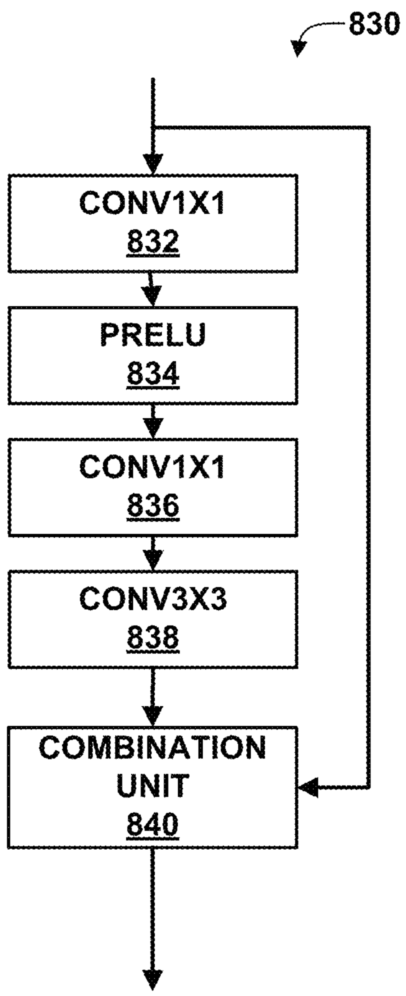
FIG. 10 is a block diagram illustrating an example residual block structure of the example of FIG. 9.

FIG. 10 is a conceptual diagram illustrating an example residual block structure 830 of FIG. 9. In this example, residual block structure 830 includes first 1×1 convolutional filter 832, which may increase a number of input channels to 160, before an activation layer (PReLU filter 834) processes the input channels. PReLU filter 834 may thereby reduce the number of channels to 64 through this processing. Second 1×1 convolution filter 836 then processes the reduced channels, followed by 3×3 convolution filter 838. Finally, combination unit 840 may combine the output of 3×3 convolution filter 838 with the original input received by residual block structure 830.

Figure 11:
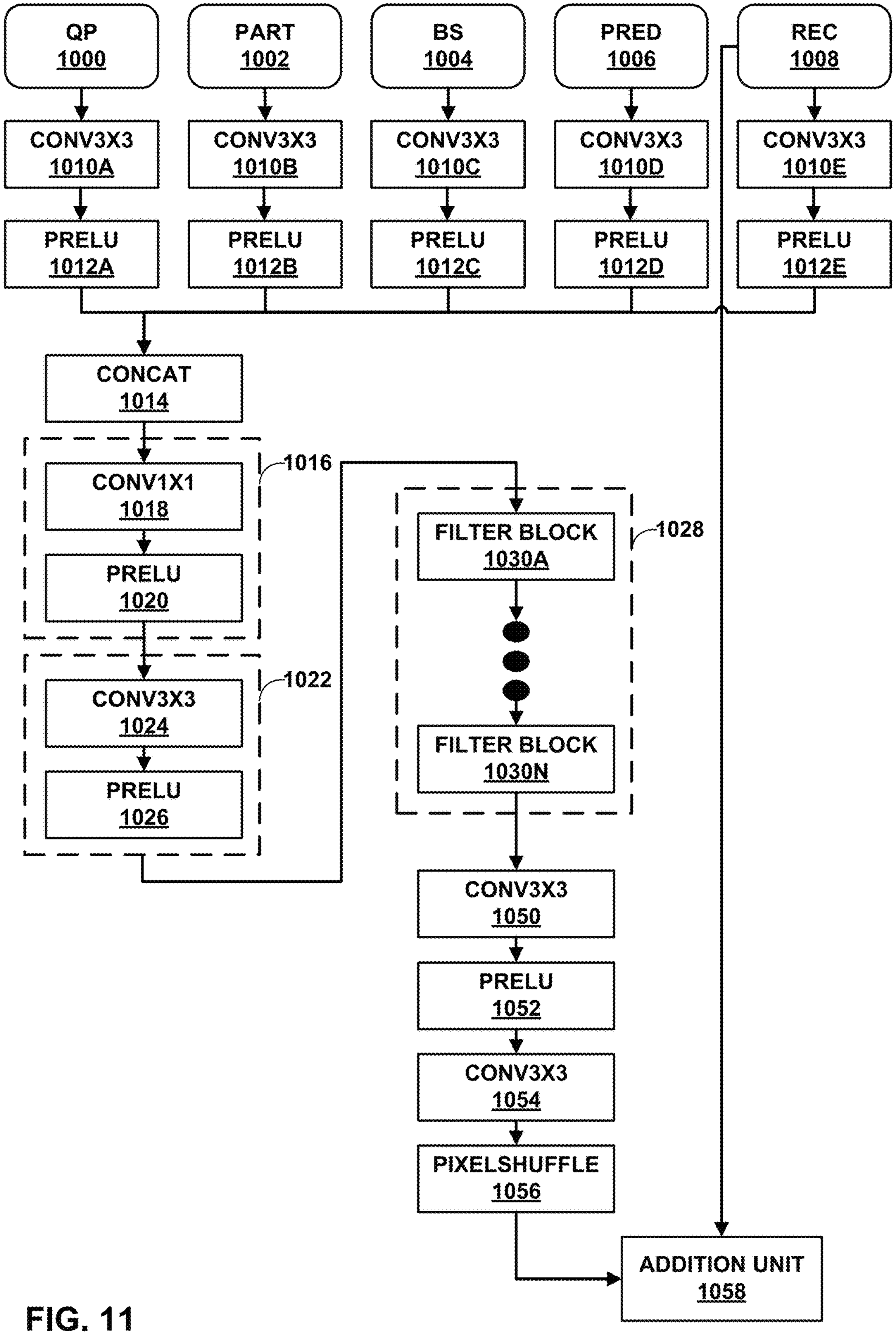
FIG. 11 is a block diagram illustrating an example of a simplified CNN-based filter architecture with padded input samples and supplementary data that uses a filter block structure.

In yet another NN architecture, the residual blocks can be replaced by filter blocks as shown in FIG. 11. In this example, the bypass branch around the convolution and activation layers in the residual block of the previous example is removed. The number of channels and number of filter blocks can be configurable, for example, 64 channels, 24 filter blocks, with 160 channels before and after the activation, which results in the complexity of the network is 605.93 kMAC and the number of parameters is 1.5M for the intra luma model.

FIG. 11 is a conceptual diagram illustrating another example filtering block structure that may be substituted for the set of attention residual blocks of FIG. 6 according to the techniques of this disclosure. The NN based filter of FIG. 11 includes 3×3 convolution filters 101A-100E and PReLU filters 1012A-1012E, which convolve respective inputs, i.e., QP 1000, Part 1002, BS 1004, Pred 1006, and Rec 1008 to form feature maps (e.g., the feature extraction section). Concatenation unit 1014 concatenates the feature maps. Fusion block 1016 then fuses the concatenated inputs using 1×1 convolution filter 1018 and PReLU filter 1020. Transition block 1022 then processes the fused data using 3×3 convolution filter 1024 and PReLU filter 1026.

In this example, the NN-based filtering unit includes N filter blocks 1030A-1030N (also called backbone blocks), each of which may have the structure of filter block 1030 of FIG. 12 as discussed below. Filter block structure 1030 may be substantially similar to residual block structure 830, except that combination unit 840 is omitted from filter block structure 1030, such that input is not combined with output. Instead, output of each residual block structure may be fed directly to the subsequent block.

The number of channels and number of filter blocks may be configurable. In one example, it could be set to 64 channels and 32 filter blocks. The number of increased channels in each filter block 198 may be 160 as discussed above.

Figure 12:
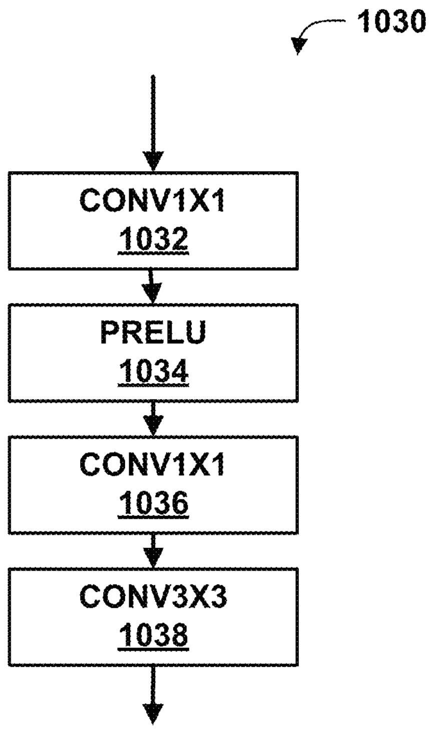
FIG. 12 is a block diagram illustrating an example filter block structure of the example of FIG. 11.

FIG. 12 is a conceptual diagram illustrating an example filter block structure 1030 of FIG. 11. In this example, residual block structure 1030 includes first 1×1 convolutional filter 1032, which may increase a number of input channels to 160, before an activation layer (PReLU filter 1034) processes the input channels. PReLU filter 1034 may thereby reduce the number of channels to 64 through this processing. Second 1×1 convolution filter 1036 then processes the reduced channels, followed by 3×3 convolution filter 1038. As discussed above, filter block structure 1030 does not include a combination unit, in contrast with the residual block structure 830 of FIG. 10.

Multi-Mode CNN In-Loop (ILF) Filter with Separable Convolution

Convolution with a 3×3 kernel is popular in NN-based filters. In the architectures described above, a 3×3×N×M convolution is utilized in multiple sections and blocks, with a 3×3 kernel sliding in the spatial (2D) domain. However, multi-dimensional convolution, such as a 2D kernel convolution, introduces significant complexity. In accordance with the techniques of this disclosure, video encoder 200 and video decoder 300 may be configured to utilize separable convolutions in the place a multi-dimensional convolution (e.g. a 3×3×N×M convolution). For example, two separable one-dimensional convolutions may be used in place of a 3×3 convolution in any section of an NN-based filter. The use of separable convolutions may reduce computation complexity and memory bandwidth requirements.

To avoid excessive computation and reduce parameter sets originating from multi-dimensional convolutions, such as 3×3 convolutions (or 2D convolution components of kernels of higher dimensionality) in the CNN-architectures described above or similar, this disclosure describes techniques where video encoder 200 and video decoder 300 are configured to utilize separable convolutions (e.g., 1D separable convolution) produced by low complexity approximation instead of multi-dimensional (e.g., 2D) convolutions sliding in the spatial direction. While the techniques of this disclosure are described with reference to 3×3 convolutions (e.g., 4×4, 5×5 or larger), the decomposition techniques of this disclosure may be used for any size of multi-dimensional convolutions. In general, a multi-dimensional convolution has a kernel size of n1×n2 in spatial dimension where n1 and n2 are positive integers. The values of n1 and n2 may the same or different. The multi-dimensional convolution may further have a size of K in a depth dimension (e.g., n1×n2×K). In addition, with the number of output channels M, the multi-dimensional convolution can be expressed as a 4-D tensor of n1×n2×K×M.

In one example of the disclosure, a low-rank convolution approximation decomposes a 3×3×M×N convolution into a pixel-wise convolution (1×1×M×R), two separable convolutions (3×1×R×R, 1×3×R×R), and another pixel-wise convolution (1×1×R×N). Here, R is the rank of the approximation, and can be used to adjust the performance/complexity of the approximation. The value of R may be an integer. In some examples, R can be derived as a function (ratio) of M or N, or max(M, N). In some examples, R can be set equal to A*max(M, N), with A being less than 1 (e.g., 0.2, 0.5, 0.8), A being higher then 1 (e.g., 1.0, 1.2), or other values.

In a general example, a multi-dimensional convolution may be approximated by a plurality of separable convolutions by performing a first convolution of size n1×1 and the performing a second convolution of size 1×n2 on the output of the first convolution.

Figure 13:
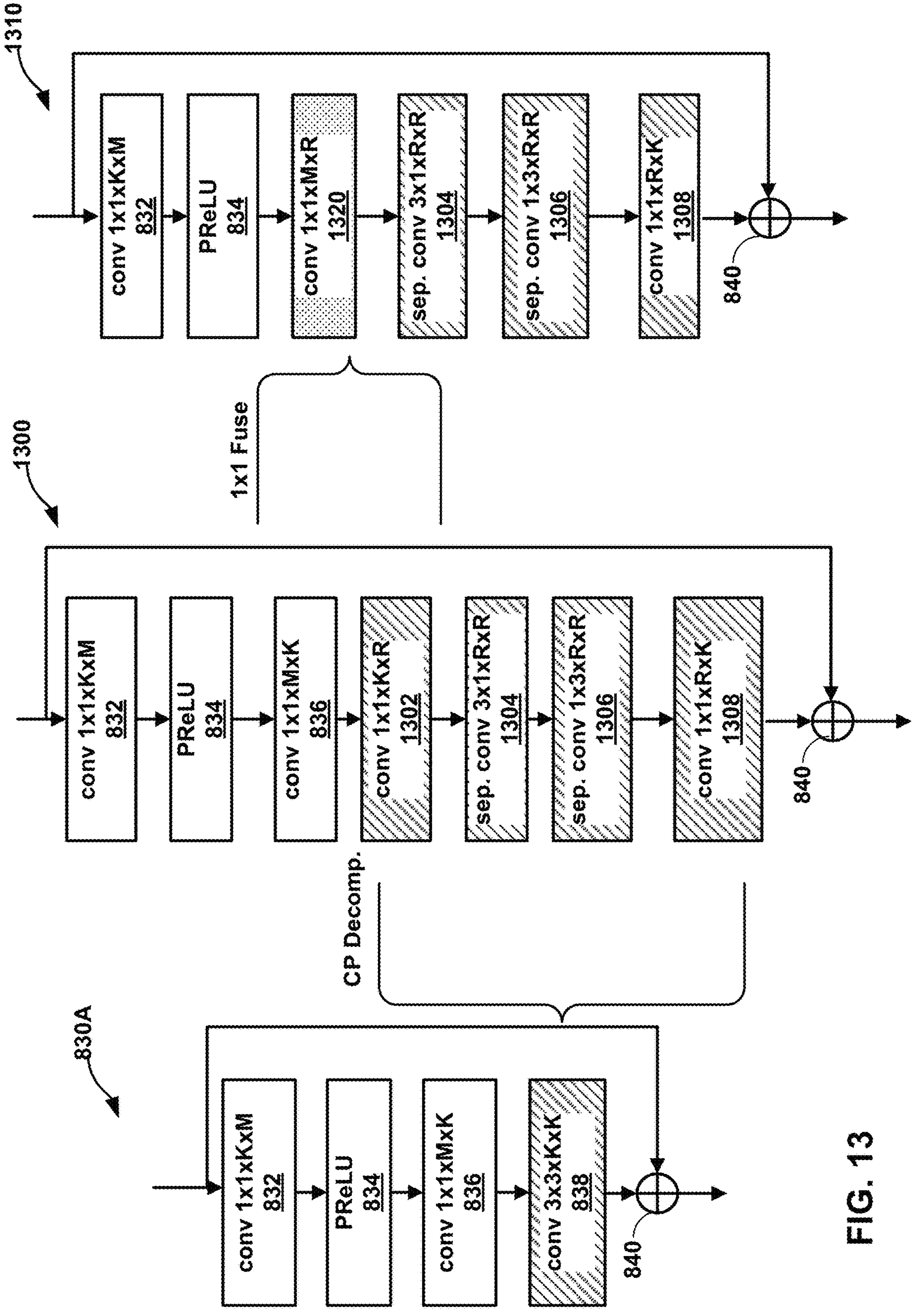
FIG. 13 is a block diagram illustrating examples of multi-dimensional convolution decomposition.

FIG. 13 shows one example of using separable convolutions to approximate a multi-dimensional convolution in a backbone block of an NN-based filter. In this example, the multi-dimensional convolution is a 2D 3×3 convolution. However, the techniques of this disclosure may be extended to convolutions of other dimensions.

FIG. 13 shows an example where the backbone block is residual block 830A from FIG. 9 and FIG. 10. FIG. 13 shows an example where the 3×3×K×K convolution 838 is decomposed into a series of 1D and separable convolutions in residual block 1300. That is video encoder 200 and video decoder 300 may be configured to perform residual block 1300 that includes performing a plurality separable convolutions to approximate a multi-dimensional convolution. In the example of FIG. 13, the plurality of separable convolutions include a 3×1×R×R separable convolution (sep. conv) 1304 and a 1×3×R×R separable convolution 1306. In other examples, the order of separable convolution 1304 and separable convolution 1306 may be switched.

Accordingly, in one example of the disclosure, to perform the plurality separable convolutions to approximate the multi-dimensional convolution, video encoder 200 and video decoder may be configured to perform a first 1×1 convolution (e.g., 1×1×K×R convolution 1302), perform a first separable convolution (e.g., 3×1×R×R separable convolution 1304) of the plurality separable convolutions on the output of the first 1×2 convolution, perform a second separable convolution (e.g., 1×3×R×R separable convolution 1306) of the plurality separable convolutions on the output of the first separable convolution, and perform a second 1×1 convolution (e.g., 1×1×R×K convolution 1308) on the output of the second separable convolution. The number of output channels of the first 1×1 convolution 1302 is used to control the complexity approximation of the multi-dimensional convolution. The number of output channels of the separable convolutions 1304 and 1306 may be selected to control the complexity approximation of the multi-dimensional convolution. The separable convolutions 1304 and 1306 are performing a depth-wise convolution operation.

In another example, to perform a plurality of separable convolutions to approximate a multi-dimensional convolution, video encoder 200 and video decoder 300 may receive an input, perform a 1×1×K×M convolution on the input, perform a PReLU layer on an output of the 1×1×K×M convolution, perform a 1×1×M×K convolution on an output of the PReLU layer; perform a 3×1×K×R separable convolution on an output of the 1×1×M×K convolution, perform a 1×3×R×K separable convolution on an output of the 3×1×K×R separable convolution, and perform a 1×1×R×K convolution on an output of the 1×3×R×R separable convolution.

In a further example, FIG. 13 shows an example where the 3×3×K×K convolution 838 is decomposed into a series of 1D and separable convolutions in residual block 1300, but where the first 1D convolution is fused with another 1D convolution. That is video encoder 200 and video decoder 300 may be configured to perform residual block 1310 that includes performing a 1×1×M×R convolution 1320 that is a fusion of a 1×1×M×K convolution (e.g., convolution 836) and a 1×1×K×R convolution (e.g., convolution 1302). In this way, the decomposition of the multi-dimensional convolution can be further simplified. The fusing of 1×1 convolution in residual block 1310 may be used in any situation where a decomposed convolution is applied before or after another pixel-wise convolution (e.g., 1×1 fusing) without any non-linearities or residual connections in between. The value of M and R may be selected to control the complexity and accuracy of the approximation.

In other examples of the disclosure, the NN-based filter process includes a cascaded (e.g., sequentially utilized) application of the backbone block. For example, the backbone block may be applied to multiple different color components. In other examples, the NN-based filter process includes a cascaded application of the backbone block applied in two or more parallel processing branches.

In one or more examples of the disclosure, performing the plurality separable convolutions to approximate the multi-dimensional convolution in a backbone block of an NN-based filter process includes applying an element-wise activation process as part of the multi-dimensional convolution. Examples of element-wise activation processes may include ReLU and PReLU functions. A PReLU function is an example of an element-wise activation process that is parametrically controlled.

Different algorithms for determining separable kernels to replace a 2D or other multi-dimensional kernels may be used to determine a decomposition. In some examples, a Candecomp/Parafac (CP) tensor decomposition can be used. Examples of other decompositions that are applicable for use with this disclosure may be found in V. Lebedev, Y. Ganin, M. Rakhuba, I. Oseledets, V. Lempitsky, Speeding up Convolutional Neural Networks Using Fine-tuned CP-Decomposition, ICLR 2015.

Alternative Implementations and Architectures:

In some examples, 2D convolutions of different dimensionality (e.g., Z×Y), or convolution components of high dimensionality, can be used and replaced with respective separable convolutions 1×Z and Y×1.

Figure 14:
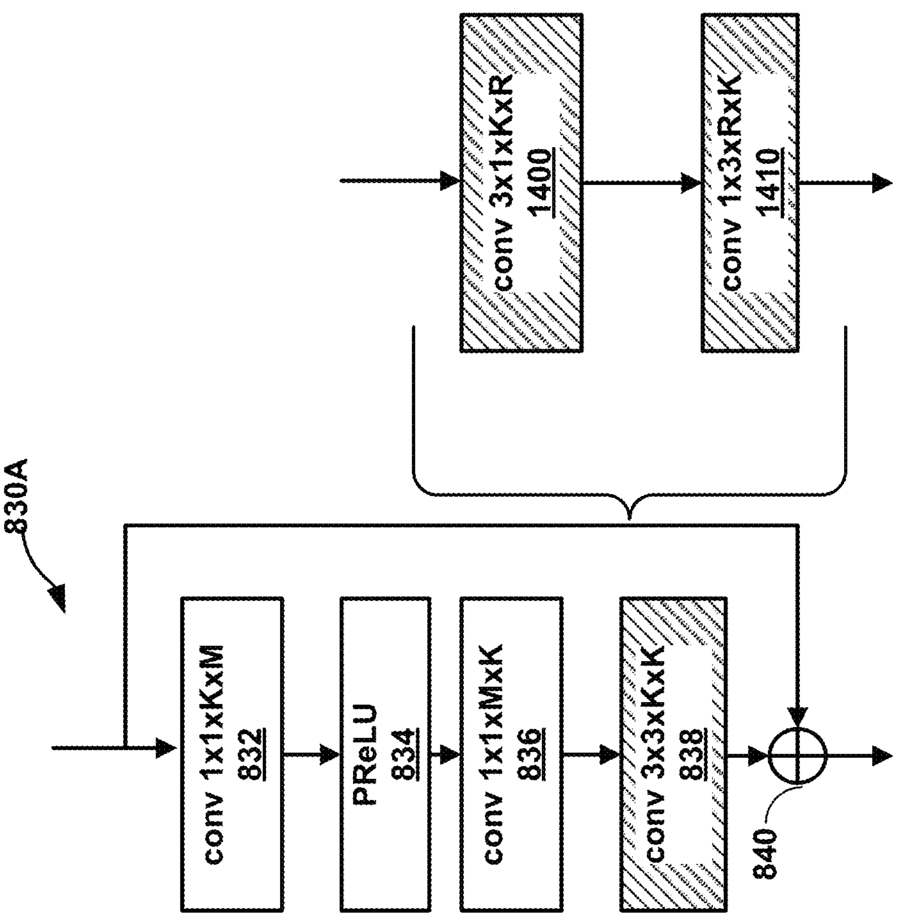
FIG. 14 is a block diagram illustrating another example of multi-dimensional convolution decomposition.

FIG. 14 is a block diagram illustrating another example of multi-dimensional convolution decomposition. As shown in FIG. 14, 3×3×K×K convolution 838 of residual block 830A is approximated by a 3×1×K×R convolution 1400 and then a 1×3×R×K convolution 1410. In other examples, the positions of convolution 1400 and convolution may be switched. R is the canonical rank of the decomposition. A lower rank implies a larger complexity reduction. Compared to the example of FIG. 13, video encoder 200 and video decoder 300 may approximate a 3×3 convolution with two separable convolutions and without performing leading or trailing 1×1 convolutions.

In one example, the architecture of FIG. 10 with decomposition illustrated in FIG. 14, is implemented with parameters K=64, M=160 and R=51, and total number of 24 residual blocks results in the complexity of the network is 356.43kMAC and the number of parameters is 1.07M for the intra luma model.

Figure 15:
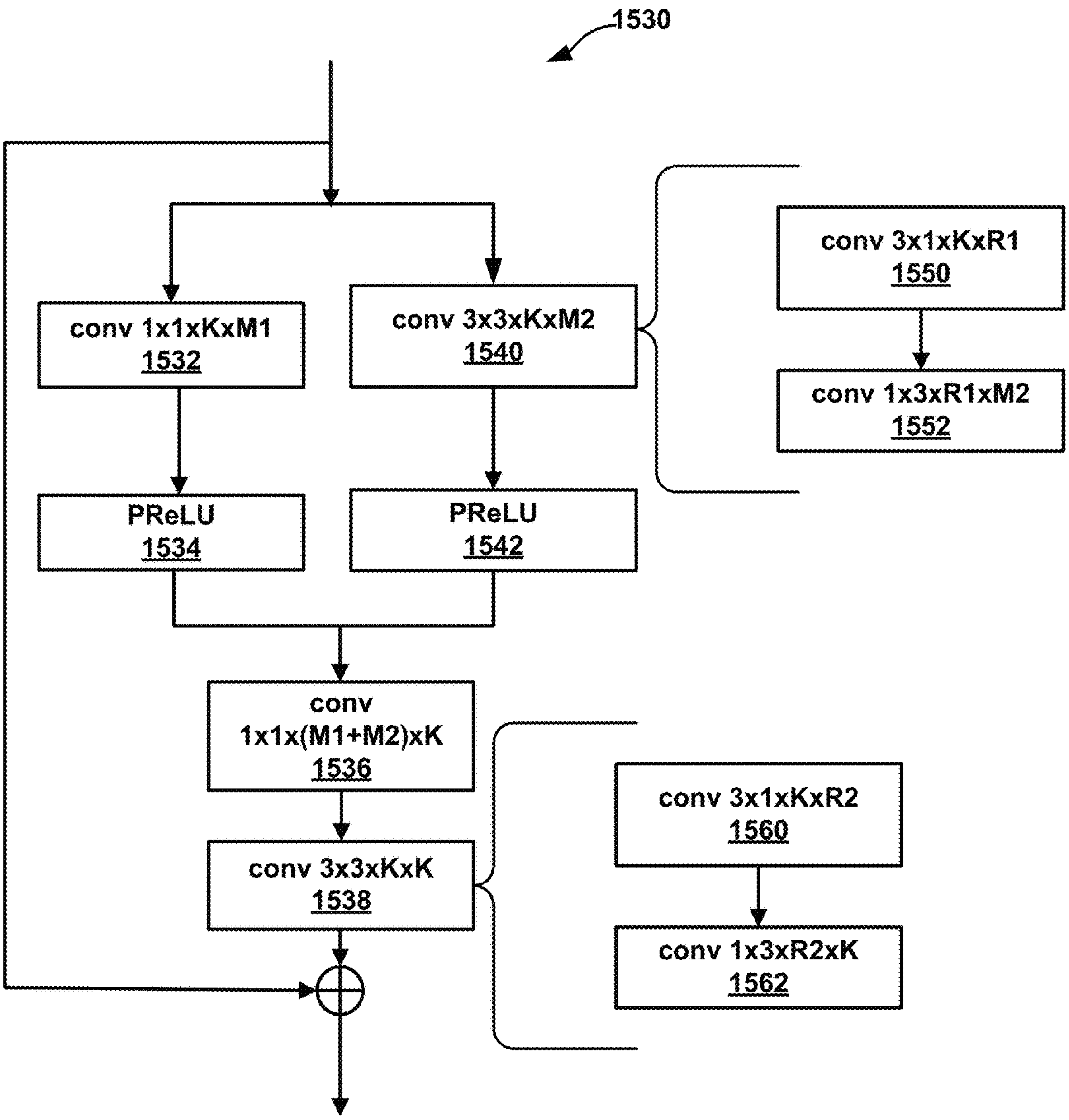
FIG. 15 is a block diagram illustrating an example of a multiscale feature extraction backbone network with the two-component convolution.

Multi-Mode CNN ILF with Two-Component Decomposition for Multiscale Feature Extraction A multiscale feature extraction with a two-component convolution network has also been proposed, which is illustrated in FIG. 15. In FIG. 15, the 3×3 convolutions are decomposed into a 3×1×C1×R convolution and followed by a 1×3×R×C2 convolution, where C1 and C2 are the number of input and output channels, respectively, and R is the rank of the approximation. The parameter R can be made proportional to R=C1×C2/(C1+C2) and controls the complexity of the approximation.

FIG. 15 shows a proposed architecture with 3×3 convolution blocks being replaced by separable convolutions of dimensions 3×1 and 1×3. In this example, residual block structure 1530 includes first 1×1 convolution 1532 before a first activation layer (PReLU 1534) and, in parallel with the first 1×1 convolution 1532 and PReLU 1534, a 3×3 convolution 1540 and a second activation layer (PReLU 1542). A second 1×1 convolution 1536 then processes the combined output of PReLU 1534 and PReLU 1542, followed by 3×3 convolution 1538. In the example of FIG. 15, 3×3 convolution 1540 may be approximated using a plurality of separable convolutions, shown as 3×1 convolution 1550 and 1×3 convolution 1552 in FIG. 15. Similarly, 3×3 convolution 1538 may be approximated using a plurality of separable convolutions, shown as 3×1 convolution 1560 and 1×3 convolution 1562 in FIG. 15.

As an example, the architecture illustrated in FIG. 15 can be implemented with parameters R1=8, R2=44, M1=160 and M2=16, and total number of 24 residual blocks, the complexity of the network will be 358.43 kMAC and the number of parameters is 1.07M for the intra luma model.

Unified CNN ILF with the Two-Component Decomposition

The multiscale feature extraction backbone with the two-component decomposition has been integrated into the unified model some examples. In addition, the specification of such an example may include two versions of the model, which are 1) a unified model for joined luma and chroma (see FIGS. 16A and 16B) and 2) separate models for luma and chroma samples, respectively (see FIGS. 17 and 18).

Figure 16A:
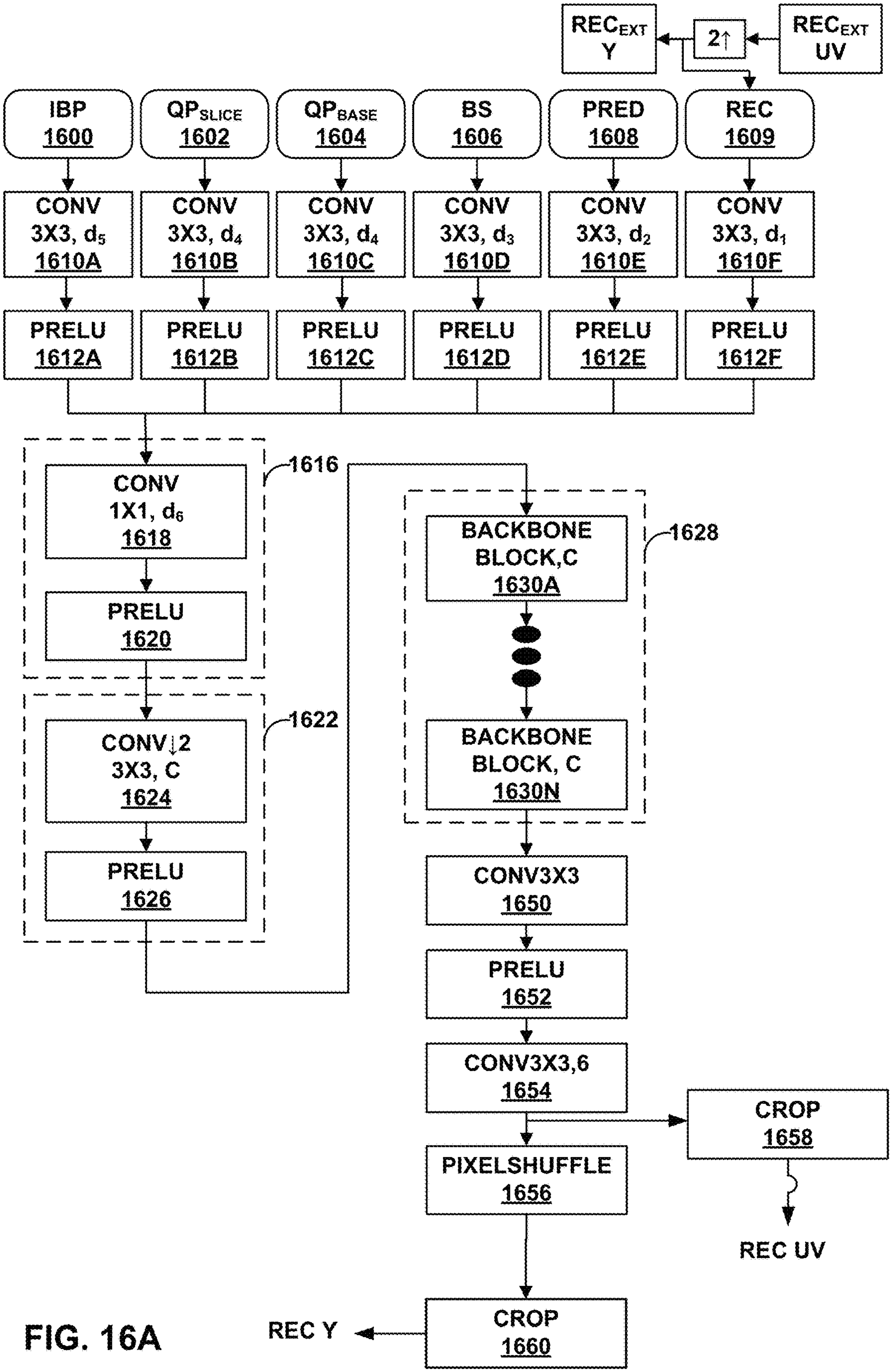
FIG. 16A is a block diagram illustrating an example of a unified filter with a joined model (joined luma and chroma).

FIG. 16A is a block diagram illustrating an example unified filter with a joined model (joined luma and chroma). The NN-based filter of FIG. 16A may include IPB 1600 (which provides information regarding whether a block is inter or intra predicted), $QP_{SLICE}$ 1602 (which provides a quantization parameter for a slice), $QP_{BASE}$ 1604 (which provides a quantization parameter for the sequence), boundary strength (BS) 1606, prediction samples (PRED) 1608, and reconstruction samples (REC) 1609. Reconstruction samples 1609 include both luma samples ($REC_{EXT}$ Y) and two-times upsampled chroma samples ($REC_{EXT}$ UV). Video encoder 200 and video decoder 300 may apply a corresponding 3×3 convolution of 3×3 convolutions 1610A-1610F to each of the inputs. Video encoder 200 and video decoder 300 may apply a corresponding PReLU of PReLUs 1612A-1612F to the outputs of 3×3 convolutions 1610A-1610F. In some examples, the backbone blocks 1630A-1630N may be residual blocks.

Fusion block 1616 may fuse the feature maps using 1×1 convolution 1618 and PReLU 1620. Transition block 1622 then processes the fused data using 3×3 convolution 1624 and PReLU 1626.

Video encoder 200 and video decoder 300 may apply a set of backbone blocks 1628. Set of backbone block 1628 may include a plurality of backbone blocks 1630A-1630N. In some examples, N=24, such that there are 24 backbone blocks. Video encoder 200 and video decoder 300 may apply 3×3 convolution 1650 to the output of backbone blocks 1628. Video encoder 200 and video decoder 300 may apply PReLU 1652 to the output of 3×3 convolution 1650 and may apply 3×3 convolution 1654 to the output of PReLU 1652. Video encoder 200 and video decoder 300 may crop 1658 the output of 3×3 convolution 1654 to generate filtered reconstructed UV(REC UV) samples of the picture. Video encoder 200 and video decoder 300 may perform a pixel shuffle 1656 on the output of 3×3 convolution 1654 and crop 1660 the output of pixel shuffle 1656 to generate filtered reconstructed Y samples (REC Y) of the picture. For example, pixel shuffle 1656 may upsample its input such that the output of pixel shuffle 1656 has a size of w*2, h*2, c/4, where w is the width, h is the input height and c is the input number of channels of the input to pixel shuffle 1556. In some examples, the parameters of the example of FIG. 16A include one or more of: $d_1$=192, $d_2$=32, $d_3$=16, $d_4$=16, $d_5$=16, C=64, and $d_6$=48.

Figure 16B:
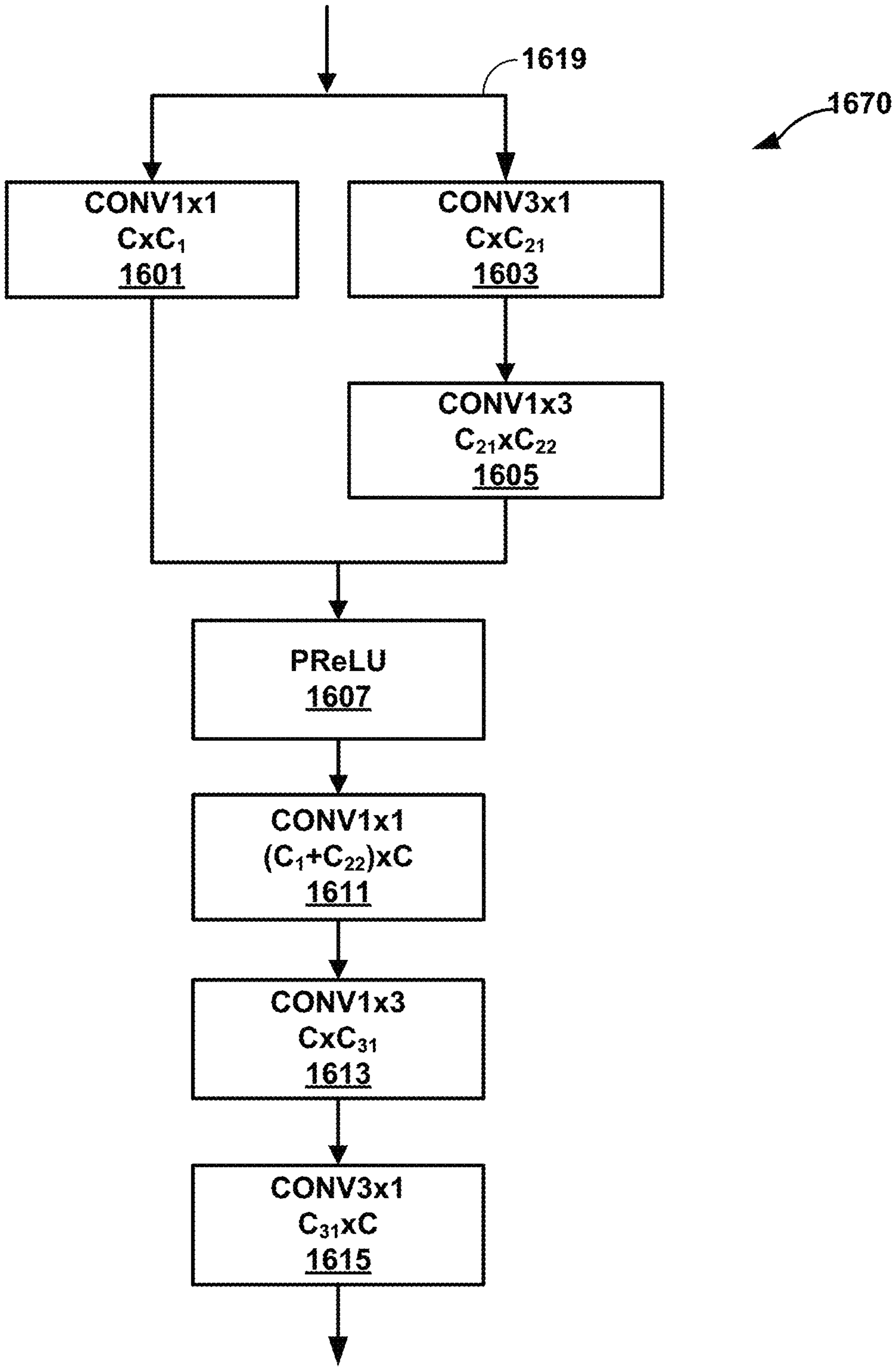
FIG. 16B is a block diagram illustrating an example backbone block of FIG. 16A.

FIG. 16B is a block diagram illustrating an example backbone block. Backbone block 1670 of FIG. 16B may be an example of any of backbone blocks 1630A-1630N. Backbone block 1670 may include a multiscale branch 1619 where convolutions are performed in parallel. For example, a 1×1 convolution 1601 may be performed in parallel with a 3×1 convolution 1603 followed by a 1×3 convolution 1605. Multiscale branch 1619 may perform multiscale feature extraction.

Video encoder 200 and video decoder 300 may apply a PReLU 1607 to the output multiscale branch 1619. Video encoder 200 and video decoder 300 may apply a 1×1 convolution 1611 to the output of PReLU 1607. Video decoder 300 may apply a 1×3 convolution 1613 to the output of 1×1 convolution 1611. Video decoder 300 may apply a 3×1 convolution 1615 to the output of 1×3 convolution 1613. In some examples, the parameters of the example of FIG. 16 include C=64, C1=160, C21=32, C22=32, and C31=64.

Figure 17:
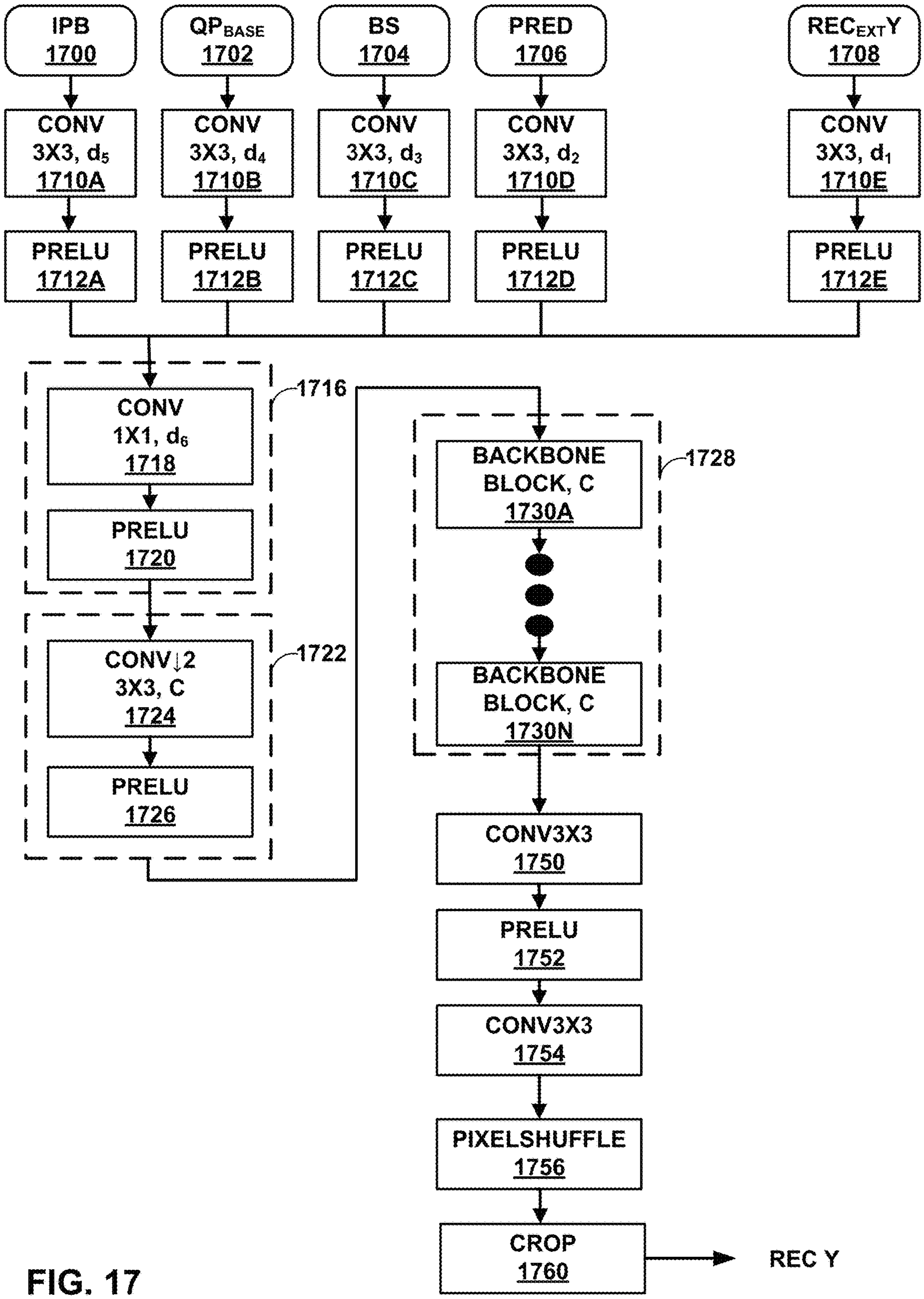
FIG. 17 is a block diagram illustrating an example of a unified filter with separate luma/chroma models (luma).

FIG. 17 is a block diagram illustrating example unified filter with separate luma and chroma models. In particular, FIG. 17 shows an example model for luma samples. The NN-based filter of FIG. 17 may include IPB 1700, $QP_{BASE}$ 1702, BS 1704, PRED 1706, and reconstructed luma samples ($REC_{EXT}Y$) 1708. Video encoder 200 and video decoder 300 may apply corresponding 3×3 convolution of 3×3 convolutions 1710A-1710E to each of the inputs. Video encoder 200 and video decoder 300 may apply a corresponding PReLU of PReLUs 1712A-1712E to the outputs of 3×3 convolutions 1710A-1710E.

Fusion block 1716 may fuse the feature maps using 1×1 convolution 1718 and PReLU 1720. Transition block 1722 then processes the fused data using 3×3 convolution 1724 and PReLU 1726.

Video encoder 200 and video decoder 300 may apply a set of backbone blocks 1728. Backbone blocks 1728 may include a plurality of backbone blocks 1730A-1730N. In some examples, N=20, such that there are 20 filter blocks. Video encoder 200 and video decoder 300 may apply 3×3 convolution 1750 to the output of set of backbone blocks 1728 and may apply PReLU 1752 to the output of 3×3 convolution 1750. Video encoder 200 and video decoder 300 may apply 3×3 convolution 1754 to the output of PReLU 1752. Video encoder 200 and video decoder 300 may perform a pixel shuffle 1756 on the output of 3×3 convolution 1754 and crop 1760 the output of pixel shuffle 1756 to generate filtered reconstructed luma (REC Y) samples of the picture.

One or more of backbone blocks 1730A-1730N of set of backbone blocks 1728 may be examples of backbone block 1670 of FIG. 16B. In some examples, the parameters of the example of FIG. 17 together with the example of FIG. 16B may include one or more of: $d_1$=192, $d_2$=32, $d_3$=16, $d_4$=16, $d_5$=16, C=64, $C_1$=160, $C_{21}$=32, $C_{22}$=32, $C_{31}$=64, N=20, and $d_6$=48.

The parameters $d_1$, $d_2$, $d_3$, $d_4$, and $d_5$ indicate the number channels (e.g., features) trained for each convolution from respective input data. For example, a $d_1$ number of channels in backbone block 1710E (e.g., 3×3 convolution) is applied to a block of reconstructed pixels (E.g., $REC_{EXT}Y$ 1708). The parameter C is the number of channels produced as output of a Fusion/Transition block. C may also be used as a number of channels for backbone block (e.g. backbone block may have an input number of channels C). Parameters $C_1$, $C_{21}$, $C_{22}$, and $C_{31}$ are the number of channels at specific modules within backbone block, as shown in the FIGS. The parameter N is the number of backbone blocks.

Figure 18:
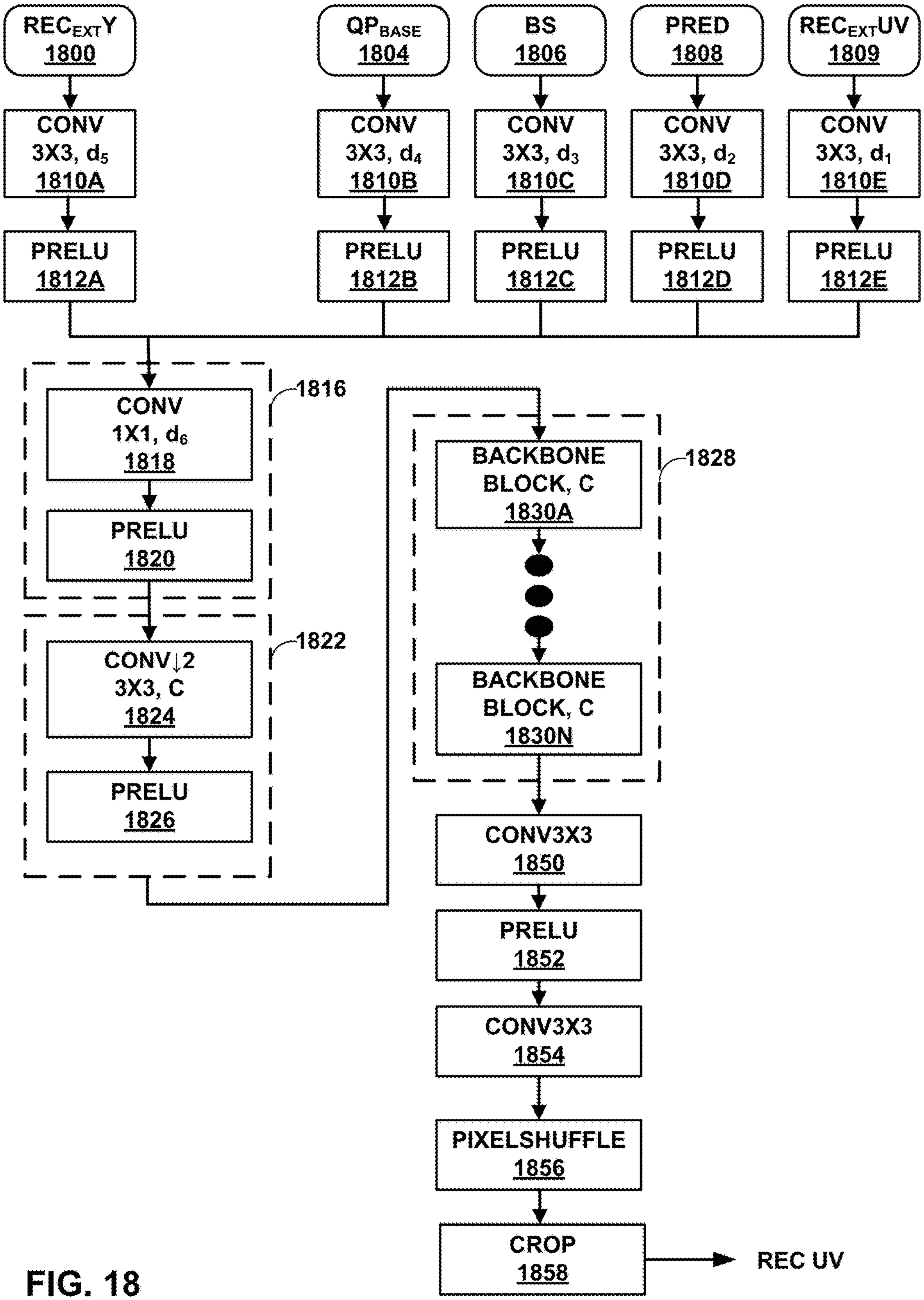
FIG. 18 is a block diagram illustrating an example of a unified filter with separate luma/chroma models (chroma).

FIG. 18 is a block diagram illustrating an example unified filter with separate luma and chroma models (chroma). In particular, FIG. 18 shows an example model for chroma (UV) samples. Inputs for the NN-based filter of FIG. 18 may include $REC_{EXT}Y$ 1800, which may be downsampled by a factor of 2, $QP_{BASE}$ 1804, BS 1806, PRED 1808, and reconstructed chroma samples ($REC_{EXT}UV$) 1809. Video encoder 200 and video decoder 300 may apply a corresponding 3×3 convolution of 3×3 convolutions 1810A-1810E to each of the inputs. Video encoder 200 and video decoder 300 may apply a corresponding PReLU of PReLUs 1812A-1812E to the outputs of 3×3 convolutions 1810A-1810E.

Fusion block 1816 may fuse the feature maps using 1×1 convolution 1818 and PReLU 1820. Transition block 1822 then processes the fused data using 3×3 convolution 1824 and PReLU 1826.

Video encoder 200 and video decoder 300 may apply a set of backbone blocks 1828. Backbone blocks 1828 may include a plurality of backbone blocks 1830A-1830N. In some examples, N=16, such that there are 16 backbone blocks. Video encoder 200 and video decoder 300 may apply 3×3 convolution 1850 to the output of set of backbone blocks 1828. Video encoder 200 and video decoder 300 may apply PReLU 1852 to the output of 3×3 convolution 1850. Video encoder 200 and video decoder 300 may apply 3×3 convolution 1854 to the output of PReLU 1852. Video encoder 200 and video decoder 300 may perform a pixel shuffle 1856 on the output of 3×3 convolution 1854 and crop 1860 the output of pixel shuffle 1856 to generate filtered reconstructed chroma (REC UV) samples of the picture.

One or more of backbone blocks 1830A-1830N of set of backbone blocks 1828 may use the backbone block architecture of FIG. 16B. In some examples, the parameters of the example of FIG. 18 together with FIG. 16B may include one or more of: $d_1$=192, $d_2$=32, $d_3$=16, $d_4$=16, $d_5$=16, C=64, $C_1$=160, $C_{21}$=32, $C_{22}$=32, $C_{31}$=64, N=16, and $d_6$=48.

Low Complexity ILF Architecture

Figure 19A:
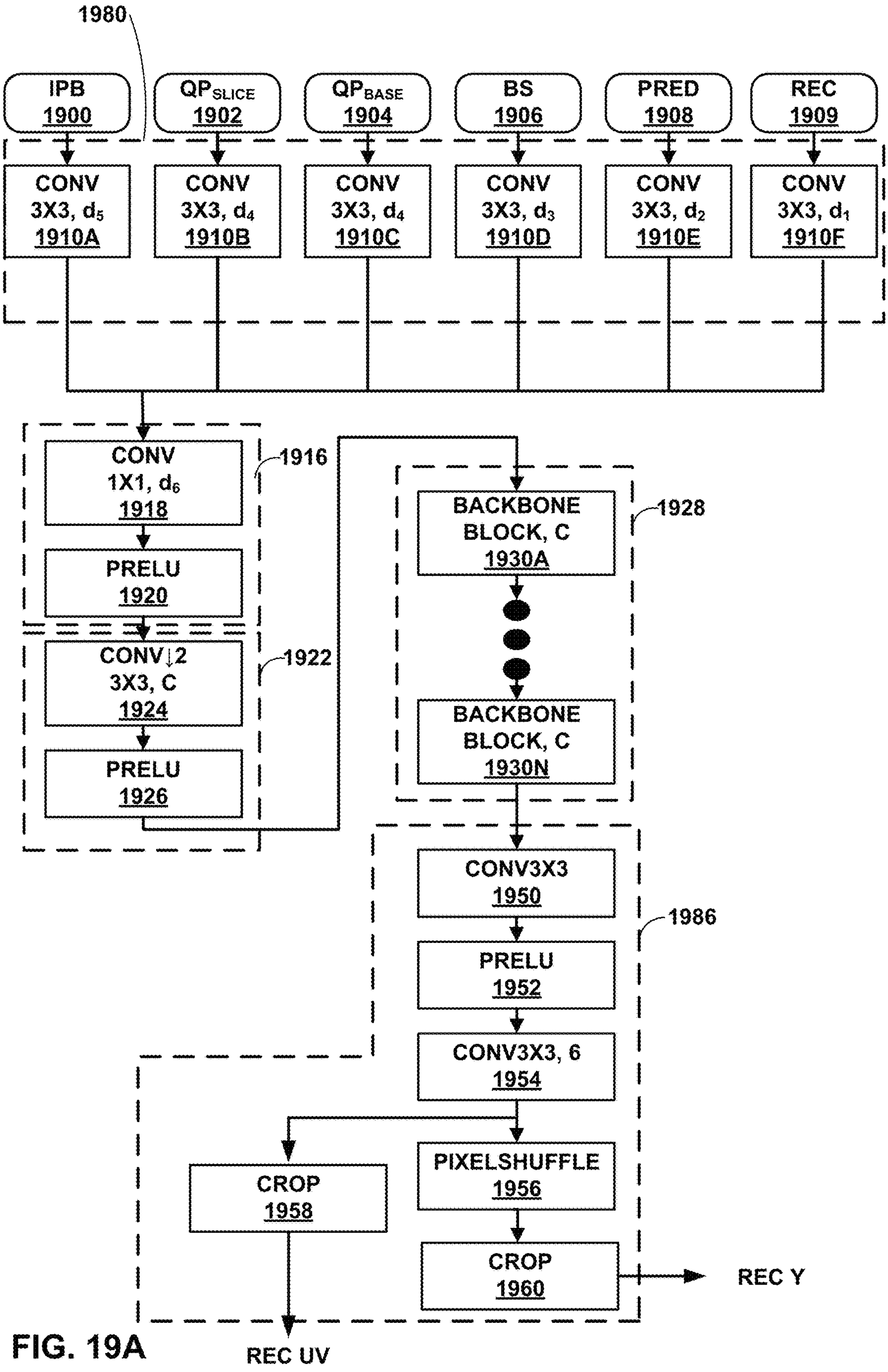
FIG. 19A is a block diagram illustrating an example of a low complexity in-loop filter architecture.

To achieve a complexity level less than 20kMAC/pixel and preserve large part of coding performance, an alternative Unified Filter architecture with Canonical Polyadic (CP) decomposition with separable convolution, applied to replace the 3×3 convolution in the backbone network, has been proposed and is shown in FIG. 19A. In particular, FIG. 19A shows an example of the proposed architecture and example of the parameters, such as number of input, features, channels and number of residue block. The complexity is 19.55 kMAC for the given configuration.

The architecture of FIG. 19A may be used to implement a low-complexity in-loop filter for joined YCbCr 4:2:0 processing. The example of FIG. 19A is also applicable for separate components Y,CbCr processing. The example of FIG. 19A may be a unified filter. A unified filter may include a filter having at least one quality input, such as a QP input, such that the filter may be used to handle different quality levels. As can be seen from FIG. 19A, the unified filter has both a $QP_{SLICE}$ 1902 input and $QP_{BASE}$ 1904 input. A unified NN-based filter, such as that of FIG. 19A, may be trained using various image and/or video data at varying levels of quality.

The architecture of FIG. 19A includes head block 1980, transition block 1922, set of one or more backbone blocks 1928, and tail block 1986. Inputs to head block 1980 include IPB 1900, $QP_{SLICE}$ 1902, $QP_{BASE}$ 1904, BS 1906, PRED 1908, and REC 1909. Reconstruction samples (REC) 1909 may include both luma samples ($REC_{EXT}$ Y) and two-times upsampled chroma samples ($REC_{EXT}$ UV).

Head block 1980 includes the blocks of the filter of FIG. 19A prior to the fusion block 1916. Head block 1980 includes 3×3 convolutions 1910A-1910F, which are applied to corresponding inputs and may extract feature maps from the inputs.

Fusion block 1916 may fuse the feature maps using 1×1 convolution 1918 and PReLU 1920. Transition block 1922 may include blocks occurring after fusion block 1916 and before any backbone or filter blocks (e.g., before backbone blocks 1930A-1930N). Transition block 1922 processes the fused data using 3×3 convolution 1924 and PReLU 1926. Set of backbone blocks 1928 may include backbone blocks 1930A-1930N. In some examples, backbone blocks 1930A-1930N may provide filtering functions of the filter of FIG. 19A. In some examples, backbone blocks 1930A-1930N may be located after transition block 1922 and prior to tail block 1986.

Tail block 1986 may include the blocks of the filter of FIG. 19A after all the backbone blocks or filter blocks (e.g., after backbone blocks 1930A-1930N). Tail block 1986 may include a 3×3 convolution 1950, a PReLU 1952, a 3×3 convolution 1954, a crop unit 1958, a pixel shuffle unit 1956, and a crop unit 1960.

An example architecture and example of the parameters, such as number of inputs, features, channels and number of residue block is shown in FIG. 19A. In some examples, the parameters for the example of FIG. 19A include one or more of: $d_1$=12, $d_2$=8, $d_3$=4, $d_4$=2, $d_5$=2, C=24, N=11, and $d_6$=24. The complexity of the architecture shown in FIG. 19A is on the order of 19.55 kMAC.

Figure 19B:
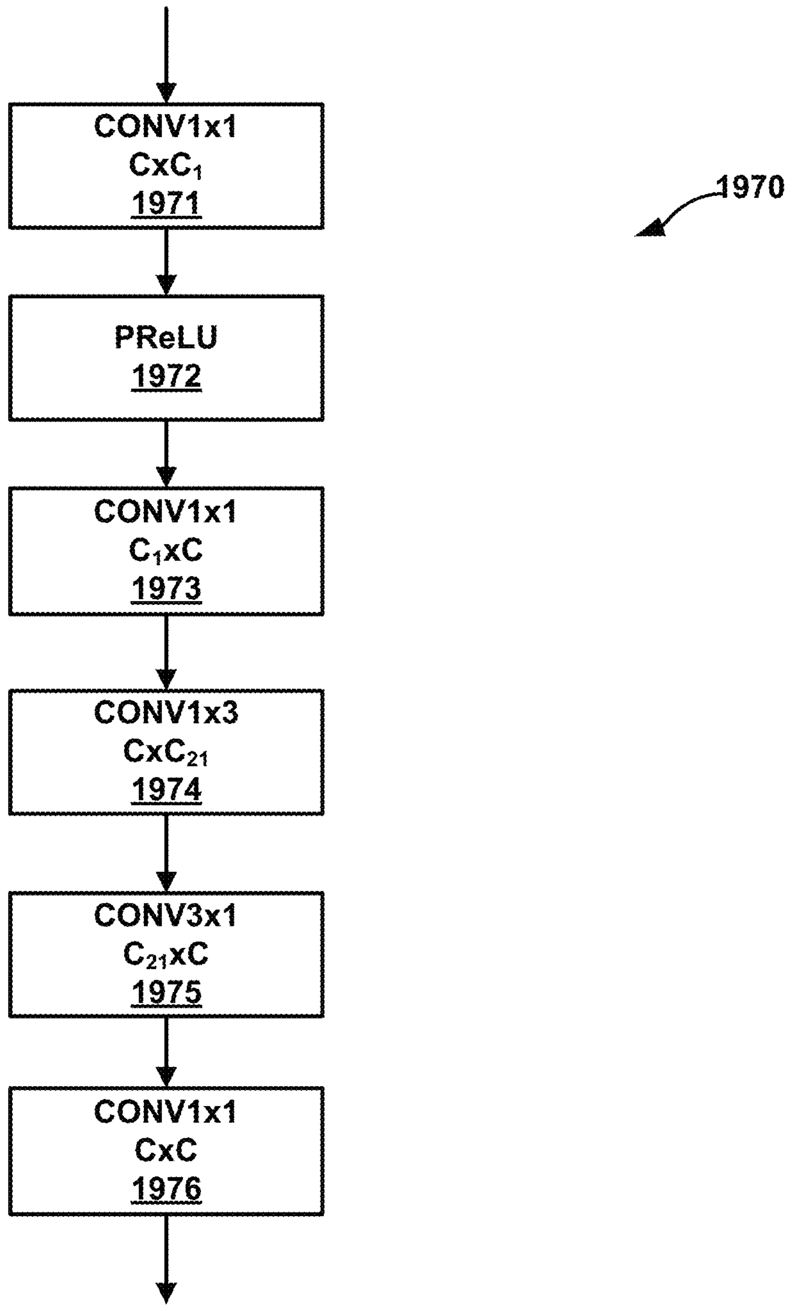
FIG. 19B is a block diagram illustrating an example backbone block of FIG. 19A.

FIG. 19B is a block diagram illustrating an example backbone block of FIG. 19A according to one or more aspects of this disclosure. Backbone block 1970 may be an example of any of backbone blocks 1930A-1930N of FIG. 19A. Backbone block 1970 differs from backbone block 1670 of the UF shown in FIG. 16B, in that backbone block 1970 does not include a multiscale branch like backbone block 1670 and that the multidimensional convolution replaced by the convolutions 1611, 1613, and 1615, are replaced by a CP decomposition in backbone block 1970. Backbone block 1970 includes a 1×1 convolution 1971 and PReLU 1972. The CP decomposition in backbone block 1970 includes a 1×1 convolution 1973, a 1×3 convolution 1974*a* 3×1 convolution 1975, and a 1×1 convolution 1976. In some examples, the parameters of FIG. 19B are C=24, C1=72, and C21=24.

Figure 19C:
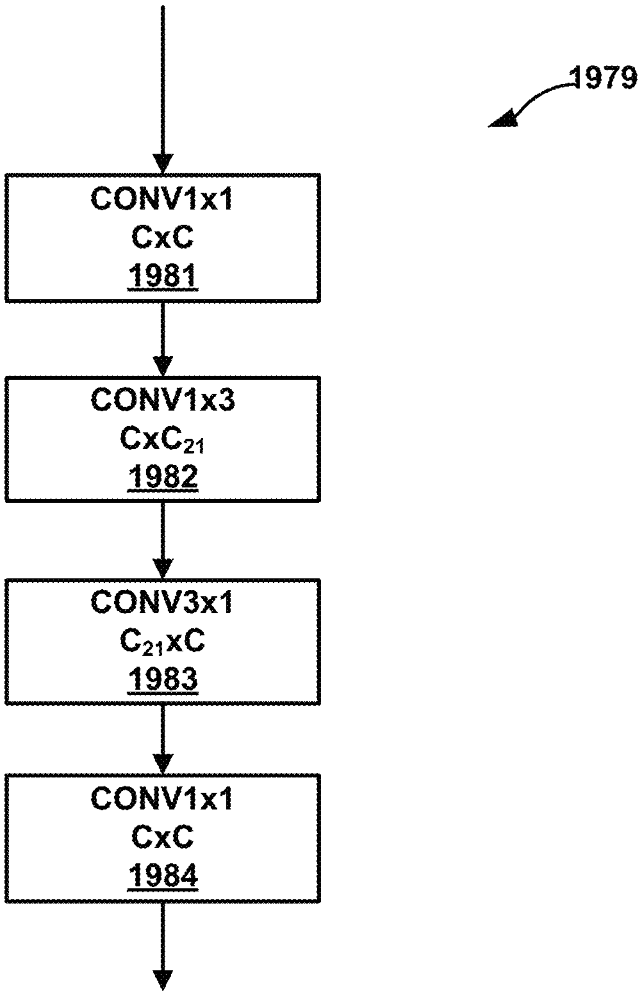
FIG. 19C is a block diagram illustrating an example CP decomposition for a 3×3 convolution of FIG. 19A.

FIG. 19C is a block diagram illustrating an example CP decomposition of a 3×3 convolution of FIG. 19A according to one or more aspects of this disclosure. CP decomposition 1979 may include a 1×1 convolution 1981, a 1×3 convolution 1982, a 3×1 convolution 1983, and a 1×1 convolution 1984. For example, CP decomposition 1979 may replace 3×3 convolution 1950 of tail block 1986. In some examples, the parameters of FIG. 19C are C=24, C1=72, and C21=24.

Figure 20A:
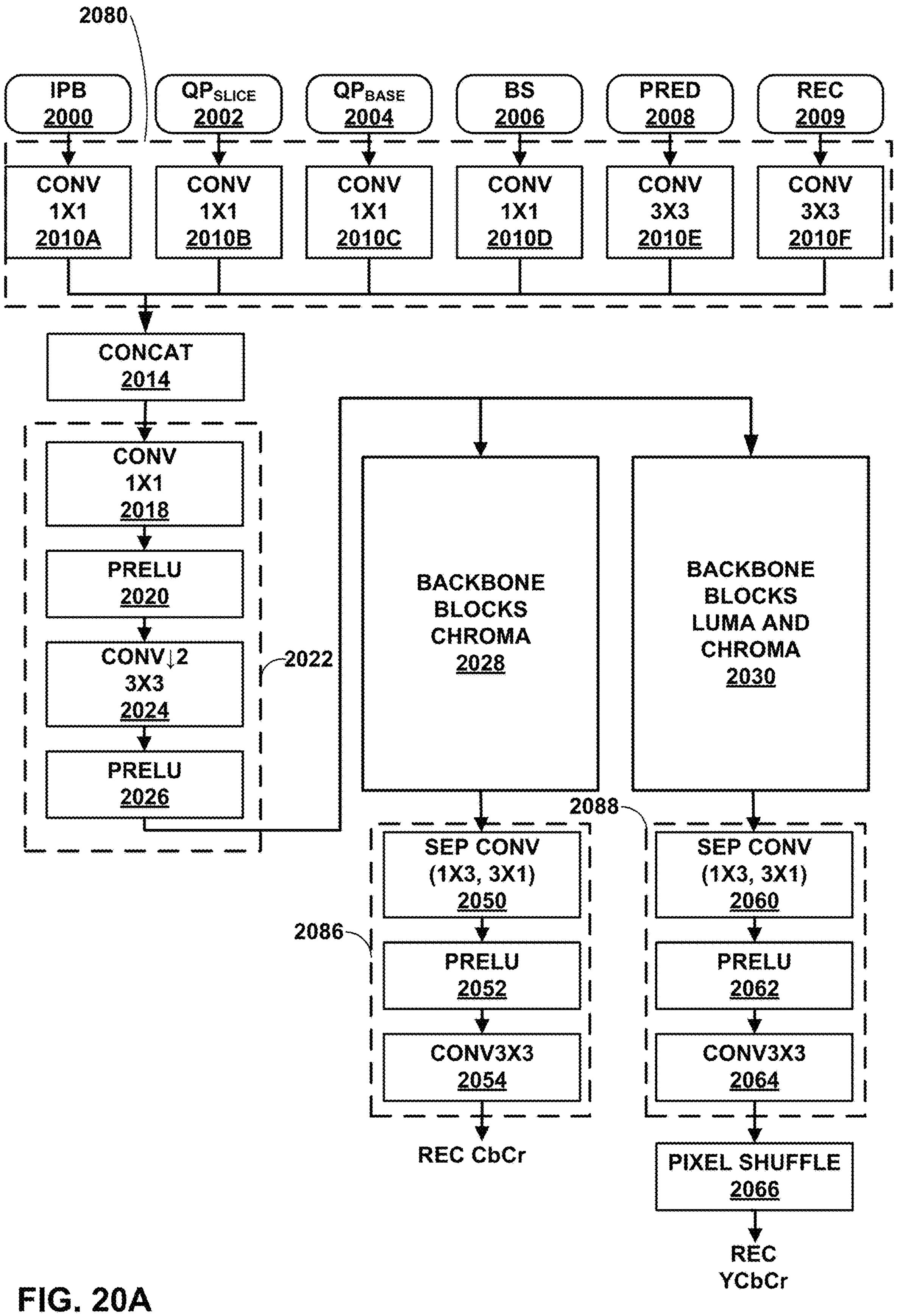
FIG. 20A is a block diagram illustrating an example of a low complexity in-loop filter architecture with luma/chroma split.

FIG. 20A is a block diagram illustrating an example of a low complexity in-loop filter architecture with luma/chroma split. In FIG. 20A, the processing branch is split into separate luma and chroma branches, which allows for better balance of luma/chroma performance.

The architecture of FIG. 20A includes head block 2080, fusion block 2022, one or more backbone blocks for chroma 2028, one or more backbone blocks for luma and chroma 2030, tail block 2086, and tail block 2088. Inputs to head block 2080 include IPB 2000, $QP_{SLICE}$ 2002, $QP_{BASE}$ 2004, BS 2006, PRED 2008, and REC 2009 (e.g., both luma and chroma reconstructed samples).

Head block 2080 includes the blocks of the filter of FIG. 20A prior to concatenation 2014. Head block 2080 includes 1×1 convolutions 2010A-2010D and 3×3 convolutions 2010E-2010F, which are applied to corresponding inputs.

Fusion block 2022 may fuse the feature maps generated by head block 2080 using 1×1 convolution 2018 and PReLU 2020. Fusion block 2022 may also process the output of PReLU 2020 by applying 3×3 convolution 2024 and PReLU 2026. One or more backbone blocks for chroma 2028 may provide filtering functions of the filter of FIG. 20A for chroma samples. One or more backbone blocks for luma and chroma 2030 may provide filtering functions of the filter of FIG. 20A for both luma and chroma samples together.

Tail block 2086 may include blocks of the filter of FIG. 20A after the backbone blocks (e.g., one or more backbone blocks for chroma 2028 and one or more backbone blocks for luma and chroma 2030). Tail block 2086 may include a separable convolution 2050, which may include a 1×3 and a 3×1 convolution, PReLU 2052, and a 3×3 convolution 2054. Tail block 2088 may include a separable convolution 2060, which may include a 1×3 and a 3×1 convolution, PReLU 2062, and a 3×3 convolution 2064. The output of tail block 2088 may be input to a pixel shuffle unit 2066.

Figure 20B:
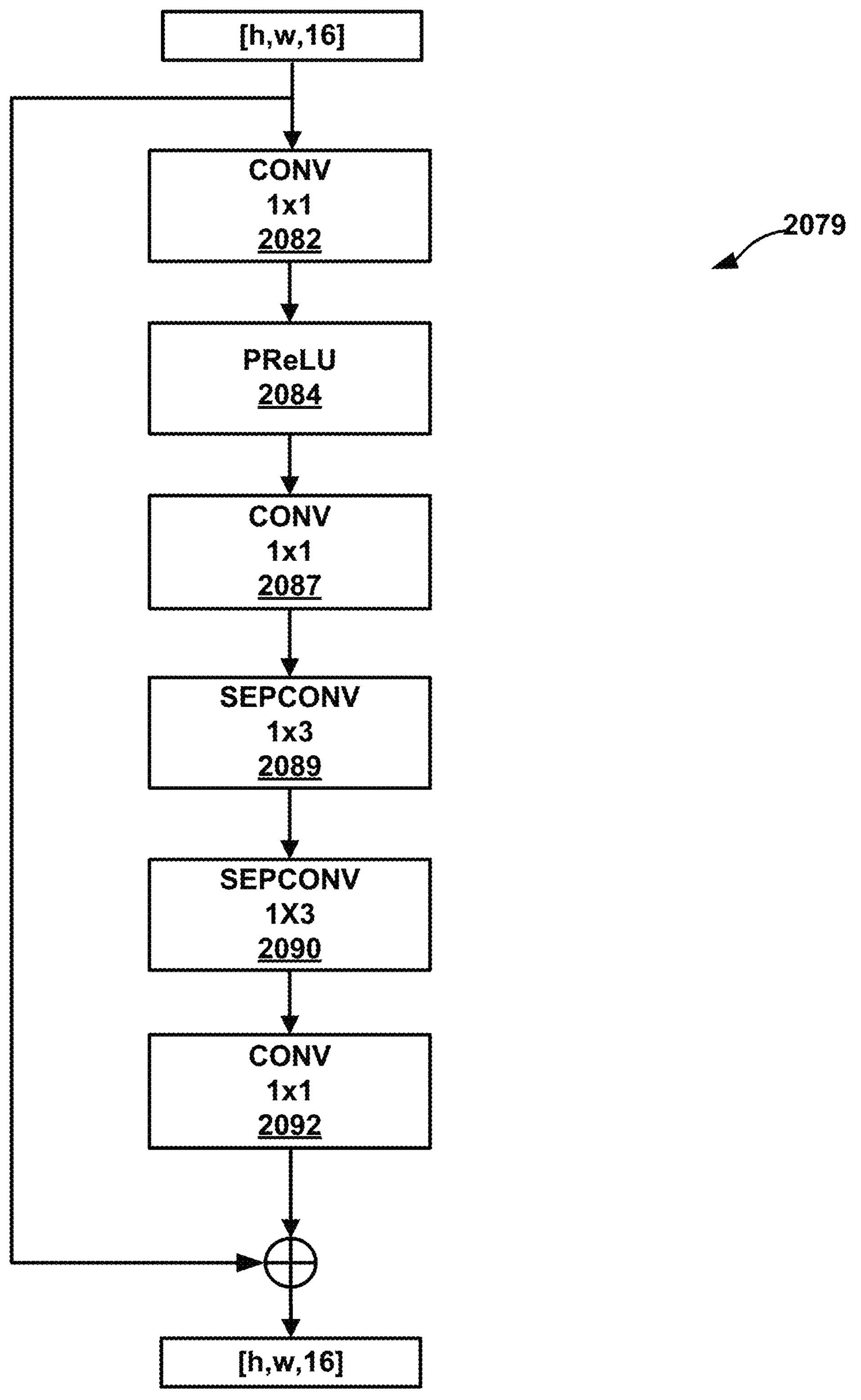
FIG. 20B is an example backbone block of FIG. 20A according to one or more aspects of this disclosure.

FIG. 20B is an example backbone block of FIG. 20B according to one or more aspects of this disclosure. Backbone block 2079 may be an example of a backbone block of one or more backbone blocks for chroma 2028 and/or one or more backbone blocks for luma and chroma 2030 of FIG. 20A. Backbone block 2079 includes a 1×1 convolution 2082, PReLU 2084, a 1×1 convolution 2087, a 1×3 separable convolution 2089, a 3×1 separable convolution 2090, and a 1×1 convolution 209. In some examples, the parameters of FIG. 20B are C=24, $C_1$=72, and $C_{21}$=24.

Problem

The low complexity Unified Filter (UF) architectures shown in FIGS. 19A, 19B, 19C, 20A, and 20B, generally provide a good complexity-performance tradeoff at the complexity range 15-500 kMAC/pixel. Targeting even lower complexity (e.g., in the range of 1-5kMAC/pixel), may be achieved with a significantly reduced number of backbone blocks (e.g., down to 4 backbone blocks for luma samples and one backbone block for chroma sample). However, this number of layers in the backbone blocks does not provide the enough spatial filter support (reach range) for most applications.

Spatial filter support refers to the active size or area that filter covers on the input data. The spatial filter support may be defined by the dimensions of the filter (e.g., a 3×3 filter has a spatial support of 3×3). The spatial filter support determines how much of the input the filter examines at once, impacting the granularity of features the filter can process. The spatial filter support also refers to the maximum of the tap length. The reach range describes how far the effect of a filter can propagate through layers of the network. While spatial filter support is related to a single layer of the network, reach range considers the cumulative effect of applying filters across multiple layers.

It was also noticed, that at the level of 1kMAC/pixel, the complexity of the fusion block, which may employ multi-dimensional non-separable 3×3 convolution, contributes up to 40% of total complexity.

EXAMPLES

To improve the complexity-performance tradeoff at very low complexity ranges (e.g., 1 kMAC-10 kMAC/pixel), alternative ILF architectures are described below. The following describes example architectures of backbone blocks and fusion blocks, as well as example parameter configurations. Each of the examples below may be used alone, or in combination with each other.

Low Complexity Backbone Block

First, a low complexity backbone block architecture is described. The examples of backbone block architectures shown in FIGS. 21A-C and FIGS. 22A-C may be used in place of any of the backbone blocks described in the FIGS. above. As two examples, any of the backbone block architectures shown in FIGS. 21A-C and FIGS. 22A-C may be used in place of backbone blocks 1930A-1930N of FIG. 19A, or may be used in place of backbone blocks 2028 or backbone blocks 2038 of FIG. 20A.

In general, in accordance with the techniques of this disclosure, the complexity of a backbone block is reduced by resampling a multi-dimensional separable transform implementation. To resample the multi-dimensional separable transform implementation, a multi-dimensional 3×3 convolution is simplified into a 3-component one-dimensional (1D) decomposition. Since 3-stage decompositions employ feature reduction (e.g., one convolution layer outputs C1 channels, which is less than the input of C channels), the techniques of this disclosure use an alternating order decomposition through a pair of backbone blocks. That is, a single backbone block comprises a backbone block pair (e.g., a first backbone block and a second backbone block). In general, the backbone blocks described below in FIGS. 21A-C and FIGS. 22A-C are part of an NN-based filter and include a pair of backbone blocks, each of the pair of backbone blocks comprising a three component 1D decomposition of a multi-dimensional convolution, wherein the 1D decomposition includes at least one layer with feature channel reduction.

In one example, the first backbone block in the pair may first use a 1×3 convolution with feature reduction (e.g., having C1 outputs), and then follows with a 3×1 convolution with feature expansion (e.g., back to C outputs). The second backbone in this pair will use an inverse horizontal/vertical decomposition. In one example, the activation layer, e.g. a PReLU layer, may be applied at the last stage of the decomposition. An example of the proposed low-complexity backbone block is shown in FIG. 21A.

Figure 21A:
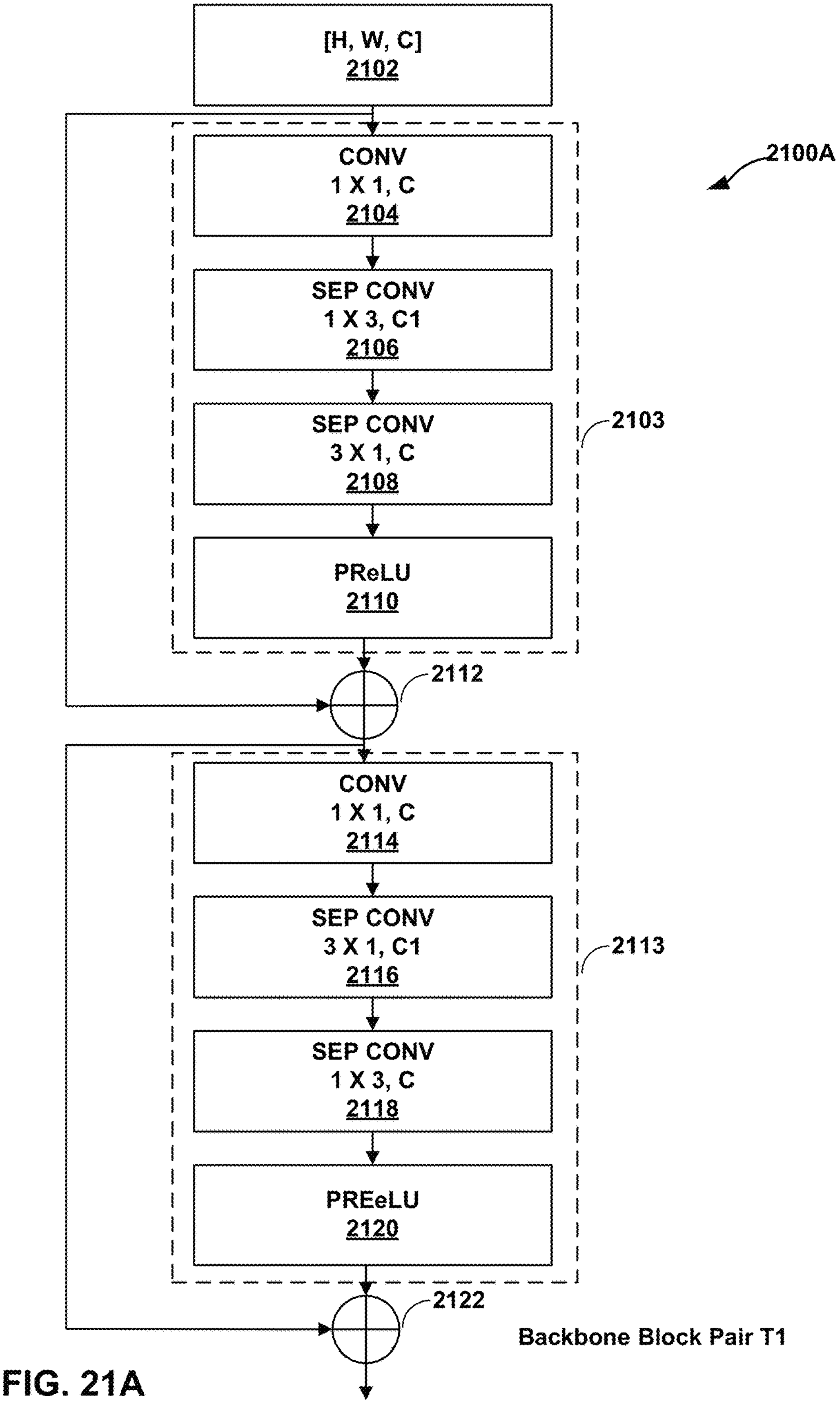
FIG. 21A is a block diagram illustrating a first example of a backbone block pair.

FIG. 21A is a block diagram illustrating a first example of a backbone block pair 2100A according to the techniques of this disclosure. Backbone block pair 2100A may be referred to as a backbone block pair of type 1 (T1). Backbone block pair 2100A may include a first backbone block 2103 and a second backbone block 2113. First backbone block 2103 of backbone block pair 2100A may receive an input tensor 2102 (e.g., also called a feature map) in the format of [H, W, C] where H is the height of the input tensor, W is the width of the input tensor, and C is the number of channels of the input tensor.

The input tensor is first processed by convolution (conv) layer 2104, which is a 1×1 convolution having C output channels. Then first backbone block 2103 processes the output of convolution layer 2104 using a pair of separable convolution. The example of FIG. 21A shows a separable convolution 2106 in the vertical direction (e.g., a 1×3 convolution) with C1 output channels, followed by a separable convolution 2108 in the horizontal direction (e.g., a 3×1 convolution) with C output channels. Since C1 is defined as being less than C, separable convolution 2106 performs feature reduction, thus reducing the complexity of backbone block pair 2100A. Separable convolution 2108 then performs feature expansion back to C output channels. After separable convolution 2108, first backbone block 2103 processes the output of separable convolution 2108 with PReLU 2110. In general, PReLU 2110 is an activation layer, which in different implementations can be implemented as a PReLU, a ReLU, or another layer that may introduce non-linearities to a CNN model.

The output of first backbone block 2103 is concatenated with the input tensor at concatenator 2112. The concatenated tensor is then supplied to second backbone block 2113 and processed by convolution layer 2114, which is a 1×1 convolution having C output channels. Second backbone block 2113 is configured similarly to first backbone block 2103. However, the order of the separable convolutions in second backbone block 2113 are reversed. The example of FIG. 21A shows a separable convolution 2116 in the horizontal direction (e.g., a 3×1 convolution) with C1 output channels, followed by a separable convolution 2118 in the vertical direction (e.g., a 1×3 convolution) with C output channels. Since C1 is defined as being less than C, separable convolution 2116 performs feature reduction, thus reducing the complexity of backbone block pair 2100A. Separable convolution 2118 then performs feature expansion back to C output channels. After separable convolution 2118, second backbone block 2113 processes the output of separable convolution 2118 with PReLU 2120. The output of PReLU 2120 is concatenated with the output of concatenator 2112 by concatenator 2122. The output of backbone block pair 2100A may then be supplied to another backbone block pair or be supplied to further layers in the NN-filter.

In summary, FIG. 21A shows a backbone block pair 2100A that performs a three-component 1D decomposition. The input to backbone block pair 2100A is defined by a height (h), width (w), and a number of channels (C). Backbone block pair 2100A performs the three-component 1D decomposition using a 1×1 convolution having C output channels, a first separable convolution in a first direction having C1 output channels, wherein C1 is less than C, and a second separable convolution in a second direction having C output channels. The three component 1D decomposition of the multi-dimensional convolution of backbone block pair 2100A further includes an activation function, such as a PReLU.

More specifically, backbone block pair 2100A may include a first backbone block 2103 having a first 1×1 convolution (e.g., convolution layer 2104) having C output channels, a first separable convolution (e.g., separable convolution 2106) in a first direction having C1 output channels, wherein C1 is less than C, and a second separable convolution (e.g., separable convolution 2108) in a second direction having C output channels. Backbone block pair 2100A may further include a second backbone block 2113 having a second 1×1 convolution (e.g., convolution layer 2114) having C output channels, a third separable convolution (e.g., separable convolution layer 2116) in the second direction having C1 output channels, wherein C1 is less than C, and a fourth separable convolution (e.g., separable convolution layer 2118) in the first direction having C output channels.

In the example of FIG. 21A the first direction is a vertical directional and the second direction is a horizontal direction.

The example of FIG. 21A shows that the first backbone block 2103 performs the separable convolutions in the vertical direction and then the horizontal direction, with feature reduction being performed by the separable convolution in the vertical direction. The second backbone block 2113 then performs the separable convolutions in the inverse direction. An alternative design of the backbone block is presented in FIG. 21B, which illustrates a second example of a backbone block pair where the directions of the separable convolutions are inverted.

Figure 21B:
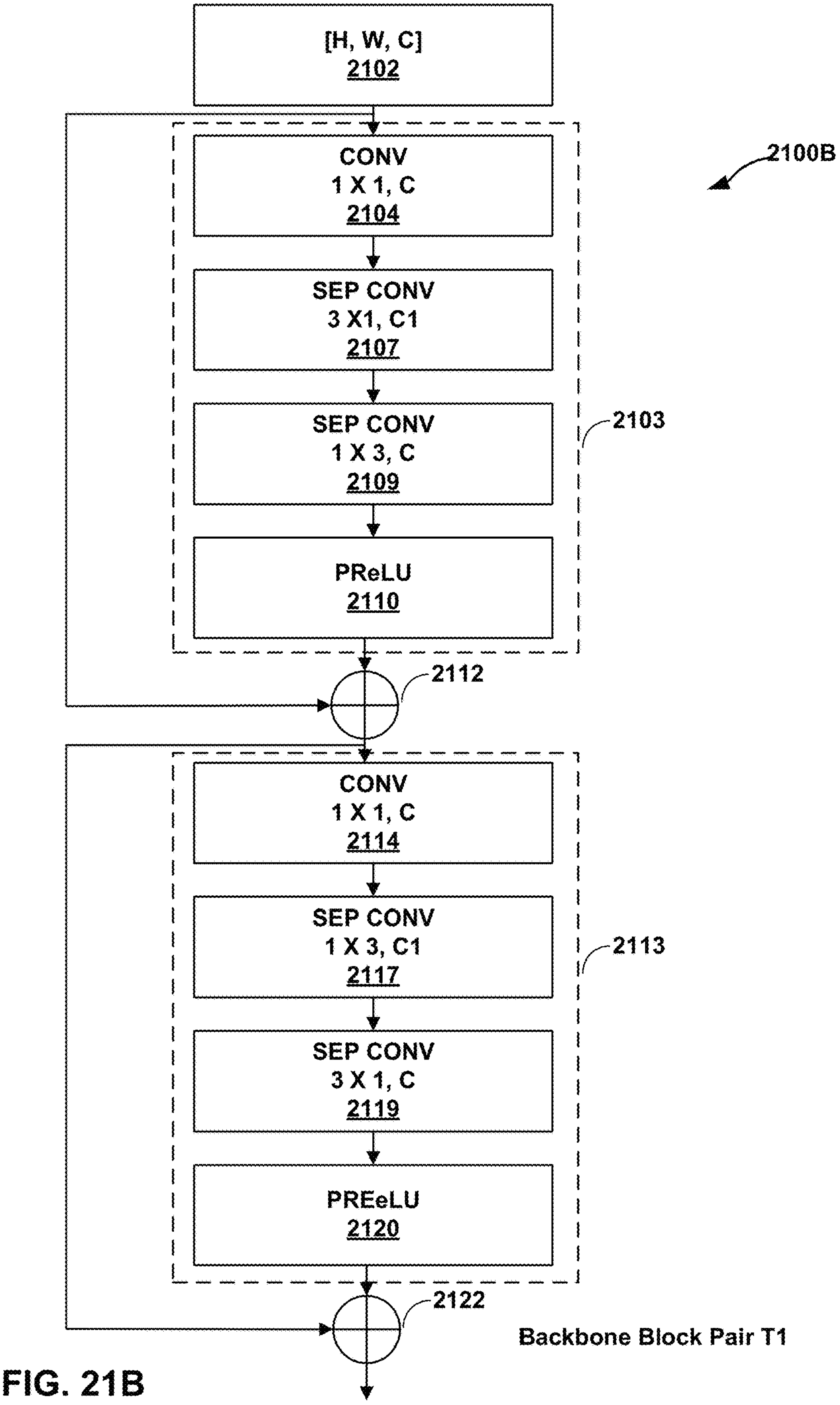
FIG. 21B is a block diagram illustrating a second example of a backbone block pair.

As shown in FIG. 21B, backbone block pair 2100B may include a first backbone block 2103 having a first 1×1 convolution (e.g., convolution layer 2104) having C output channels, a first separable convolution (e.g., separable convolution 2107) in a first direction (e.g., 3×1 or horizontal) having C1 output channels, wherein C1 is less than C, and a second separable convolution (e.g., separable convolution 2109) in a second direction (e.g., 1×3 or vertical) having C output channels. Backbone block pair 2100B may further include a second backbone block 2113 having a second 1×1 convolution (e.g., convolution layer 2114) having C output channels, a third separable convolution (e.g., separable convolution layer 2117) in the second direction having C1 output channels, wherein C1 is less than C, and a fourth separable convolution (e.g., separable convolution layer 2119) in the first direction having C output channels. In the example of FIG. 21B the first direction is a horizontal directional and the second direction is a vertical direction. Other layers of backbone block pair 2100B having the same reference numerals as backbone block pair 2100A remain the same.

Figure 21C:
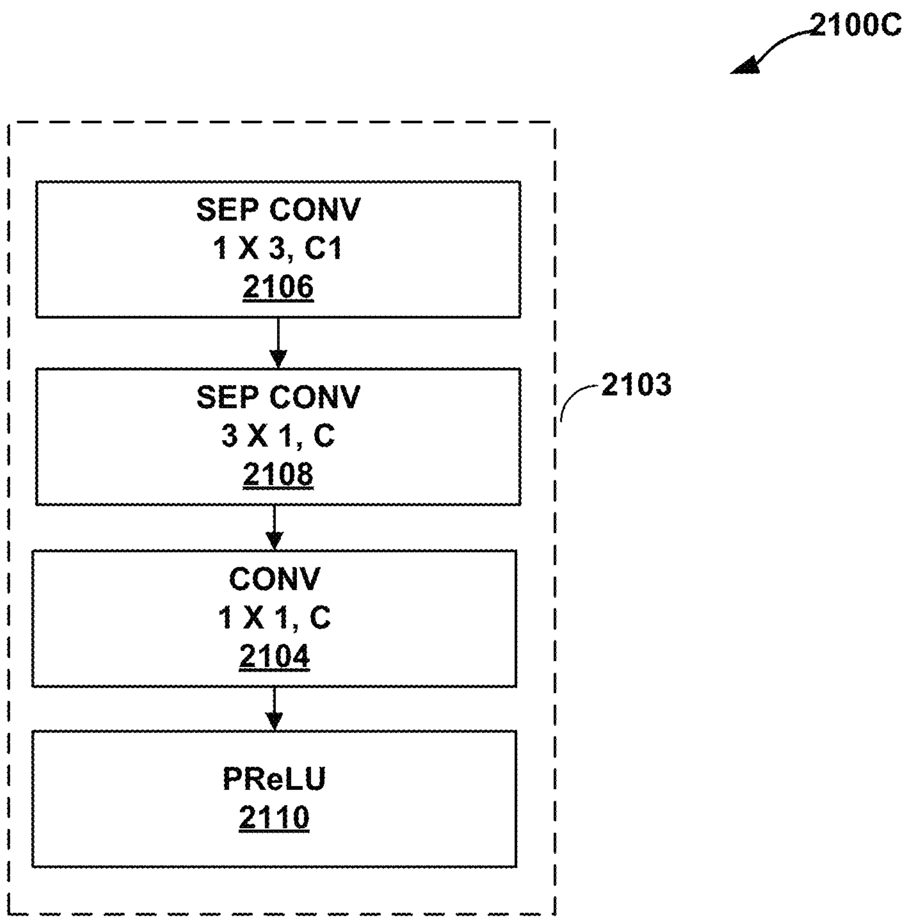
FIG. 21C is a block diagram illustrating a different arrangement for the 1×1 convolution of FIG. 21A

FIG. 21C is a block diagram illustrating a different arrangement for the 1×1 convolution of FIG. 21A. In some examples, the order of decomposition can be changed, e.g., the 1×1 convolution can be placed at a third stage, thus following 3×1 and 1×3 spatial convolutions. FIG. 21C shows an alternative arrangement of convolution layer 2104 (or more generally, any 1×1 convolution layer) in one part of backbone block pair 2100C. In particular, convolution layer 2104 is positioned after separable convolution 2106 and separable convolution 2108 in first backbone block 2103. FIG. 21C just shows the position of convolution layer 2104 being after the separable convolutions for first backbone block 2103. However, it should be understood that convolution layer 2104, or any 1×1 convolution, may be positioned after the two separable convolution in any backbone block of FIGS. 21A-C discussed above and/or FIGS. 22A-C described below.

In summary, in one example, a first 1×1 convolution is positioned before a first separable convolution, and a second 1×1 convolution is positioned before a third separable convolution. In another example, a first 1×1 convolution is positioned after a second separable convolution, and a second 1×1 convolution is positioned before a fourth separable convolution.

Figure 22A:
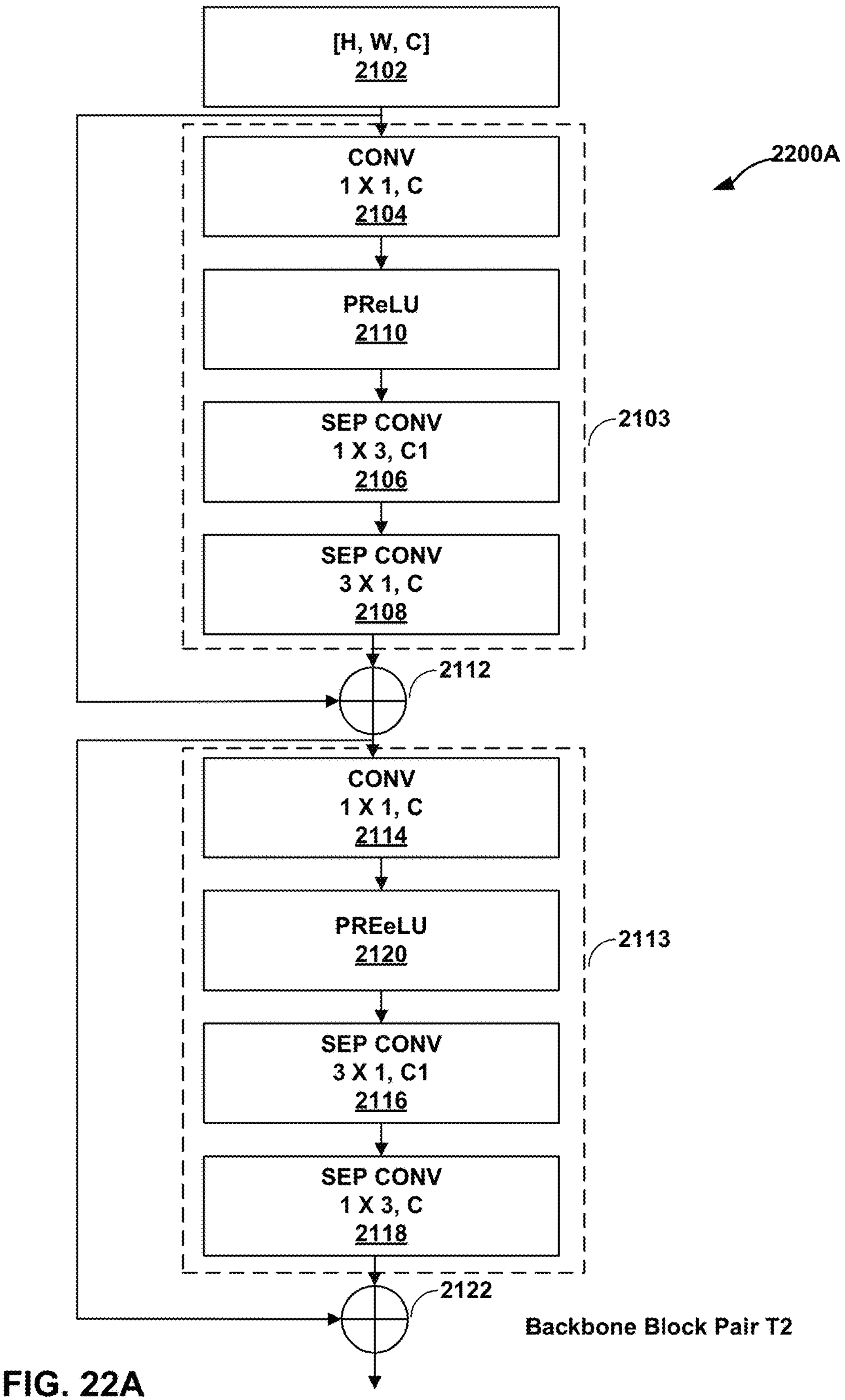
FIG. 22A is a block diagram illustrating another example of a backbone block pair with a first example arrangement of an activation layer.
Figure 22B:
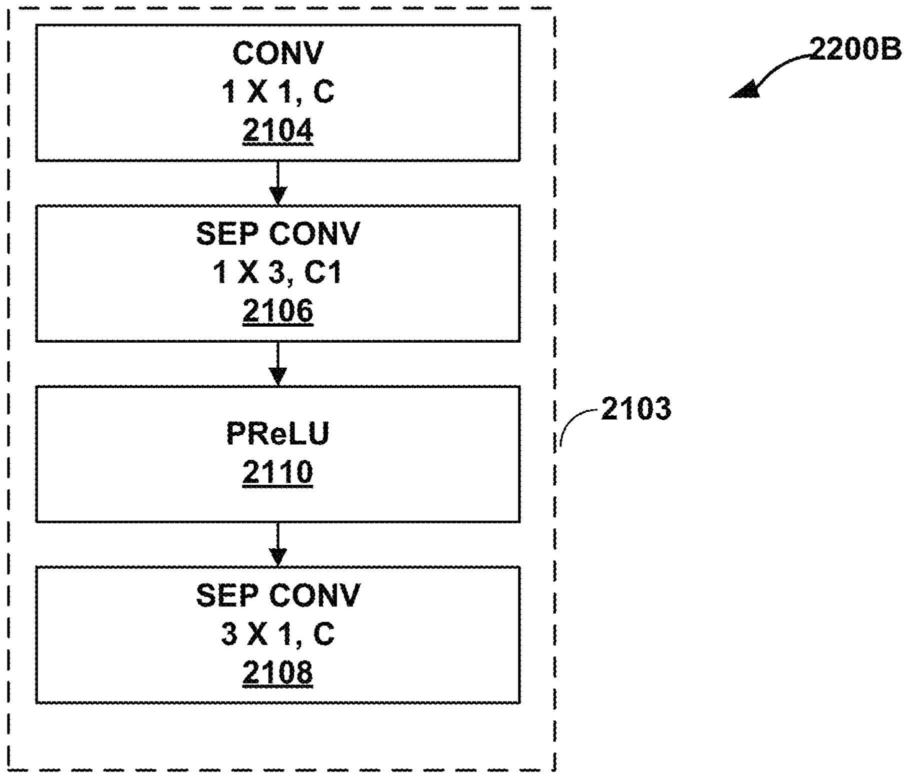
FIG. 22B is a block diagram illustrating another example of a backbone block pair with a second example arrangement of an activation layer.
Figure 22C:
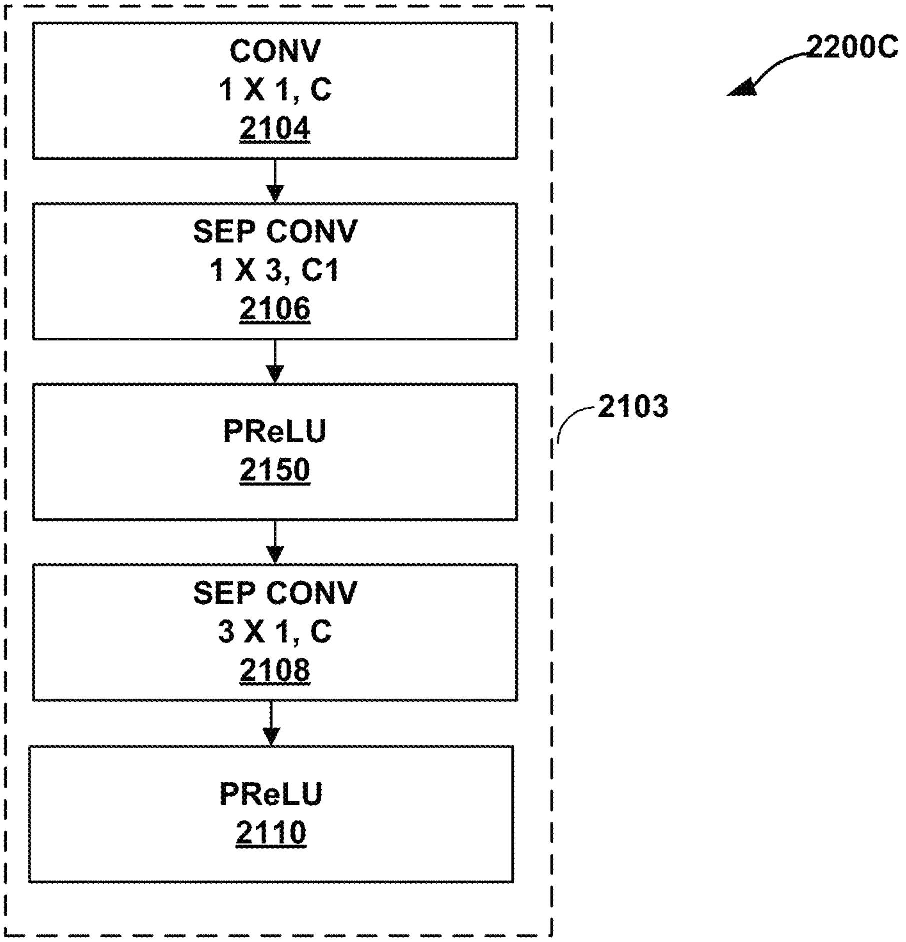
FIG. 22C is a block diagram illustrating another example of a backbone block pair with a third example arrangement of multiple activation layers.

FIGS. 22A-C are block diagram illustrating another example of a backbone block pair with a different example arrangements of an activation layer. In general, the position of the activation layer (e.g., PReLU) need not be limited to the last stage of a backbone block in a backbone block pair, as shown in FIGS. 21A-C. In some examples, the activation layer may be being placed following the first, in-depth 1×1 convolution. In other examples the activation layer can be placed following a first spatial decomposition layer, or placed after every decomposition layer.

FIG. 22A is a block diagram illustrating another example of a backbone block pair with a first example arrangement of an activation layer. FIG. 22A shows a backbone block pair 2200A that is similar in construction to that of backbone block pair 2100A of FIG. 21A. However, in backbone block pair 2200A, PReLU 2110 and PReLU 2120 are positioned after convolution layer 2104 and convolution layer 2114, respectively.

FIG. 22B is a block diagram illustrating another example of a backbone block pair 2200B with a second example arrangement of an activation layer. FIG. 22B just shows the position of PReLU 2110 being after separable convolution 2106 for first backbone block 2103. However, it should be understood that PReLU 2110, or any activation layer, may be positioned after a first separable convolution in any of the backbone blocks of FIGS. 21A-C.

FIG. 22C is a block diagram illustrating another example of a backbone block pair 2200C with a third example arrangement of multiple activation layers. FIG. 22C just shows the position of PReLU 2150 and PReLU 2110 being after separable convolution 2106 and separable convolution 2108, respectively, for first backbone block 2103. However, it should be understood that two PReLUs, or any two activation layers, may be positioned after each of two separable convolutions in any of the backbone blocks of FIGS. 21A-C.

In summary, in one example, a first backbone block includes a first PReLU after a first 1×1 convolution, and a second backbone includes a second PReLU after a second 1×1 convolution. In another example, a first backbone block includes a first PReLU after a second separable convolution, and a second backbone includes a second PReLU after a fourth separable convolution. In another example, the first backbone block includes a first PReLU after a first separable convolution and a second PReLU after a second separable convolution, and a second backbone includes a third PReLU after a third separable convolution, and a fourth PReLU after a fourth separable convolution.

Low Complexity Fusion Block

In a second example of the disclosure, the complexity of the fusion block is proposed to be reduced by employing separable convolutions, similarly to what is utilized in the backbone block described above. The example fusion blocks shown in FIGS. 23A-E may be used in place of any fusion block in any example NN-based filter, including in place of fusion block 1916 in FIG. 19A and fusion block 2022 in FIG. 20A. In general, FIGS. 23A-E show a fusion block of an NN-based filter, where the fusion block has two separable convolutions that each apply spatial downsampling. The implementation complexity of the fusion block is reduced through the combination of separable convolutions as well as spatial downsampling.

The downsampling process, denoted as d2 in FIGS. 23A-E, is implemented at each stage of the spatial processing (e.g., the separable convolutions). The design of the fusion block follows the same design principles as the backbone blocks described above, in addition to employing spatial down sampling at each stage of the 1D decomposition. In some examples, a fusion block with different decomposition orders can be employed, similarly to the backbone designs shown in FIGS. 21A-C and FIGS. 22A-C.

In some examples, the dX parameter specifying the amount of downsampling in the fusion block can be an integer number not equal to 2 (e.g., greater than 2). This downsampling parameter can take different values for luma or chroma components. In other examples, the fusion block can be executed separately for luma and chroma branches, thus employing optimal parameter selection for each component.

Accordingly, in one example, the NN-based filter further includes a first fusion block for luma samples, the first fusion block having two separable convolutions that each apply first spatial downsampling. The NN-filter also includes a second fusion block for chroma samples, the second fusion block having two separable convolutions that each apply second spatial downsampling. In one example, the first spatial downsampling and the second spatial downsampling apply a same amount of downsampling. In another example, the first spatial downsampling and the second spatial downsampling apply a different amount of downsampling.

Figure 23A:
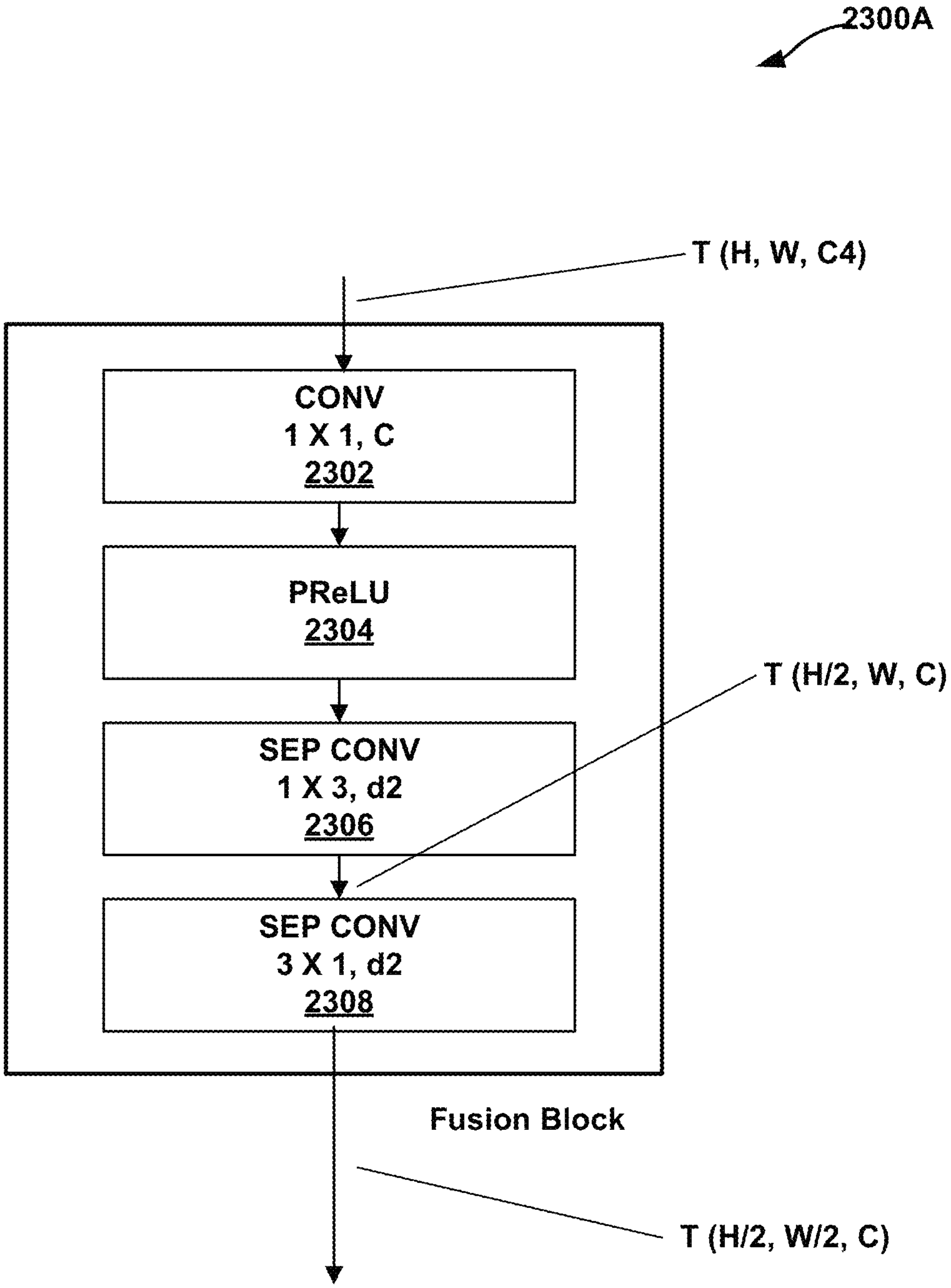
FIG. 23A is a block diagram illustrating a first example of a fusion block implementation.
Figure 23B:
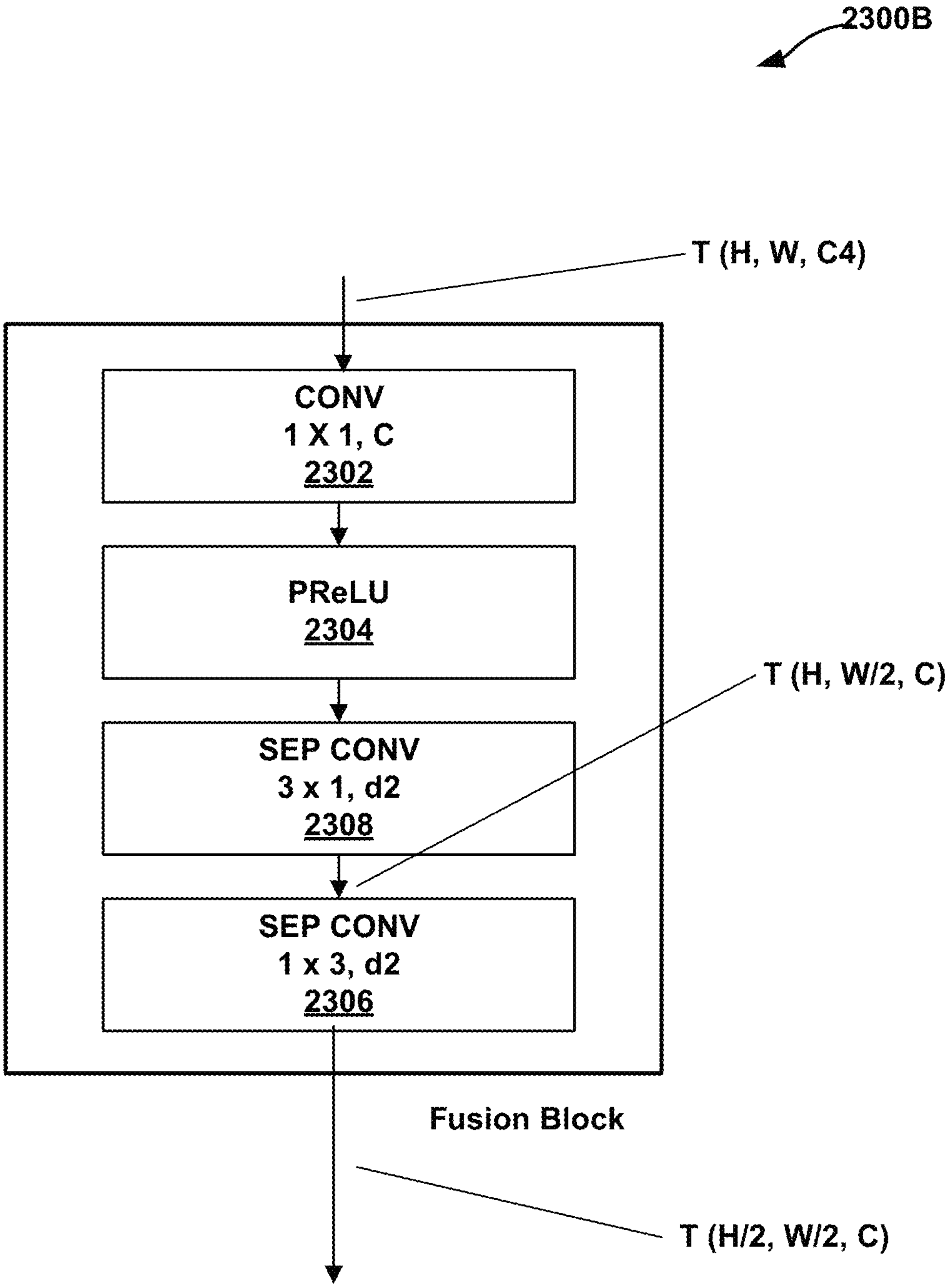
FIG. 23B is a block diagram illustrating a second example of a fusion block implementation.
Figure 23C:
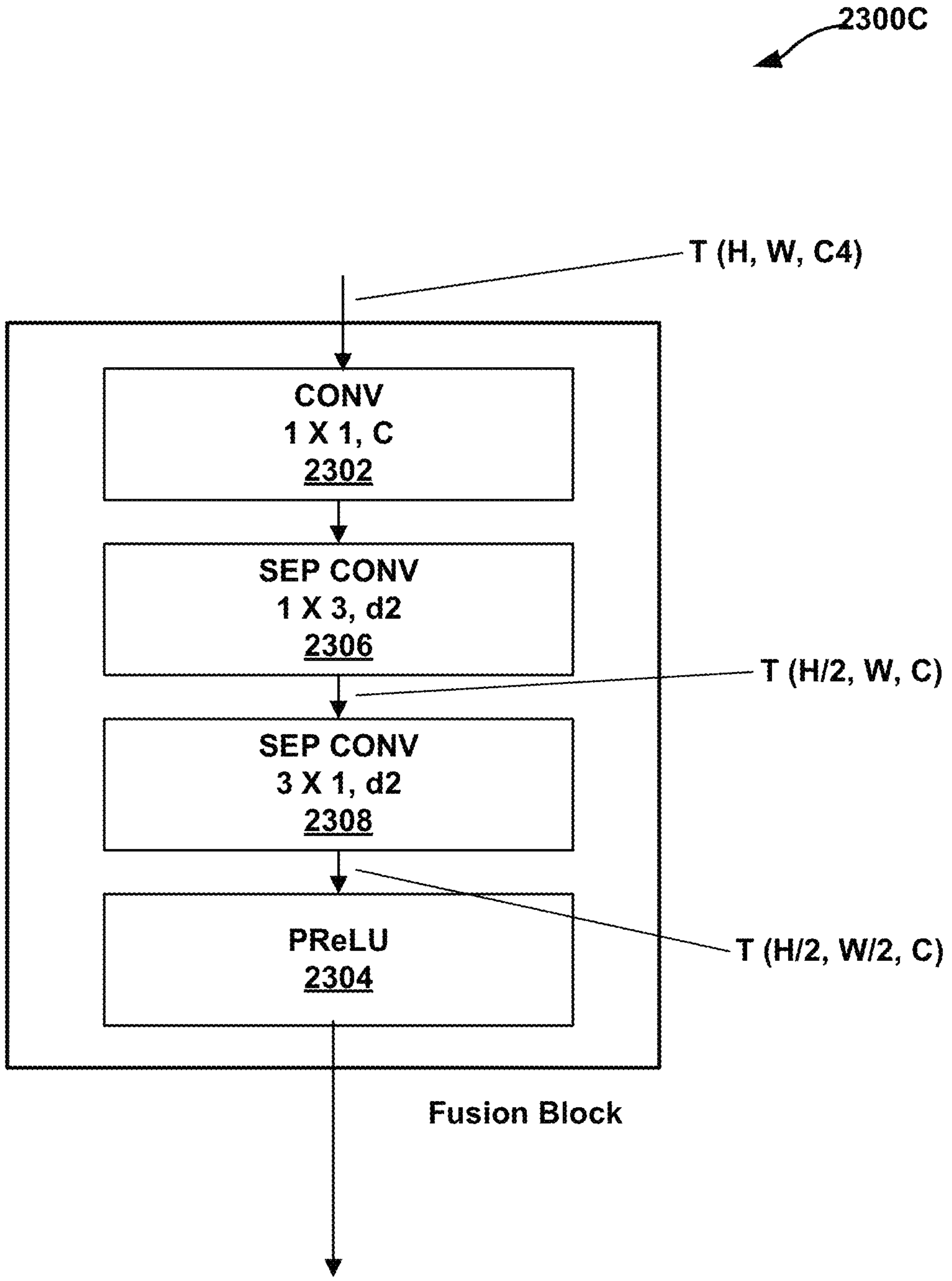
FIG. 23C is a block diagram illustrating a third example of a fusion block implementation.

In general, the fusion block examples of FIGS. 23A-C include a 1×1 convolution, a PReLU, a first separable convolution in a first direction (horizontal or vertical) having a first amount of spatial downsampling in the first direction, and a second separable convolution in a second direction (e.g., the opposite direction of the first direction) having the first amount of spatial downsampling in the second direction.

FIG. 23A is a block diagram illustrating a first example of a fusion block implementation. FIG. 23A shows an example fusion block 2300A that receive an input tensor T in the format (H, W, C4), where H is the height of the tensor, W is the width of the tensor, and C4 is the number of channels input to the module. Fusion block 2300A includes a convolution layer 2302, which is a 1×1 convolution with C output channels.

Convolution layer 2302 is followed by PReLU 2304. After PReLU 2304, fusion block 2300A includes a first separable convolution 2306 (e.g., a 1×3 convolution in the vertical direction) having a d2 amount of downsampling (e.g., 2 or another integer amount of downsampling). The output of first separable convolution 2306 is a tensor with dimensions (H/2, W, C). Fusion block 2300A further includes a second separable convolution 2308 (e.g., a 3×1 convolution in the horizontal direction) having the same d2 amount of downsampling. The output of the second separable convolution 2308 is a tensor with the dimensions (H/2, W/2, C).

FIG. 23B is a block diagram illustrating a second example of a fusion block implementation. In FIG. 23B, fusion block 2300B has the separable convolution layers 2308 and 2306 swapped compared to fusion block 2300A of FIG. 23A. That is, the horizontal separable convolution is performed before the vertical separable convolution.

FIG. 23C is a block diagram illustrating a third example of a fusion block implementation. In FIG. 23C, fusion block 2300C has PReLU 2304 as the last layer of the fusion block.

Figure 23D:
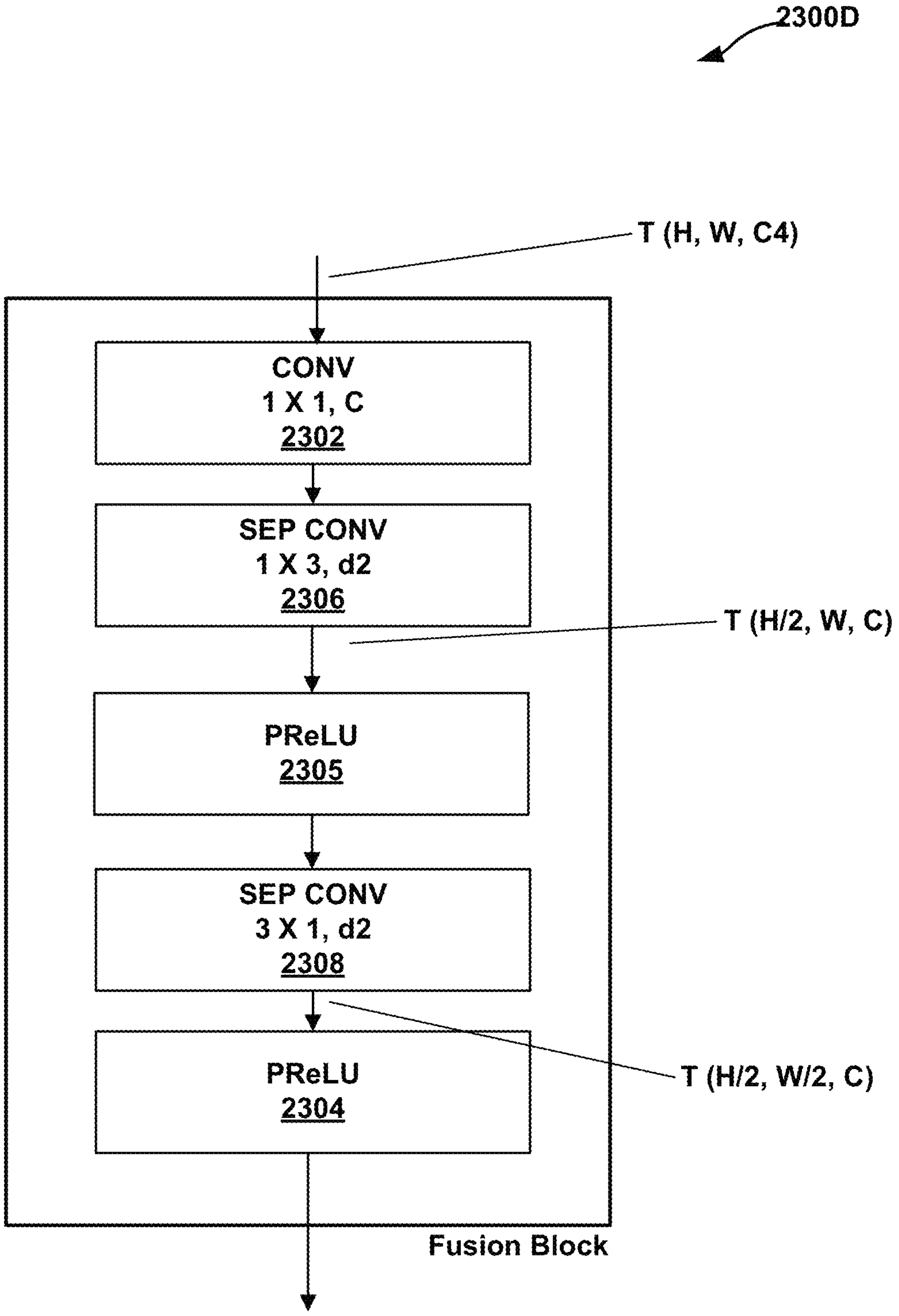
FIG. 23D is a block diagram illustrating a fourth example of a fusion block implementation.

FIG. 23D is a block diagram illustrating a fourth example of a fusion block implementation. In FIG. 23D, fusion block 2300D has PReLU 2304 as the last layer of the fusion block. In addition, an additional PReLU 2305 is included after separable convolution 2306. In other examples, the order of separable convolution 2306 and separable convolution 2308 may be swapped in the example of FIG. 23D.

Figure 23E:
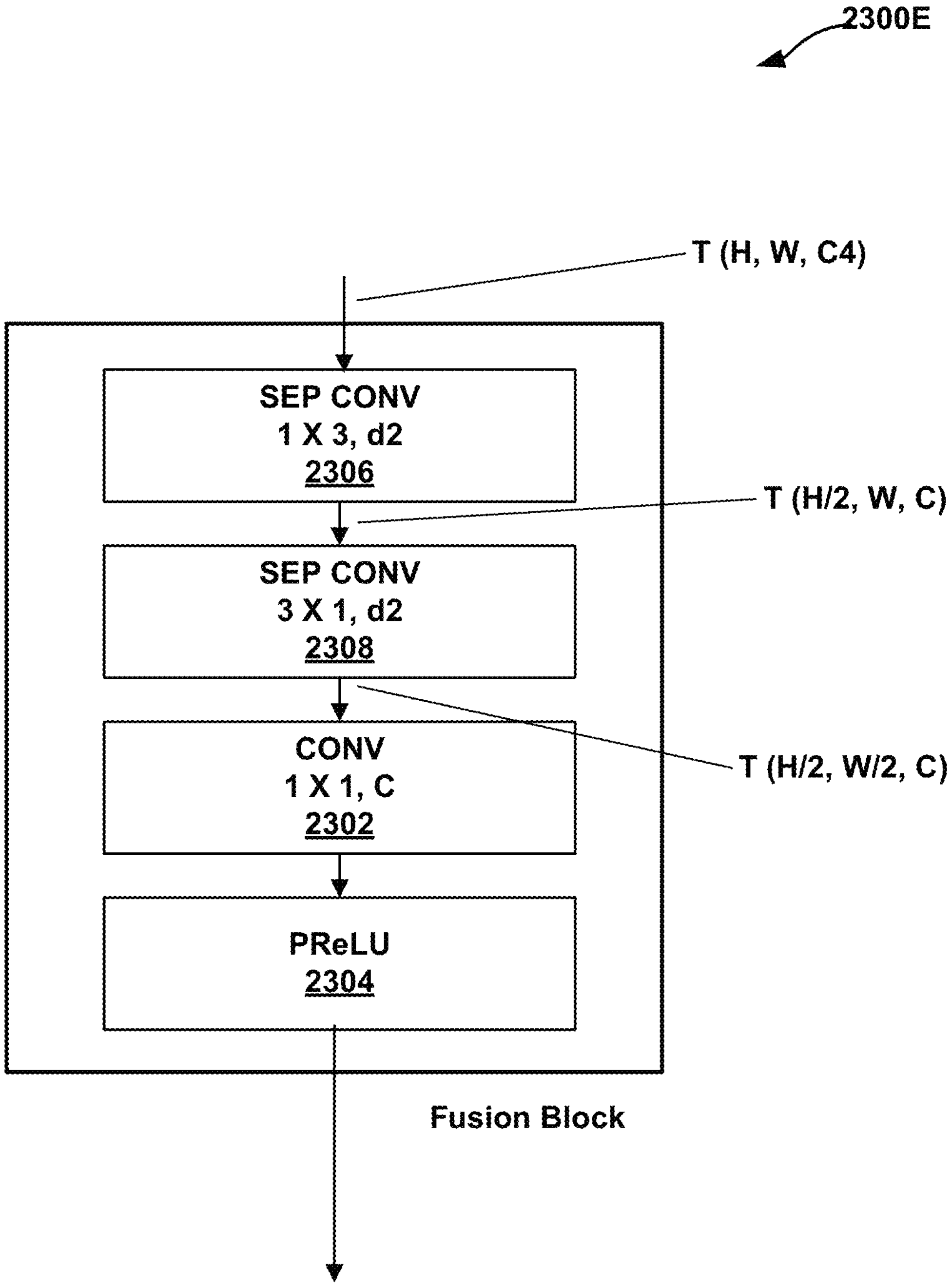
FIG. 23E is a block diagram illustrating a fifth example of a fusion block implementation.

FIG. 23E is a block diagram illustrating a fifth example of a fusion block implementation. In FIG. 23E, fusion block 2300E has convolution layer 2302 after separable convolution 2306 and separable convolution 2308.

Example Parameters

In a third example of the disclosure, the complexity of the headblock as well as number backbone blocks may be optimized to reach target complexity. In some examples, targeting complexity level below 5kMAC/pixel, the following parameters are proposed. Referencing the block diagram of FIG. 20A, the following configurations are proposed:

Configuration 1: "D1": 8, "D2": 2, "D3": 1, "D4": 1, "D5": 1, "D6": 8, "N_Y": 10, "N_UV": 4, "C": 4, "C1_Y": 8, "C1_UV": 8, "C21": 4, featuring higher filter support reach, at the cost of reduced number of channels C=4.

Configuration 2: "D1": 8, "D2": 2, "D3": 1, "D4": 1, "D5": 1, "D6": 8, "N_Y": 4, "N_UV": 1, "C": 8, "C1_Y": 8, "C1_UV": 8, "C21": 4, featuring higher number of channels, at the cost of reduced number of backbone blocks, N_Y=4, and N_UV=1.

It is assessed that the proposed techniques of this disclosure may be applicable to in-loop filters with a wide range of complexity by choosing different parameter configurations.

Adoption of the techniques of this disclosure to NNVC architectures could reduce computation complexity and memory bandwidth requirements and provide a competitive performance. The examples described in this document are related to NN-assisted loop filtering. However, they are applicable to any NN-based video coding tool that consumes input data with certain statistical properties, such as static content or sparse representation.

Figure 24:
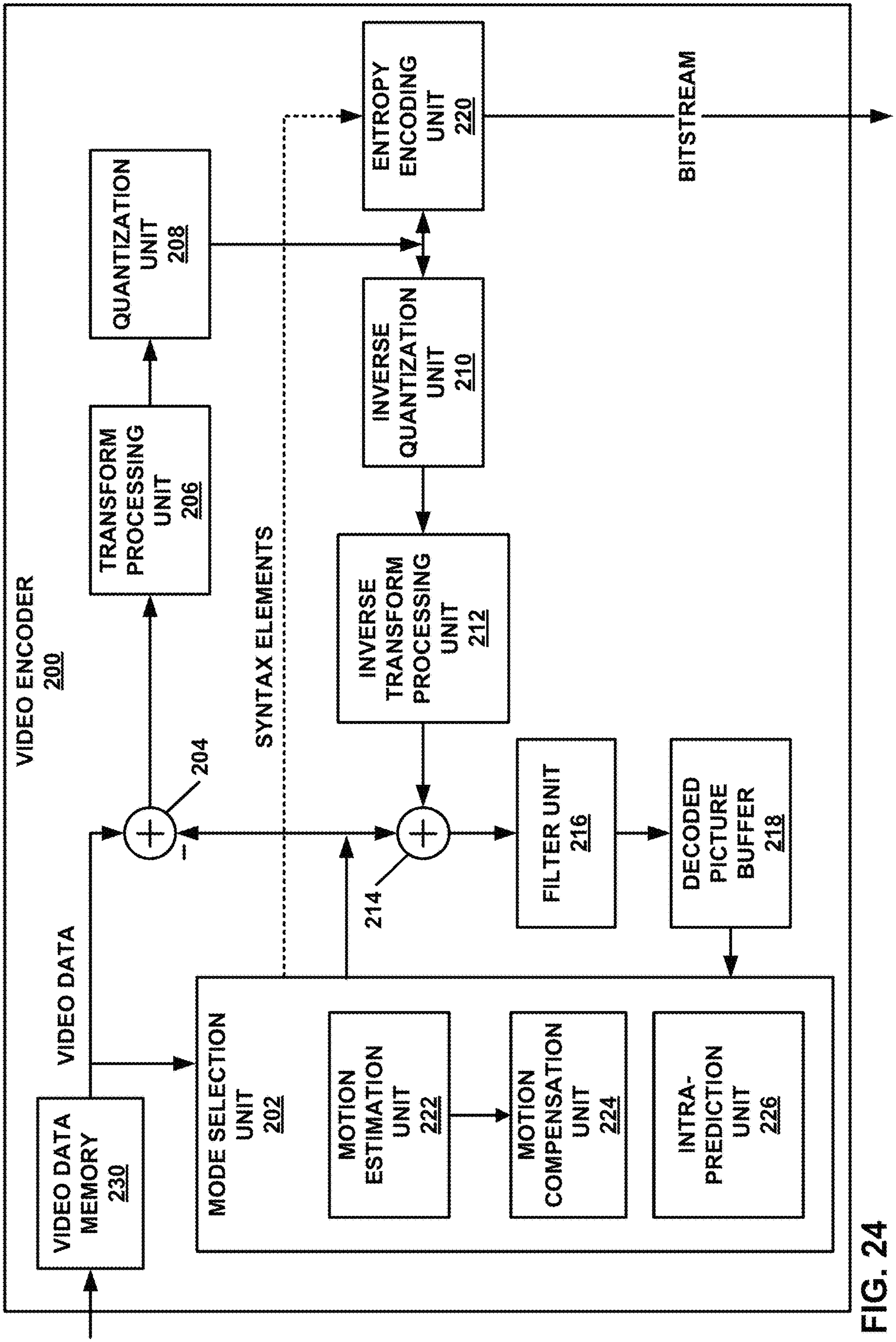
FIG. 24 is a block diagram illustrating an example video encoder that may perform the techniques of this disclosure.

FIG. 24 is a block diagram illustrating an example video encoder 200 that may perform the techniques of this disclosure for low complexity NN-based filtering. FIG. 24 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 24, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 24 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Filter unit 216 may also be configured to implement any combination of the NN-based filters described above. In particular, filter unit 216 may be configured to perform an NN-based filter process on one or more blocks of a reconstructed picture of video data using an NN-based filter, wherein the NN-based filter includes a pair of backbone blocks, each of the pair of backbone blocks comprising a three component 1D decomposition of a multi-dimensional convolution, wherein the 1D decomposition includes at least one layer with feature channel reduction. Filter unit 216 may further be configured to perform an NN-based filter process using an NN-based filter that further includes a fusion block having two separable convolutions that each apply spatial downsampling.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to implement the techniques of this disclosure for NN-based in-loop filtering. For example, video encoder 200 may be configured to receive a picture of video data, reconstruct the picture of video data, and perform an NN-based filter process on one or more blocks of the reconstructed picture of video data using an NN-based filter, wherein the NN-based filter includes a pair of backbone blocks, each of the pair of backbone blocks comprising a three component 1D decomposition of a multi-dimensional convolution, wherein the 1D decomposition includes at least one layer with feature channel reduction.

Figure 25:
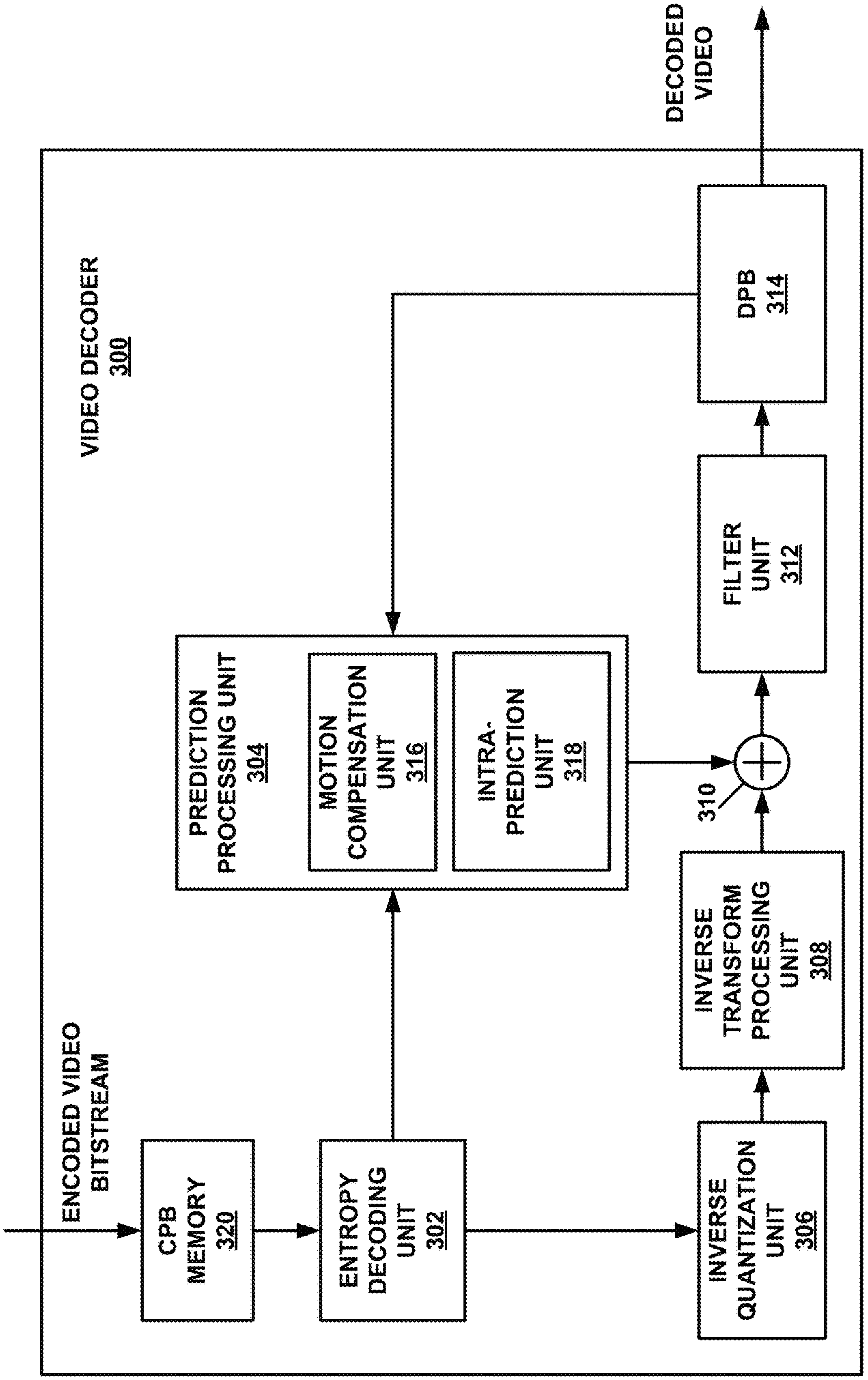
FIG. 25 is a block diagram illustrating an example video decoder that may perform the techniques of this disclosure.

FIG. 25 is a block diagram illustrating an example video decoder 300 that may perform the techniques of this disclosure. FIG. 25 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 25, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 25 are illustrated to assist with understanding the operations performed by video decoder 300. The units may be implemented as fixed-function circuits, programmable circuits, or a combination thereof. Similar to FIG. 24, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 24).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 24). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Filter unit 312 may also be configured to implement any combination of the NN-based filters described above. In particular, filter unit 312 may be configured to perform an NN-based filter process on one or more blocks of a reconstructed picture of video data using an NN-based filter, wherein the NN-based filter includes a pair of backbone blocks, each of the pair of backbone blocks comprising a three component 1D decomposition of a multi-dimensional convolution, wherein the 1D decomposition includes at least one layer with feature channel reduction. Filter unit 216 may further be configured to perform an NN-based filter process using an NN-based filter that further includes a fusion block having two separable convolutions that each apply spatial downsampling.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to implement the techniques of this disclosure for NN-based in-loop filtering. For example, video decoder 300 may be configured to receive a picture of video data, reconstruct the picture of video data, and perform an NN-based filter process on one or more blocks of the reconstructed picture of video data using an NN-based filter, wherein the NN-based filter includes a pair of backbone blocks, each of the pair of backbone blocks comprising a three component 1D decomposition of a multi-dimensional convolution, wherein the 1D decomposition includes at least one layer with feature channel reduction.

Figure 26:
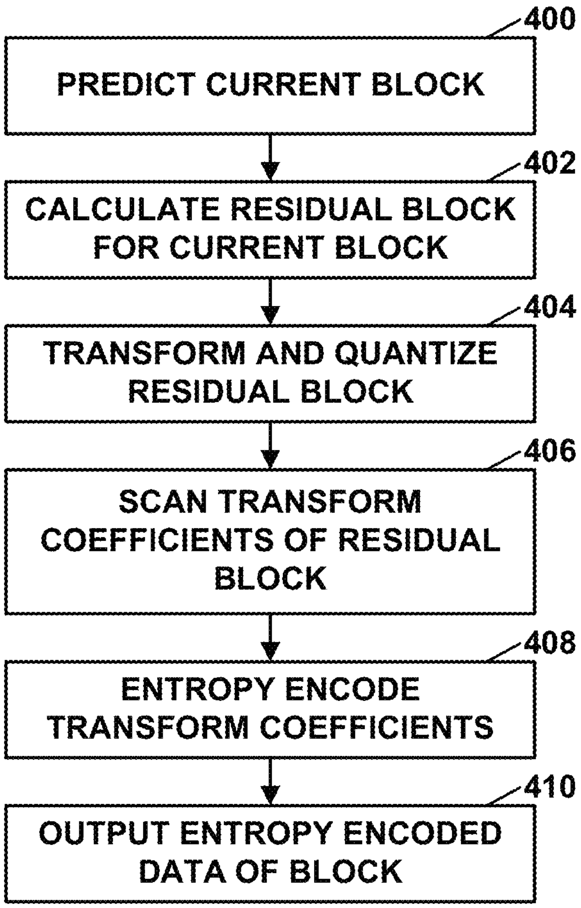
FIG. 26 is a flowchart illustrating an example method for encoding a current block in accordance with the techniques of this disclosure.

FIG. 26 is a flowchart illustrating an example method for encoding a current block in accordance with the techniques of this disclosure. The current block may be or include a current CU. Although described with respect to video encoder 200 (FIGS. 1 and 24), it should be understood that other devices may be configured to perform a method similar to that of FIG. 26.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404).

Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

Figure 27:
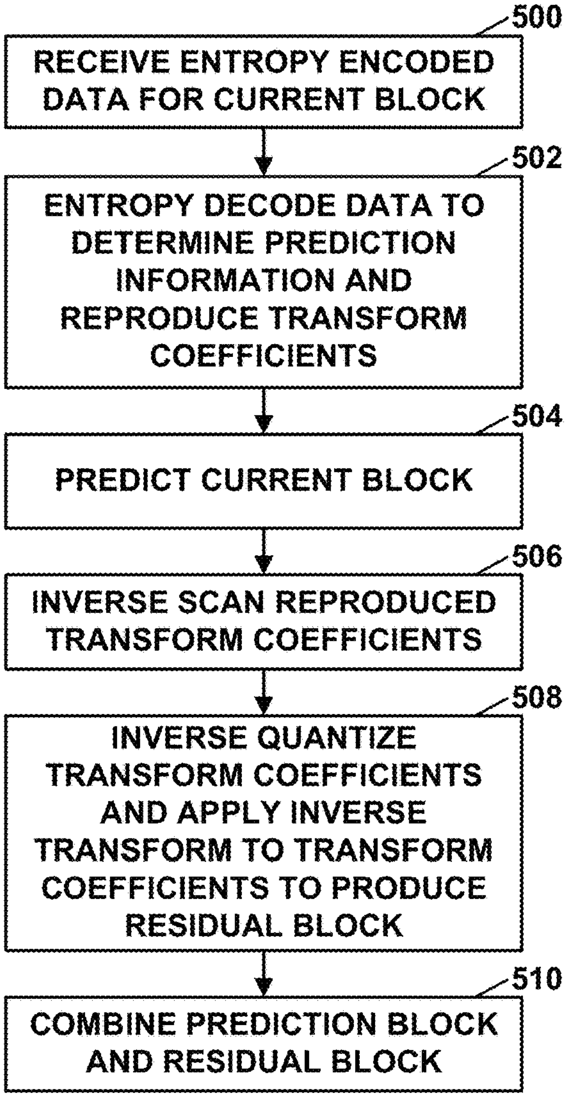
FIG. 27 is a flowchart illustrating an example method for decoding a current block in accordance with the techniques of this disclosure.

FIG. 27 is a flowchart illustrating an example method for decoding a current block of video data in accordance with the techniques of this disclosure. The current block may be or include a current CU. Although described with respect to video decoder 300 (FIGS. 1 and 25), it should be understood that other devices may be configured to perform a method similar to that of FIG. 27.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

Figure 28:
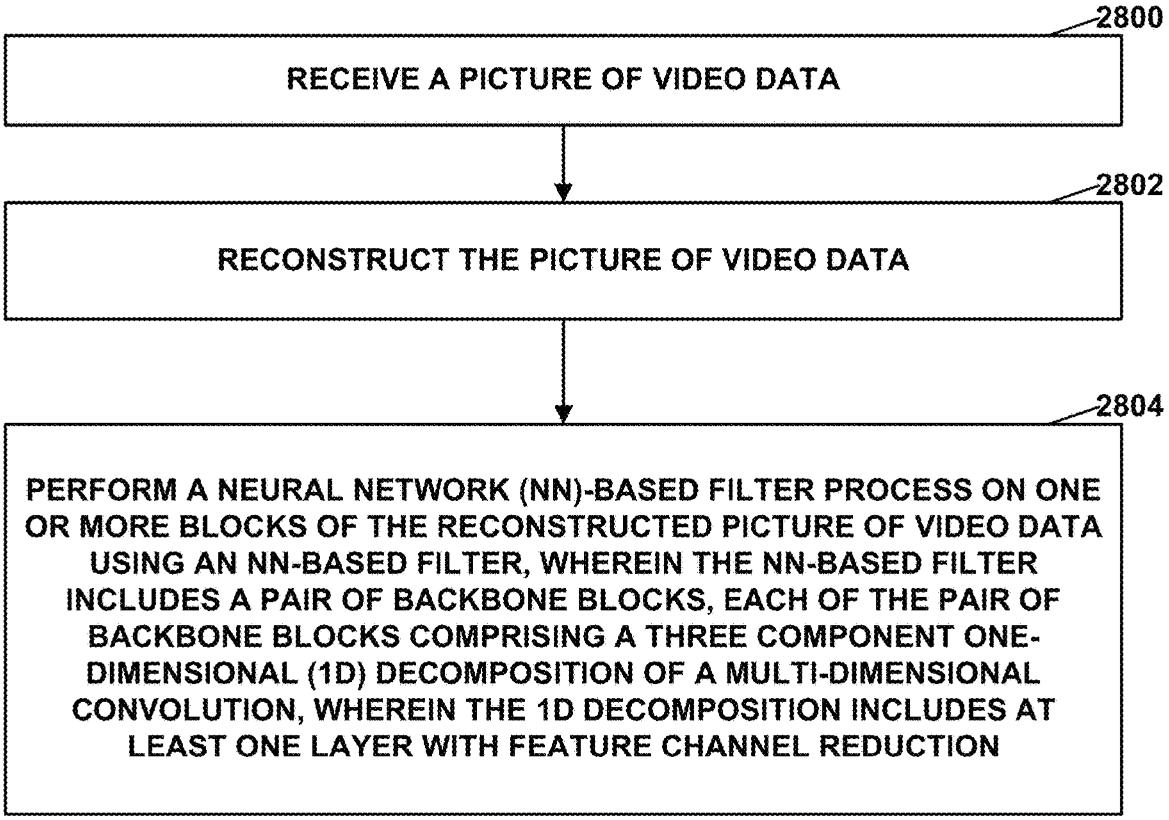
FIG. 28 is a flowchart illustrating an example method for coding a current block in accordance with the techniques of this disclosure.

FIG. 28 is a flowchart illustrating an example method for coding a current block in accordance with the techniques of this disclosure. The techniques of FIG. 28 may be performed by video encoder 200 (e.g., including filter unit 216) and video decoder 300 (e.g., including filter unit 312).

In one example of the disclosure, video encoder 200 and video decoder 300 may be configured to receive a picture of video data (2800), reconstruct the picture of video data (2802), and perform an NN-based filter process on one or more blocks of the reconstructed picture of video data using an NN-based filter, wherein the NN-based filter includes a pair of backbone blocks, each of the pair of backbone blocks comprising a three-component 1D decomposition of a multi-dimensional convolution, wherein the 1D decomposition includes at least one layer with feature channel reduction (2804).

The input to the three-component 1D decomposition may be defined by a height (h), width (w), and a number of channels (C). In one example, the three-component 1D decomposition of the multi-dimensional convolution includes a 1×1 convolution having C output channels, a first separable convolution in a first direction having C1 output channels, wherein C1 is less than C, and a second separable convolution in a second direction having C output channels. The three-component 1D decomposition of the multi-dimensional convolution may further include an activation function, such as a PReLU.

In a further example of the disclosure, the pair of backbone blocks includes a first backbone block and a second backbone block, and an input to the first backbone block is defined by a height (h), width (w), and a number of channels (C). In this example, the first backbone block includes a first 1×1 convolution having C output channels, a first separable convolution in a first direction having C1 output channels, wherein C1 is less than C, and a second separable convolution in a second direction having C output channels. The second backbone block includes a second 1×1 convolution having C output channels, a third separable convolution in the second direction having C1 output channels, wherein C1 is less than C, and a fourth separable convolution in the first direction having C output channels. In one example, the first direction is a horizontal directional and the second direction is a vertical direction. In another example, the first direction is a vertical directional and the second direction is a horizontal direction.

A variety of different arrangements may be employed for the backbone block. In one example, the first 1×1 convolution is positioned before the first separable convolution, and wherein the second 1×1 convolution is positioned before the third separable convolution. In another example, the first 1×1 convolution is positioned after the second separable convolution, and wherein the second 1×1 convolution is positioned before the fourth separable convolution.

In still another example, the first backbone block includes a first PReLU after the first 1×1 convolution, and the second backbone includes a second PReLU after the second lxi convolution. In other examples, the first backbone block includes a first PReLU after the second separable convolution, and the second backbone includes a second PReLU after the fourth separable convolution.

In another example, the first backbone block includes a first PReLU after the first separable convolution, and a second PReLU after the second separable convolution. The second backbone includes a third PReLU after the third separable convolution, and a fourth PReLU after the fourth separable convolution.

In a further example of the disclosure, the NN-based filter further includes a fusion block having two separable convolutions that each apply spatial downsampling. The fusion block may include a 1×1 convolution, a PReLU, a first separable convolution in a first direction having a first amount of spatial downsampling in the first direction, and a second separable convolution in a second direction having the first amount of spatial downsampling in the second direction. In one example, the first amount of spatial downsampling is 2. In other examples, the first amount of spatial downsampling is an integer number not equal to 2 (e.g., not equal to 2). In one example, the first direction is a horizontal directional and the second direction is a vertical direction. In another example, the first direction is a vertical directional and the second direction is a horizontal direction.

A variety of different arrangements may be employed for the fusion block. In one example, the 1×1 convolution is positioned before the first separable convolution. In another example, the 1×1 convolution is positioned after the second separable convolution. In one example, the PReLU is positioned after the 1×1 convolution. In another example, the PReLU is positioned after the second separable convolution. In still another example, the PReLU is positioned after the first separable convolution. In a further example, the PReLU is a first PReLU, and the fusion block includes the first PReLU positioned after the first separable convolution, and a second PReLU positioned after the second separable convolution.

In other examples of the disclosure, the NN-based filter further includes a first fusion block for luma samples, the first fusion block having two separable convolutions that each apply first spatial downsampling, and a second fusion block for chroma samples, the second fusion block having two separable convolutions that each apply second spatial downsampling. In one example, the first spatial downsampling and the second spatial downsampling apply a same amount of downsampling. In another example, the first spatial downsampling and the second spatial downsampling apply a different amount of downsampling.

In other examples of the disclosure, the following parameters may be used. In one example, the NN-based filter includes 10 pairs of backbone blocks for luma samples, 4 pairs of backbone blocks for chroma samples, and 4 channels. In another example, the NN-based filter includes 4 pairs of backbone blocks for luma samples, 1 pair of backbone blocks for chroma samples, and 8 channels.

The following numbered clauses illustrate one or more aspects of the devices and techniques described in this disclosure.

Aspect 1A. A method of coding video data, the method comprising: receiving a picture of video data; reconstructing the picture of video data; and performing a neural network (NN)-based filter process on the reconstructed picture of video data, wherein the NN-based filter process includes the use of a backbone block with three-component one-dimensional (1D) decomposition.

Aspect 2A. The method of any of Aspect 1A, wherein coding comprises decoding, and wherein reconstructing comprises decoding.

Aspect 3A. The method of any of Aspect 1A, wherein coding comprises encoding.

Aspect 4A. A device for coding video data, the device comprising one or more means for performing the method of any of Aspects 1A-3A.

Aspect 5A. The device of Aspect 4A, wherein the one or more means comprise one or more processors implemented in circuitry.

Aspect 6A. The device of any of Aspects 4A and 5A, further comprising a memory to store the video data.

Aspect 7A. The device of any of Aspects 4A-6A, further comprising a display configured to display decoded video data.

Aspect 8A. The device of any of Aspects 4A-7A, wherein the device comprises one or more of a camera, a computer, a mobile device, a broadcast receiver device, or a set-top box.

Aspect 9A. The device of any of Aspects 4A-8A, wherein the device comprises a video decoder.

Aspect 10A. The device of any of Aspects 4A-9A, wherein the device comprises a video encoder.

Aspect 11A. A computer-readable storage medium having stored thereon instructions that, when executed, cause one or more processors to perform the method of any of Aspects 1A-3A.

Aspect 1B. A method of coding video data, the method comprising: receiving a picture of video data; reconstructing the picture of video data; and performing a neural network (NN)-based filter process on one or more blocks of the reconstructed picture of video data using an NN-based filter, wherein the NN-based filter includes a pair of backbone blocks, each of the pair of backbone blocks comprising a three-component one-dimensional (1D) decomposition of a multi-dimensional convolution, wherein the 1D decomposition includes at least one layer with feature channel reduction.

Aspect 2B. The method of Aspect 1B, wherein an input to the three-component 1D decomposition is defined by a height (h), width (w), and a number of channels (C), and wherein the three-component 1D decomposition of the multi-dimensional convolution includes: a 1×1 convolution having C output channels, a first separable convolution in a first direction having C1 output channels, wherein C1 is less than C, and a second separable convolution in a second direction having C output channels.

Aspect 3B. The method of Aspect 2B, wherein the three-component 1D decomposition of the multi-dimensional convolution further includes an activation function.

Aspect 4B. The method of Aspect 3B, wherein the activation function is a parametric rectified linear unit (PReLU).

Aspect 5B. The method of any of Aspects 1B-4B, wherein the pair of backbone blocks includes a first backbone block and a second backbone block, wherein an input to the first backbone block is defined by a height (h), width (w), and a number of channels (C), and wherein the first backbone block includes: a first 1×1 convolution having C output channels, a first separable convolution in a first direction having C1 output channels, wherein C1 is less than C, and a second separable convolution in a second direction having C output channels, and wherein the second backbone block includes: a second 1×1 convolution having C output channels, a third separable convolution in the second direction having C1 output channels, wherein C1 is less than C, and a fourth separable convolution in the first direction having C output channels.

Aspect 6B. The method of Aspect 5B, wherein the first direction is a horizontal directional and the second direction is a vertical direction.

Aspect 7B. The method of Aspect 5B, wherein the first direction is a vertical directional and the second direction is a horizontal direction.

Aspect 8B. The method of any of Aspects 5B-7B, wherein the first 1×1 convolution is positioned before the first separable convolution, and wherein the second lxi convolution is positioned before the third separable convolution.

Aspect 9B. The method of any of Aspects 5B-7B, wherein the first 1×1 convolution is positioned after the second separable convolution, and wherein the second lxi convolution is positioned before the fourth separable convolution.

Aspect 10B. The method of any of Aspects 5B-9B, wherein the first backbone block includes a first parametric rectified linear unit (PReLU) after the first 1×1 convolution, and wherein the second backbone includes a second PReLU after the second 1×1 convolution.

Aspect 11B. The method of any of Aspects 5B-9B, wherein the first backbone block includes a first parametric rectified linear unit (PReLU) after the second separable convolution, and wherein the second backbone includes a second PReLU after the fourth separable convolution.

Aspect 12B. The method of any of Aspects 5B-9B, wherein the first backbone block includes a first parametric rectified linear unit (PReLU) after the first separable convolution, and a second PReLU after the second separable convolution, and wherein the second backbone includes a third PReLU after the third separable convolution, and a fourth PReLU after the fourth separable convolution.

Aspect 13B. The method of any of Aspects 1B-12B, wherein the NN-based filter further includes a fusion block having two separable convolutions that each apply spatial downsampling.

Aspect 14B. The method of Aspect 13B, wherein the fusion block includes: a 1×1 convolution, a parametric rectified linear unit (PReLU), a first separable convolution in a first direction having a first amount of spatial downsampling in the first direction, and a second separable convolution in a second direction having the first amount of spatial downsampling in the second direction.

Aspect 15B. The method of Aspect 14B, wherein the first amount of spatial downsampling is 2.

Aspect 16B. The method of Aspect 14B, wherein the first amount of spatial downsampling is an integer number not equal to 2.

Aspect 17B. The method of any of Aspects 14B-16B, wherein the first direction is a horizontal directional and the second direction is a vertical direction.

Aspect 18B. The method of any of Aspects 14B-16B, wherein the first direction is a vertical directional and the second direction is a horizontal direction.

Aspect 19B. The method of any of Aspects 14B-18B, wherein the 1×1 convolution is positioned before the first separable convolution.

Aspect 20B. The method of any of Aspects 14B-18B, wherein the 1×1 convolution is positioned after the second separable convolution.

Aspect 21B. The method of any of Aspects 14B-20B, wherein the PReLU is positioned after the 1×1 convolution.

Aspect 22B. The method of any of Aspects 14B-20B, wherein the PReLU is positioned after the second separable convolution.

Aspect 23B. The method of any of Aspects 14B-20B, wherein the PReLU is positioned after the first separable convolution.

Aspect 24B. The method of any of Aspects 14B-20B, wherein the PReLU is a first PReLU, and wherein the fusion block includes the first PReLU positioned after the first separable convolution, and a second PReLU positioned after the second separable convolution.

Aspect 25B. The method of any of Aspects 1B-24B, wherein the NN-based filter further includes a first fusion block for luma samples, the first fusion block having two separable convolutions that each apply first spatial downsampling, and a second fusion block for chroma samples, the second fusion block having two separable convolutions that each apply second spatial downsampling.

Aspect 26B. The method of Aspect 25B, wherein the first spatial downsampling and the second spatial downsampling apply a same amount of downsampling.

Aspect 27B. The method of Aspect 25B, wherein the first spatial downsampling and the second spatial downsampling apply a different amount of downsampling.

Aspect 28B. The method of any of Aspects 1B-27B, wherein the NN-based filter includes 10 pairs of backbone blocks for luma samples, 4 pairs of backbone blocks for chroma samples, and 4 channels.

Aspect 29B. The method of any of Aspects 1B-27B, wherein the NN-based filter includes 4 pairs of backbone blocks for luma samples, 1 pair of backbone blocks for chroma samples, and 8 channels.

Aspect 30B. The method of any of Aspects 1B-29B, wherein coding comprises decoding, and wherein the method further comprises: displaying a decoded picture that includes the one or more blocks processed by the NN-based filter.

Aspect 31B. The method of any of Aspects 1B-29B, wherein coding comprises encoding, and wherein the method further comprises: capturing the picture of video data with a camera.

Aspect 32B. An apparatus configured to code video data, the apparatus comprising: a memory; and one or more processors in communication with the memory, the one or more processors configured to: receive a picture of video data; reconstruct the picture of video data; and perform a neural network (NN)-based filter process on one or more blocks of the reconstructed picture of video data using an NN-based filter, wherein the NN-based filter includes a pair of backbone blocks, each of the pair of backbone blocks comprising a three-component one-dimensional (1D) decomposition of a multi-dimensional convolution, wherein the 1D decomposition includes at least one layer with feature channel reduction.

Aspect 33B. The apparatus of Aspect 32B, wherein an input to the three-component 1D decomposition is defined by a height (h), width (w), and a number of channels (C), and wherein the three-component 1D decomposition of the multi-dimensional convolution includes: a 1×1 convolution having C output channels, a first separable convolution in a first direction having C1 output channels, wherein C1 is less than C, and a second separable convolution in a second direction having C output channels.

Aspect 34B. The apparatus of Aspect 33B, wherein the three-component 1D decomposition of the multi-dimensional convolution further includes an activation function.

Aspect 35B. The apparatus of Aspect 34B, wherein the activation function is a parametric rectified linear unit (PReLU).

Aspect 36B. The apparatus of any of Aspects 32B-35B, wherein the pair of backbone blocks includes a first backbone block and a second backbone block, wherein an input to the first backbone block is defined by a height (h), width (w), and a number of channels (C), and wherein the first backbone block includes: a first 1×1 convolution having C output channels, a first separable convolution in a first direction having C1 output channels, wherein C1 is less than C, and a second separable convolution in a second direction having C output channels, and wherein the second backbone block includes: a second 1×1 convolution having C output channels, a third separable convolution in the second direction having C1 output channels, wherein C1 is less than C, and a fourth separable convolution in the first direction having C output channels.

Aspect 37B. The apparatus of Aspect 36B, wherein the first direction is a horizontal directional and the second direction is a vertical direction.

Aspect 38B. The apparatus of Aspect 36B, wherein the first direction is a vertical directional and the second direction is a horizontal direction.

Aspect 39B. The apparatus of any of Aspects 36B-38B, wherein the first 1×1 convolution is positioned before the first separable convolution, and wherein the second lxi convolution is positioned before the third separable convolution.

Aspect 40B. The apparatus of any of Aspects 36B-38B, wherein the first 1×1 convolution is positioned after the second separable convolution, and wherein the second lxi convolution is positioned before the fourth separable convolution.

Aspect 41B. The apparatus of any of Aspects 36B-40B, wherein the first backbone block includes a first parametric rectified linear unit (PReLU) after the first 1×1 convolution, and wherein the second backbone includes a second PReLU after the second lxi convolution.

Aspect 42B. The apparatus of any of Aspects 36B-40B, wherein the first backbone block includes a first parametric rectified linear unit (PReLU) after the second separable convolution, and wherein the second backbone includes a second PReLU after the fourth separable convolution.

Aspect 43B. The apparatus of any of Aspects 36B-40B, wherein the first backbone block includes a first parametric rectified linear unit (PReLU) after the first separable convolution, and a second PReLU after the second separable convolution, and wherein the second backbone includes a third PReLU after the third separable convolution, and a fourth PReLU after the fourth separable convolution.

Aspect 44B. The apparatus of any of Aspects 32B-43B, wherein the NN-based filter further includes a fusion block having two separable convolutions that each apply spatial downsampling.

Aspect 45. The apparatus of Aspect 44, wherein the fusion block includes:

a 1×1 convolution, a parametric rectified linear unit (PReLU), a first separable convolution in a first direction having a first amount of spatial downsampling in the first direction, and a second separable convolution in a second direction having the first amount of spatial downsampling in the second direction.

Aspect 46B. The apparatus of Aspect 45B, wherein the first amount of spatial downsampling is 2.

Aspect 47B. The apparatus of Aspect 45B, wherein the first amount of spatial downsampling is an integer number not equal to 2.

Aspect 48B. The apparatus of any of Aspects 45B-47B, wherein the first direction is a horizontal directional and the second direction is a vertical direction.

Aspect 49B. The apparatus of any of Aspects 45B-47B, wherein the first direction is a vertical directional and the second direction is a horizontal direction.

Aspect 50B. The apparatus of any of Aspects 45B-49B, wherein the 1×1 convolution is positioned before the first separable convolution.

Aspect 51B. The apparatus of any of Aspects 45B-49B, wherein the 1×1 convolution is positioned after the second separable convolution.

Aspect 52B. The apparatus of any of Aspects 45B-51B, wherein the PReLU is positioned after the 1×1 convolution.

Aspect 53B. The apparatus of any of Aspects 45B-51B, wherein the PReLU is positioned after the second separable convolution.

Aspect 54B. The apparatus of any of Aspects 45B-51B, wherein the PReLU is positioned after the first separable convolution.

Aspect 55B. The apparatus of any of Aspects 45B-51B, wherein the PReLU is a first PReLU, and wherein the fusion block includes the first PReLU positioned after the first separable convolution, and a second PReLU positioned after the second separable convolution.

Aspect 56B. The apparatus of any of Aspects 32B-55B, wherein the NN-based filter further includes a first fusion block for luma samples, the first fusion block having two separable convolutions that each apply first spatial downsampling, and a second fusion block for chroma samples, the second fusion block having two separable convolutions that each apply second spatial downsampling.

Aspect 57B. The apparatus of Aspect 56B, wherein the first spatial downsampling and the second spatial downsampling apply a same amount of downsampling.

Aspect 58B. The apparatus of Aspect 56B, wherein the first spatial downsampling and the second spatial downsampling apply a different amount of downsampling.

Aspect 59B. The apparatus of any of Aspects 32B-58B, wherein the NN-based filter includes 10 pairs of backbone blocks for luma samples, 4 pairs of backbone blocks for chroma samples, and 4 channels.

Aspect 60B. The apparatus of any of Aspects 32B-58B, wherein the NN-based filter includes 4 pairs of backbone blocks for luma samples, 1 pair of backbone blocks for chroma samples, and 8 channels Aspect 61B. The apparatus of any of Aspects 32B-60B, wherein the apparatus is a video decoder, and wherein the apparatus further comprises: a display configured to display a decoded picture that includes the one or more blocks processed by the NN-based filter.

Aspect 62B. The apparatus of any of Aspects 32B-60B, wherein the apparatus is a video decoder, and wherein the apparatus further comprises: a camera configured to capture the picture of video data with a camera.

Aspect 63B. An apparatus configured to code video data, the apparatus comprising: means for receiving a picture of video data; means for reconstructing the picture of video data; and means for performing a neural network (NN)-based filter process on one or more blocks of the reconstructed picture of video data using an NN-based filter, wherein the NN-based filter includes a pair of backbone blocks, each of the pair of backbone blocks comprising a three-component one-dimensional (1D) decomposition of a multi-dimensional convolution, wherein the 1D decomposition includes at least one layer with feature channel reduction.

Aspect 64B. A non-transitory computer-readable storage medium storing instructions that, when executed, cause one or more processors of a device configured to code video data to: receive a picture of video data; reconstruct the picture of video data; and perform a neural network (NN)-based filter process on one or more blocks of the reconstructed picture of video data using an NN-based filter, wherein the NN-based filter includes a pair of backbone blocks, each of the pair of backbone blocks comprising a three-component one-dimensional (1D) decomposition of a multi-dimensional convolution, wherein the 1D decomposition includes at least one layer with feature channel reduction.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
receiving a picture of video data;
reconstructing the picture of video data; and
performing a neural network (NN)-based filter process on one or more blocks of the reconstructed picture of video data using an NN-based filter, wherein the NN-based filter includes a pair of backbone blocks, each of the pair of backbone blocks comprising a three-component one-dimensional (1D) decomposition of a multi-dimensional convolution, wherein the 1D decomposition includes at least one layer with feature channel reduction,
wherein the pair of backbone blocks includes a first backbone block and a second backbone block,
wherein the first backbone block includes a first separable convolution in a first direction having C1 output channels and a second separable convolution in a second direction having C output channels, wherein C1 is less than C,
wherein the second backbone block includes a third separable convolution in the second direction having C1 output channels and a fourth separable convolution in the first direction having C output channels, wherein C1 is less than C, and
wherein the first direction is different than the second direction.

2. The method of claim 1, wherein an input to the three-component 1D decomposition is defined by a height (h), width (w), and a number of channels (C), and
wherein the three-component 1D decomposition of the multi-dimensional convolution includes:
a 1×1 convolution having C output channels.

3. The method of claim 2, wherein the three-component 1D decomposition of the multi-dimensional convolution further includes an activation function.

4. The method of claim 3, wherein the activation function is a parametric rectified linear unit (PReLU).

5. The method of claim 1, wherein an input to the first backbone block is defined by a height (h), width (w), and a number of channels (C), and wherein the first backbone block further includes:
a first 1×1 convolution having C output channels,
and wherein the second backbone block further includes:
a second 1×1 convolution having C output channels.

6. The method of claim 5, wherein the first direction is a horizontal directional and the second direction is a vertical direction.

7. The method of claim 5, wherein the first direction is a vertical directional and the second direction is a horizontal direction.

8. The method of claim 5, wherein the first 1×1 convolution is positioned before the first separable convolution, and wherein the second 1×1 convolution is positioned before the third separable convolution.

9. The method of claim 5, wherein the first 1×1 convolution is positioned after the second separable convolution, and wherein the second 1×1 convolution is positioned before the fourth separable convolution.

10. The method of claim 5, wherein the first backbone block includes a first parametric rectified linear unit (PRELU) after the first 1×1 convolution, and
wherein the second backbone includes a second PRELU after the second 1×1 convolution.

11. The method of claim 5, wherein the first backbone block includes a first parametric rectified linear unit (PReLU) after the second separable convolution, and
wherein the second backbone includes a second PRELU after the fourth separable convolution.

12. The method of claim 5, wherein the first backbone block includes a first parametric rectified linear unit (PReLU) after the first separable convolution, and a second PRELU after the second separable convolution, and
wherein the second backbone includes a third PRELU after the third separable convolution, and a fourth PRELU after the fourth separable convolution.

13. The method of claim 1, wherein the NN-based filter further includes a fusion block having two separable convolutions that each apply spatial downsampling.

14. The method of claim 13, wherein the fusion block includes:
a 1×1 convolution,
a parametric rectified linear unit (PReLU),
a fifth separable convolution in the first direction having a first amount of spatial downsampling in the first direction, and
a sixth separable convolution in the second direction having the first amount of spatial downsampling in the second direction.

15. The method of claim 14, wherein the first amount of spatial downsampling is 2.

16. The method of claim 14, wherein the first amount of spatial downsampling is an integer number not equal to 2.

17. The method of claim 14, wherein the first direction is a horizontal directional and the second direction is a vertical direction.

18. The method of claim 14, wherein the first direction is a vertical directional and the second direction is a horizontal direction.

19. The method of claim 14, wherein the 1×1 convolution is positioned before the first separable convolution.

20. The method of claim 14, wherein the 1×1 convolution is positioned after the second separable convolution.

21. The method of claim 14, wherein the PRELU is positioned after the 1×1 convolution.

22. The method of claim 14, wherein the PRELU is positioned after the second separable convolution.

23. The method of claim 14, wherein the PRELU is positioned after the first separable convolution.

24. The method of claim 14, wherein the PRELU is a first PRELU, and wherein the fusion block includes the first PRELU positioned after the first separable convolution, and a second PRELU positioned after the second separable convolution.

25. The method of claim 1, wherein the NN-based filter further includes a first fusion block for luma samples, the first fusion block having two separable convolutions that each apply first spatial downsampling, and a second fusion block for chroma samples, the second fusion block having two separable convolutions that each apply second spatial downsampling.

26. The method of claim 25, wherein the first spatial downsampling and the second spatial downsampling apply a same amount of downsampling.

27. The method of claim 25, wherein the first spatial downsampling and the second spatial downsampling apply a different amount of downsampling.

28. The method of claim 1, wherein the NN-based filter includes 10 pairs of backbone blocks for luma samples, 4 pairs of backbone blocks for chroma samples, and 4 channels.

29. The method of claim 1, wherein the NN-based filter includes 4 pairs of backbone blocks for luma samples, 1 pair of backbone blocks for chroma samples, and 8 channels.

30. The method of claim 1, wherein coding comprises decoding, and wherein the method further comprises:

displaying a decoded picture that includes the one or more blocks processed by the NN-based filter.

31. The method of claim 1, wherein coding comprises encoding, and wherein the method further comprises:

capturing the picture of video data with a camera.

32. An apparatus configured to code video data, the apparatus comprising:

a memory; and one or more processors in communication with the memory, the one or more processors configured to:

receive a picture of video data;

reconstruct the picture of video data; and perform a neural network (NN)-based filter process on one or more blocks of the reconstructed picture of video data using an NN-based filter, wherein the NN-based filter includes a pair of backbone blocks, each of the pair of backbone blocks comprising a three-component one-dimensional (1D) decomposition of a multi-dimensional convolution, wherein the 1D decomposition includes at least one layer with feature channel reduction, wherein the pair of backbone blocks includes a first backbone block and a second backbone block, wherein the first backbone block includes a first separable convolution in a first direction having C1 output channels and a second separable convolution in a second direction having C output channels, wherein C1 is less than C, wherein the second backbone block includes a third separable convolution in the second direction having C1 output channels and a fourth separable convolution in the first direction having C output channels, wherein C1 is less than C, and wherein the first direction is different than the second direction.

33. The apparatus of claim 32, wherein an input to the three-component 1D decomposition is defined by a height (h), width (w), and a number of channels (C), and wherein the three-component 1D decomposition of the multi-dimensional convolution includes:

a 1×1 convolution having C output channels.

34. The apparatus of claim 33, wherein the three-component 1D decomposition of the multi-dimensional convolution further includes an activation function.

35. The apparatus of claim 34, wherein the activation function is a parametric rectified linear unit (PReLU).

36. The apparatus of claim 32, wherein an input to the first backbone block is defined by a height (h), width (w), and a number of channels (C), and wherein the first backbone block further includes:

a first 1×1 convolution having C output channels, and wherein the second backbone block further includes:

a second 1×1 convolution having C output channels.

37. The apparatus of claim 36, wherein the first direction is a horizontal directional and the second direction is a vertical direction.

38. The apparatus of claim 36, wherein the first direction is a vertical directional and the second direction is a horizontal direction.

39. The apparatus of claim 36, wherein the first 1×1 convolution is positioned before the first separable convolution, and wherein the second 1×1 convolution is positioned before the third separable convolution.

40. The apparatus of claim 36, wherein the first 1×1 convolution is positioned after the second separable convolution, and wherein the second 1×1 convolution is positioned before the fourth separable convolution.

41. The apparatus of claim 36, wherein the first backbone block includes a first parametric rectified linear unit (PReLU) after the first 1×1 convolution, and wherein the second backbone includes a second PRELU after the second 1×1 convolution.

42. The apparatus of claim 36, wherein the first backbone block includes a first parametric rectified linear unit (PReLU) after the second separable convolution, and wherein the second backbone includes a second PRELU after the fourth separable convolution.

43. The apparatus of claim 36, wherein the first backbone block includes a first parametric rectified linear unit (PReLU) after the first separable convolution, and a second PRELU after the second separable convolution, and wherein the second backbone includes a third PRELU after the third separable convolution, and a fourth PRELU after the fourth separable convolution.

44. The apparatus of claim 32, wherein the NN-based filter further includes a fusion block having two separable convolutions that each apply spatial downsampling.

45. The apparatus of claim 44, wherein the fusion block includes:

a 1×1 convolution, a parametric rectified linear unit (PReLU), a fifth separable convolution in the first direction having a first amount of spatial downsampling in the first direction, and a sixth separable convolution in the second direction having the first amount of spatial downsampling in the second direction.

46. The apparatus of claim 45, wherein the first amount of spatial downsampling is 2.

47. The apparatus of claim 45, wherein the first amount of spatial downsampling is an integer number not equal to 2.

48. The apparatus of claim 45, wherein the first direction is a horizontal directional and the second direction is a vertical direction.

49. The apparatus of claim 45, wherein the first direction is a vertical directional and the second direction is a horizontal direction.

50. The apparatus of claim 45, wherein the 1×1 convolution is positioned before the first separable convolution.

51. The apparatus of claim 45, wherein the 1×1 convolution is positioned after the second separable convolution.

52. The apparatus of claim 45, wherein the PRELU is positioned after the 1×1 convolution.

53. The apparatus of claim 45, wherein the PRELU is positioned after the second separable convolution.

54. The apparatus of claim 45, wherein the PRELU is positioned after the first separable convolution.

55. The apparatus of claim 45, wherein the PRELU is a first PRELU, and wherein the fusion block includes the first PRELU positioned after the first separable convolution, and a second PRELU positioned after the second separable convolution.

56. The apparatus of claim 32, wherein the NN-based filter further includes a first fusion block for luma samples, the first fusion block having two separable convolutions that each apply first spatial downsampling, and a second fusion block for chroma samples, the second fusion block having two separable convolutions that each apply second spatial downsampling.

57. The apparatus of claim 56, wherein the first spatial downsampling and the second spatial downsampling apply a same amount of downsampling.

58. The apparatus of claim 56, wherein the first spatial downsampling and the second spatial downsampling apply a different amount of downsampling.

59. The apparatus of claim 32, wherein the NN-based filter includes 10 pairs of backbone blocks for luma samples, 4 pairs of backbone blocks for chroma samples, and 4 channels.

60. The apparatus of claim 32, wherein the NN-based filter includes 4 pairs of backbone blocks for luma samples, 1 pair of backbone blocks for chroma samples, and 8 channels.

61. The apparatus of claim 32, wherein the apparatus is a video decoder, and wherein the apparatus further comprises:

a display configured to display a decoded picture that includes the one or more blocks processed by the NN-based filter.

62. The apparatus of claim 32, wherein the apparatus is a video encoder, and wherein the apparatus further comprises:

a camera configured to capture the picture of video data with a camera.

63. An apparatus configured to code video data, the apparatus comprising:

means for receiving a picture of video data;

means for reconstructing the picture of video data; and means for performing a neural network (NN)-based filter process on one or more blocks of the reconstructed picture of video data using an NN-based filter, wherein the NN-based filter includes a pair of backbone blocks, each of the pair of backbone blocks comprising a three-component one-dimensional (1D) decomposition of a multi-dimensional convolution, wherein the 1D decomposition includes at least one layer with feature channel reduction.

64. A non-transitory computer-readable storage medium storing instructions that, when executed, cause one or more processors of a device configured to code video data to:

receive a picture of video data;

reconstruct the picture of video data; and perform a neural network (NN)-based filter process on one or more blocks of the reconstructed picture of video data using an NN-based filter, wherein the NN-based filter includes a pair of backbone blocks, each of the pair of backbone blocks comprising a three-component one-dimensional (1D) decomposition of a multi-dimensional convolution, wherein the 1D decomposition includes at least one layer with feature channel reduction.

* * * * *